United States Patent [19]
Goto

[11] Patent Number: 5,466,086
[45] Date of Patent: Nov. 14, 1995

[54] CONNECTOR, METHOD FOR CONNECTING STRUCTURAL MEMBERS WITH CONNECTOR AND CONNECTION STRUCTURE BETWEEN STRUCTURAL MEMBERS

[75] Inventor: Yasuo Goto, Oita, Japan

[73] Assignee: Home Co., Ltd., Oita, Japan

[21] Appl. No.: 67,576

[22] Filed: May 26, 1993

[30] Foreign Application Priority Data

May 30, 1992 [JP] Japan ................... 4-164402

[51] Int. Cl.⁶ .................................... F16B 11/00
[52] U.S. Cl. .............. 403/268; 403/267; 403/405.1
[58] Field of Search ................... 403/268, 267, 403/405.1

[56] References Cited

U.S. PATENT DOCUMENTS

| | | | |
|---|---|---|---|
| 3,502,359 | 3/1970 | Lucci | 403/267 |
| 4,137,115 | 1/1979 | Lambert | 403/268 |
| 4,324,423 | 4/1982 | Pitesky . | |
| 4,681,477 | 7/1987 | Fisher | 403/405.1 |
| 4,712,957 | 12/1987 | Edwards et al. . | |
| 4,776,738 | 10/1988 | Winston . | |
| 5,052,848 | 10/1991 | Nakamura | 403/268 |

FOREIGN PATENT DOCUMENTS

| | | |
|---|---|---|
| 0232911 | 2/1987 | European Pat. Off. . |
| 2066414 | 9/1971 | France . |
| 2472075 | 6/1980 | France . |
| 2646351 | 5/1977 | Germany . |
| 3915669 | 11/1990 | Germany . |
| 14940 | 1/1988 | Japan . |
| 14941 | 1/1988 | Japan . |
| 14939 | 1/1988 | Japan . |
| 162008 | 10/1988 | Japan . |
| 93401 | 7/1990 | Japan . |
| 300442 | 12/1990 | Japan . |
| 5543 | 1/1991 | Japan . |
| 295946 | 12/1991 | Japan . |
| 49600 | 10/1940 | Netherlands . |
| 2204905 | 11/1988 | United Kingdom . |

*Primary Examiner*—John T. Kwon
*Attorney, Agent, or Firm*—Lane, Aitken & McCann

[57] ABSTRACT

A connector is inserted into connecting holes arranged at abutment surfaces between structural members, adhesive agent is fed from one end of a hollow part of the connector or an opening part of a branch pipe of the connector and the clearances between the surface of the connector and circumferential walls of the connecting holes are filled with adhesive agent flowed out of the other end opening at the hollow part of the connector so as to connect both structural memers in rigid form.

20 Claims, 40 Drawing Sheets

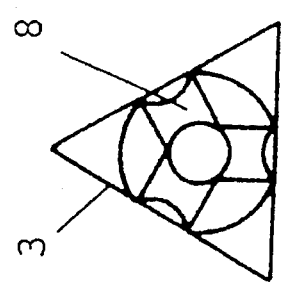
FIG.3-e
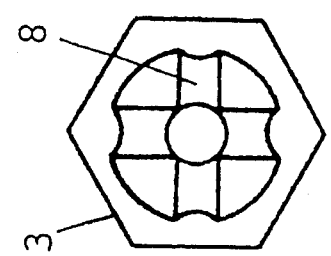
FIG.3-d
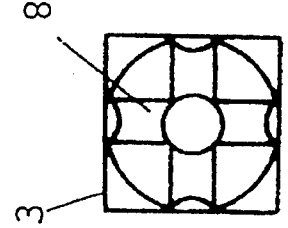
FIG.3-c
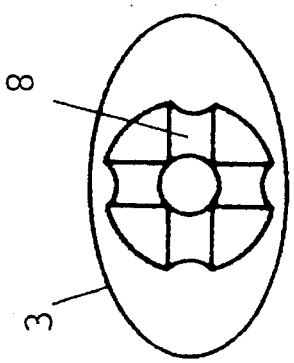
FIG.3-b
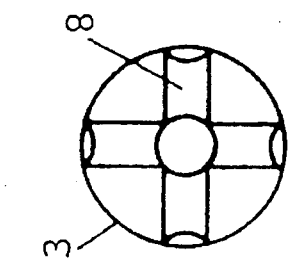
FIG.3-a

FIG. 11
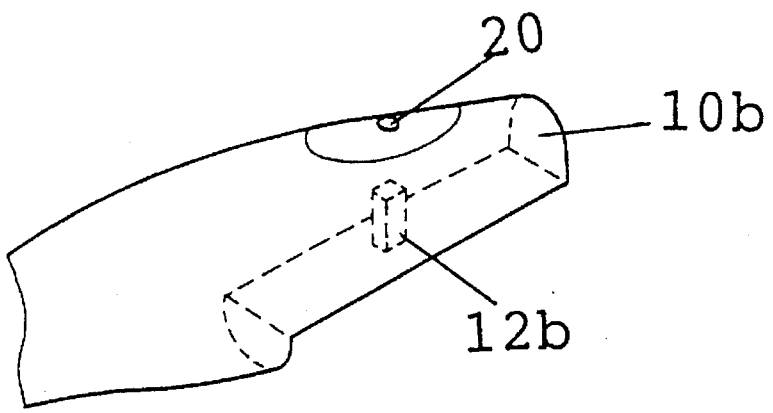
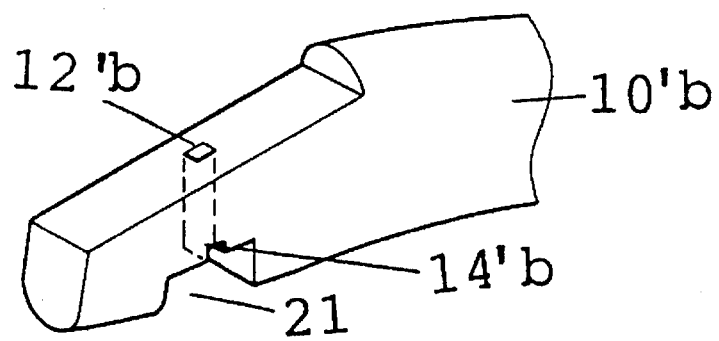
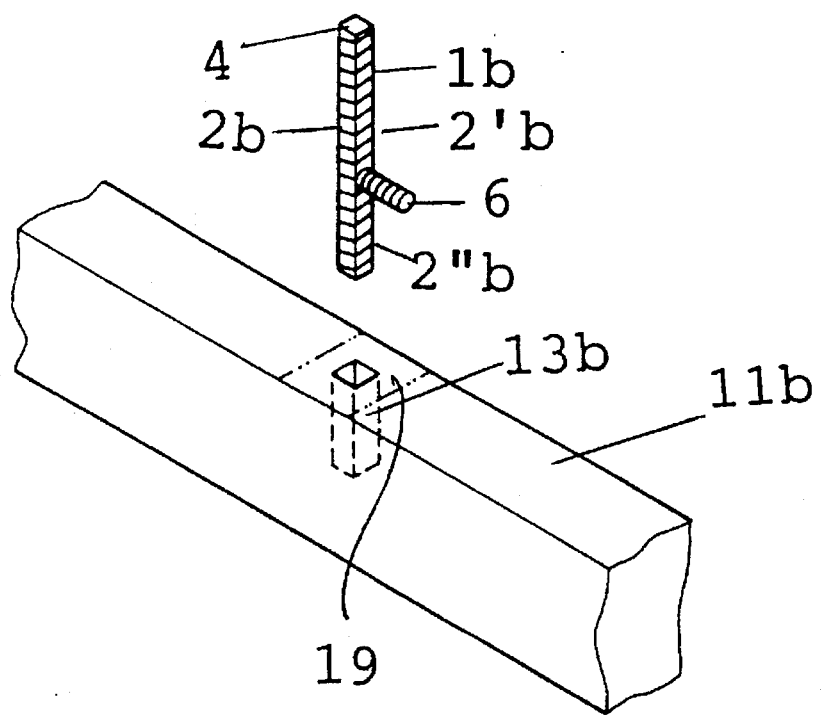

FIG.20-a
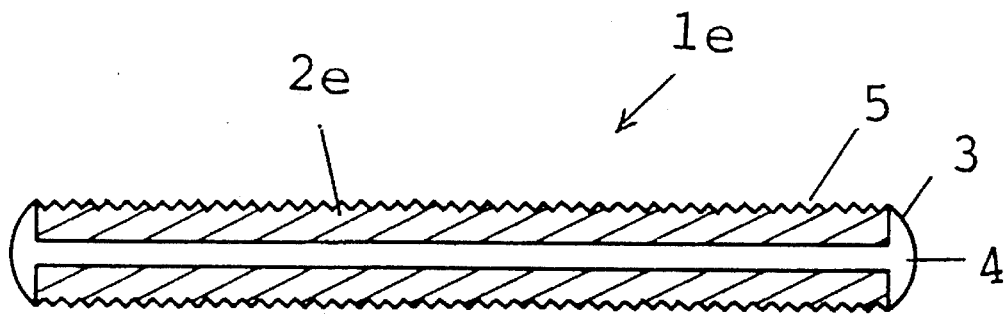
FIG.20-b
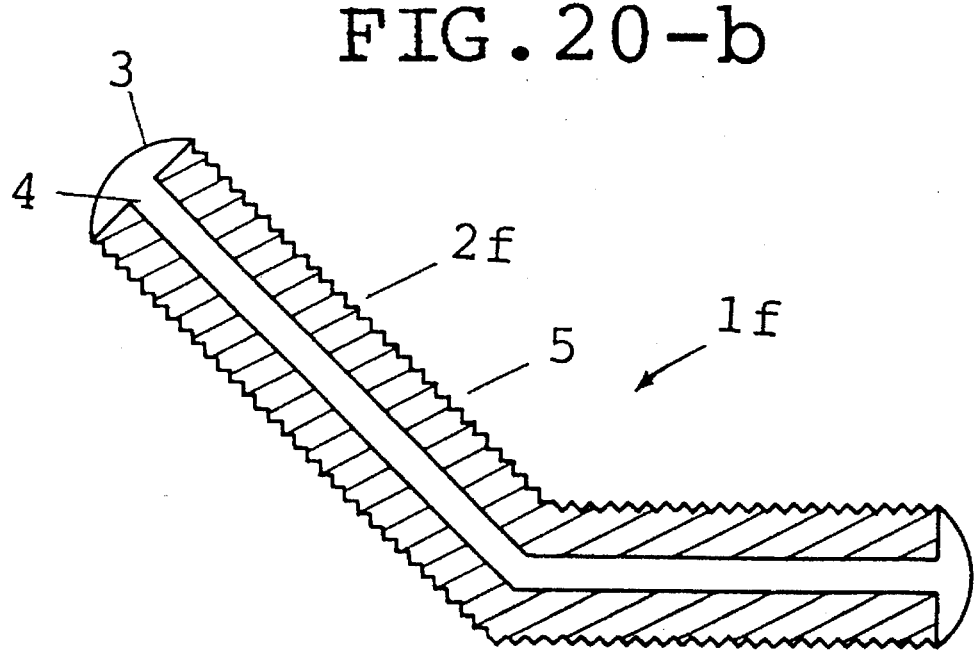

FIG.23
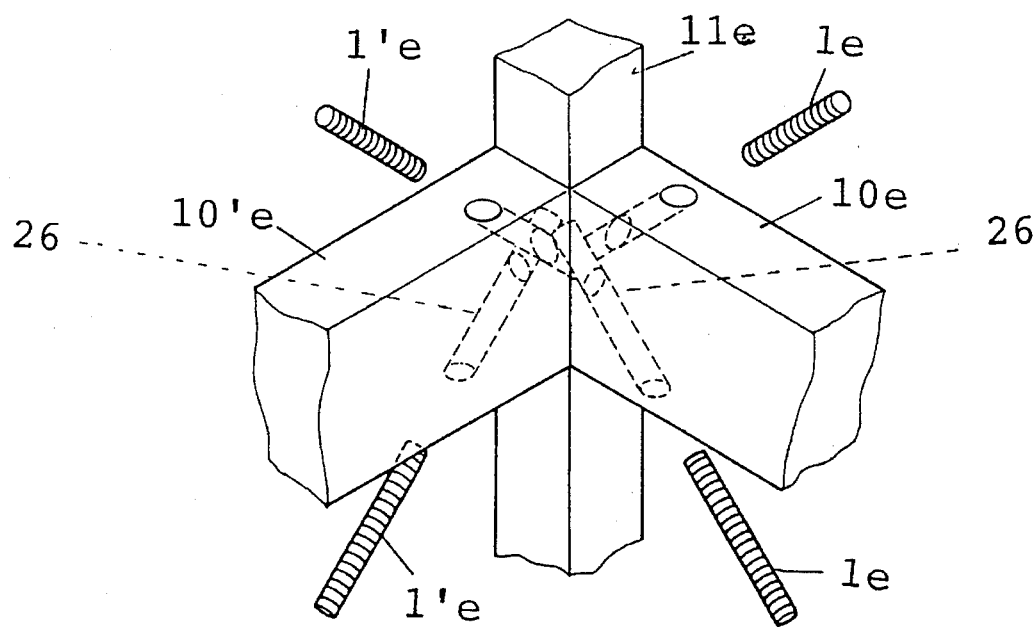
FIG.24-a  FIG.24-b
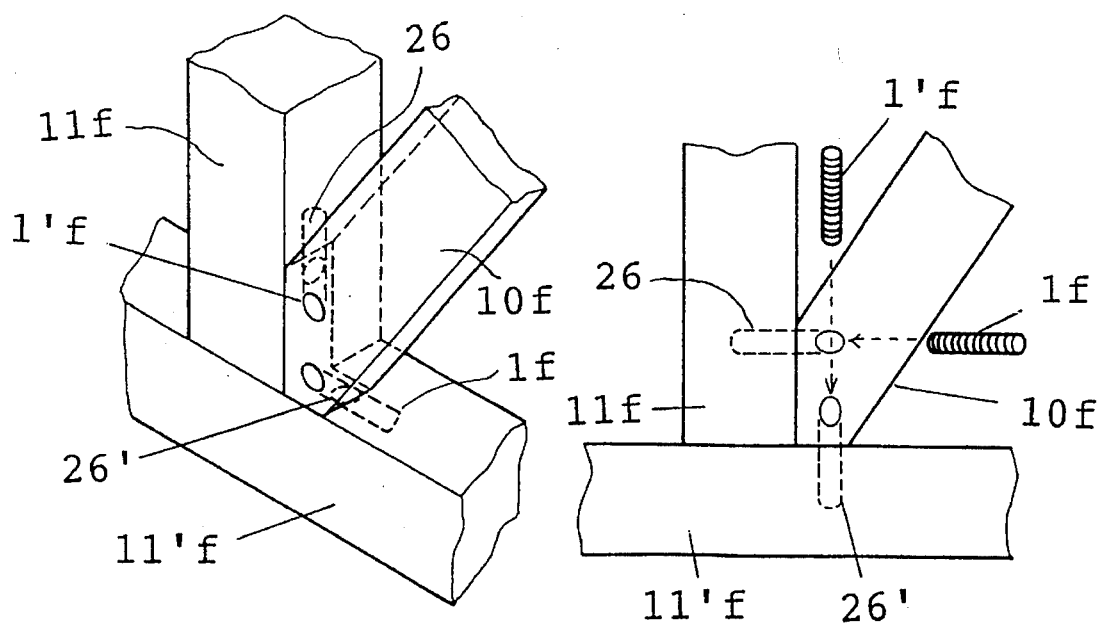

FIG.28-a
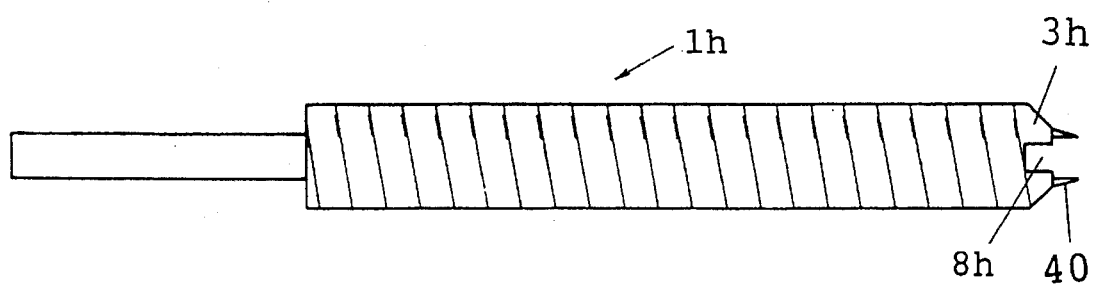
FIG.28-b
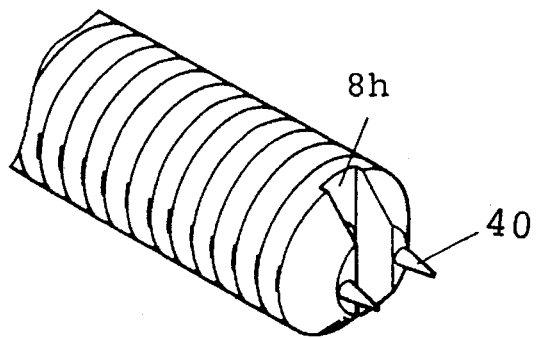

FIG.30-a
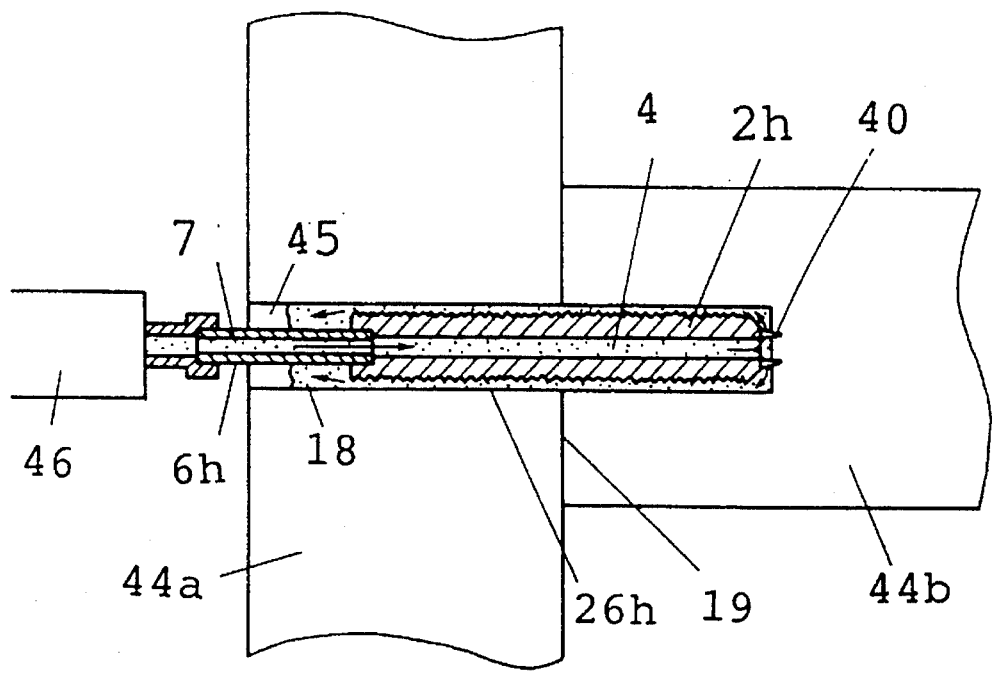
FIG.30-b
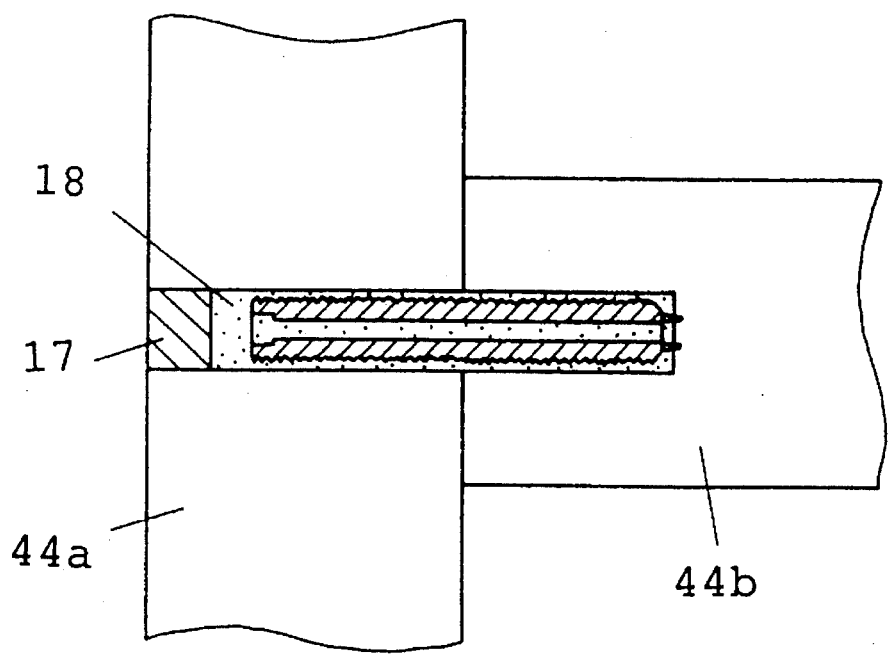

FIG.31-a
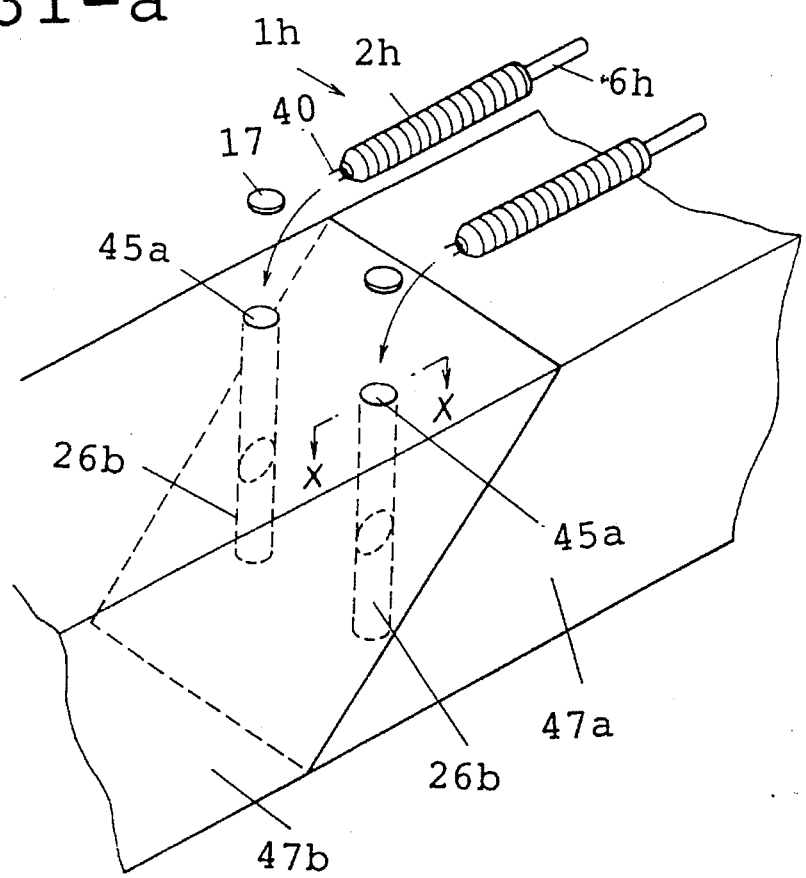
FIG.31-b
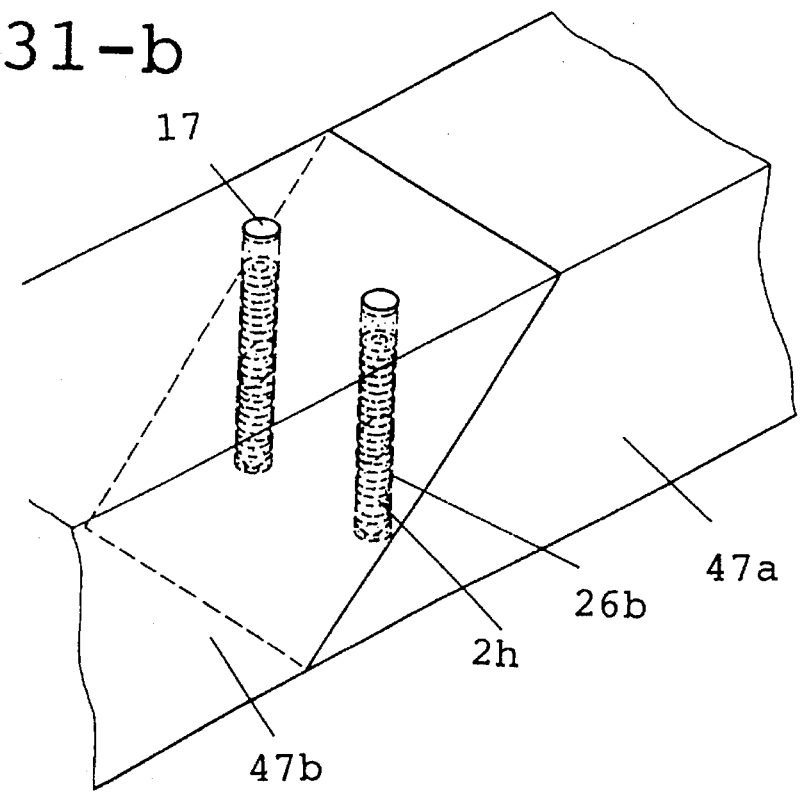

FIG.37-a
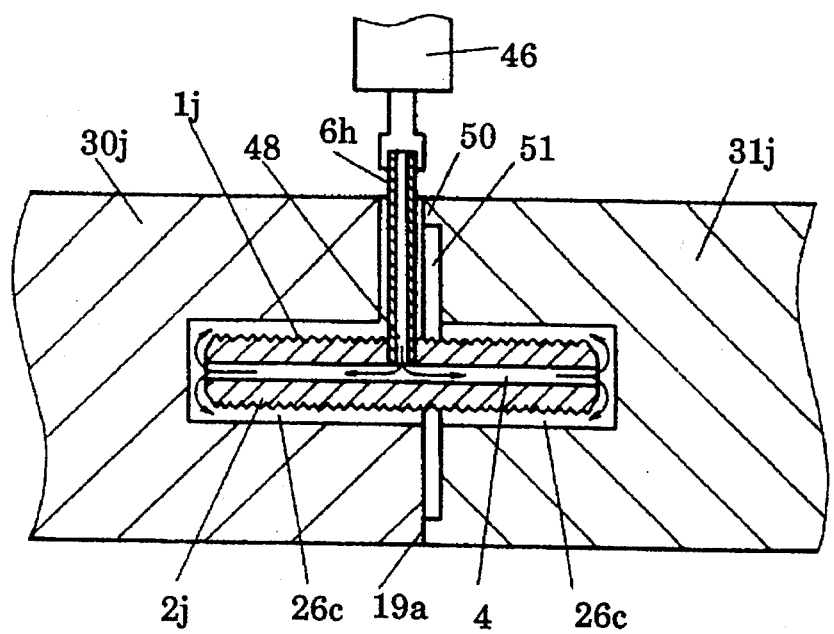
FIG.37-b
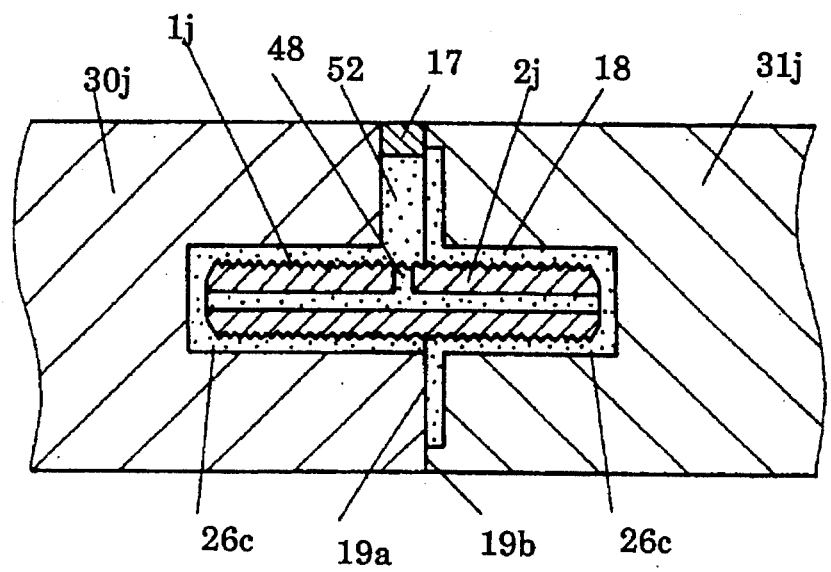

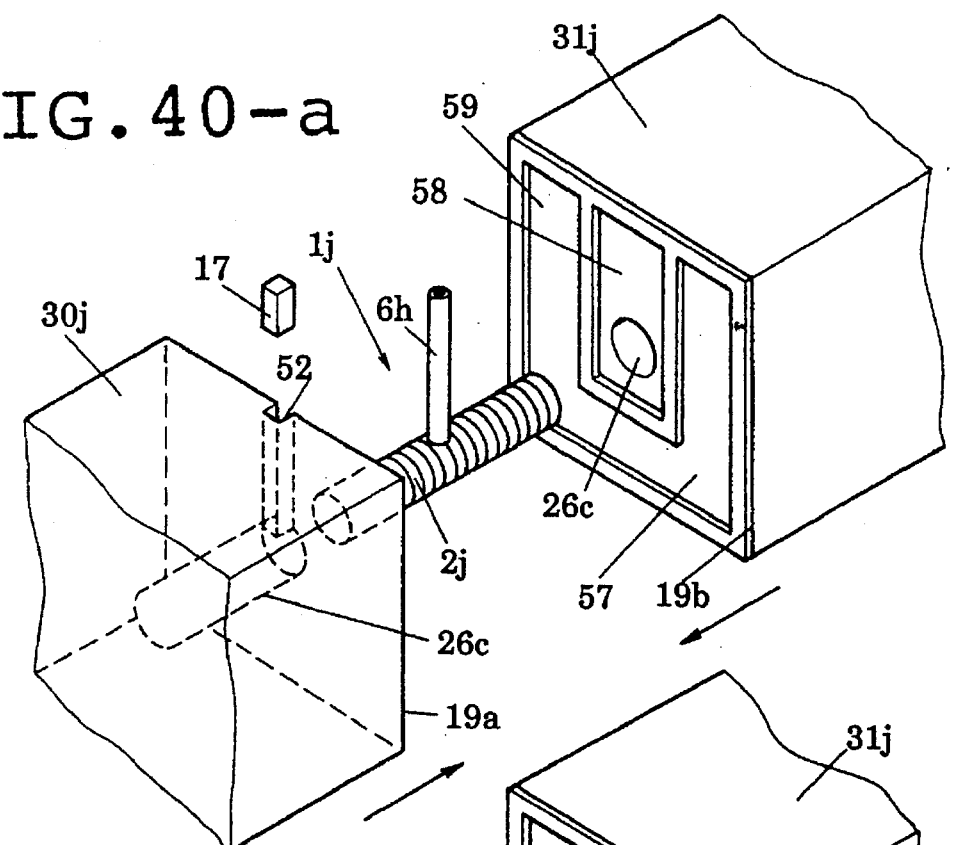
FIG.40-a
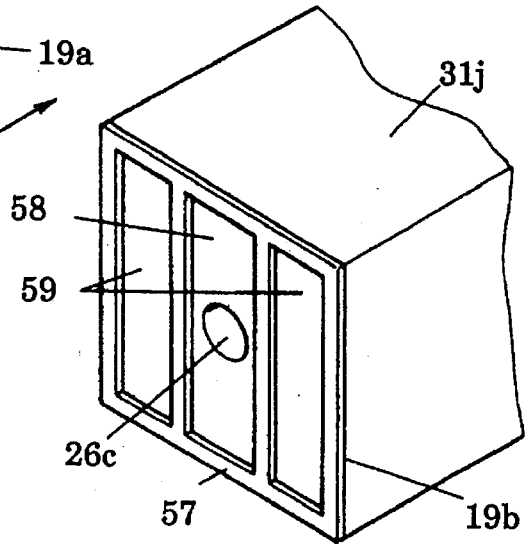
FIG.40-b
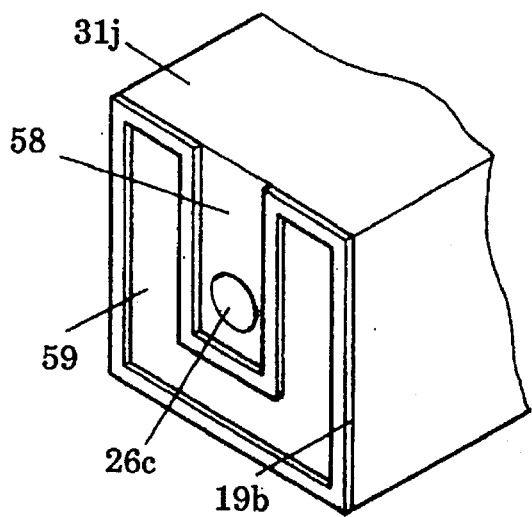
FIG.40-c

FIG.44-a
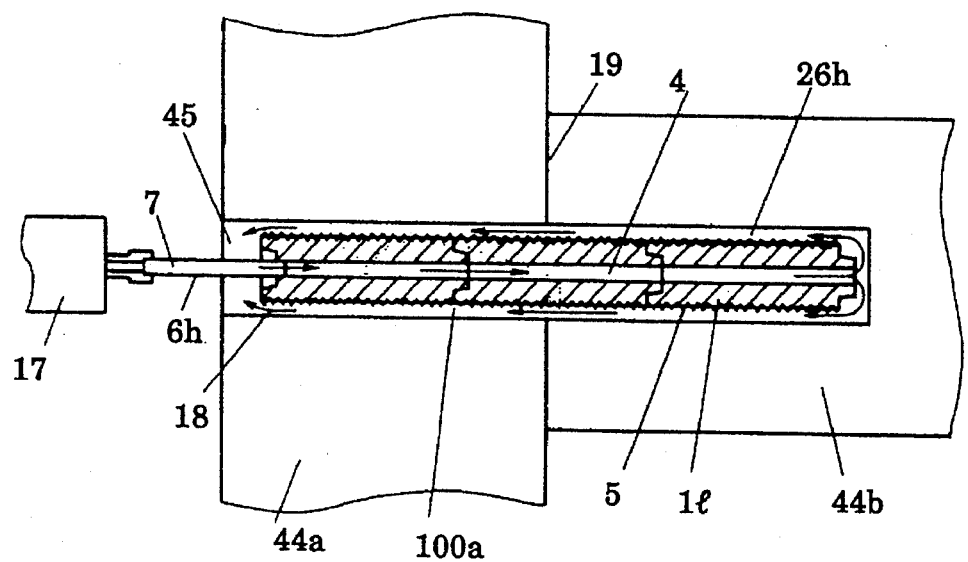
FIG.44-b
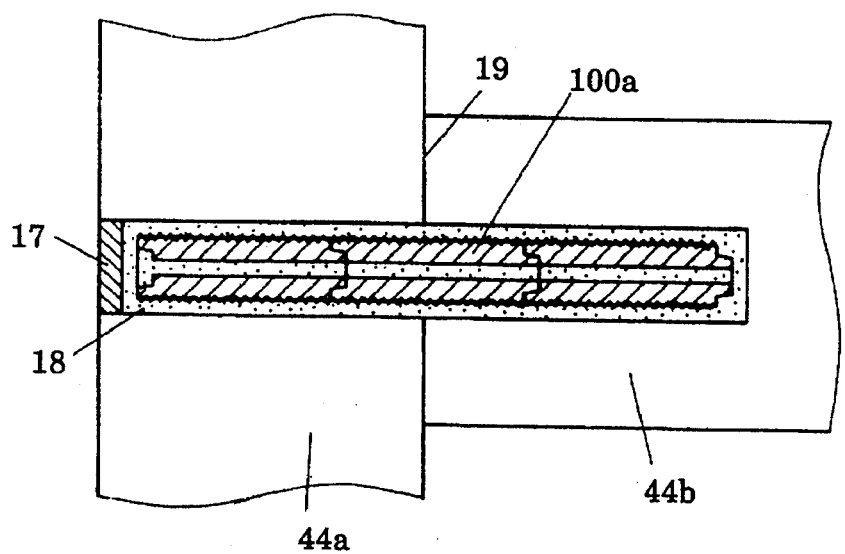

FIG.47-a
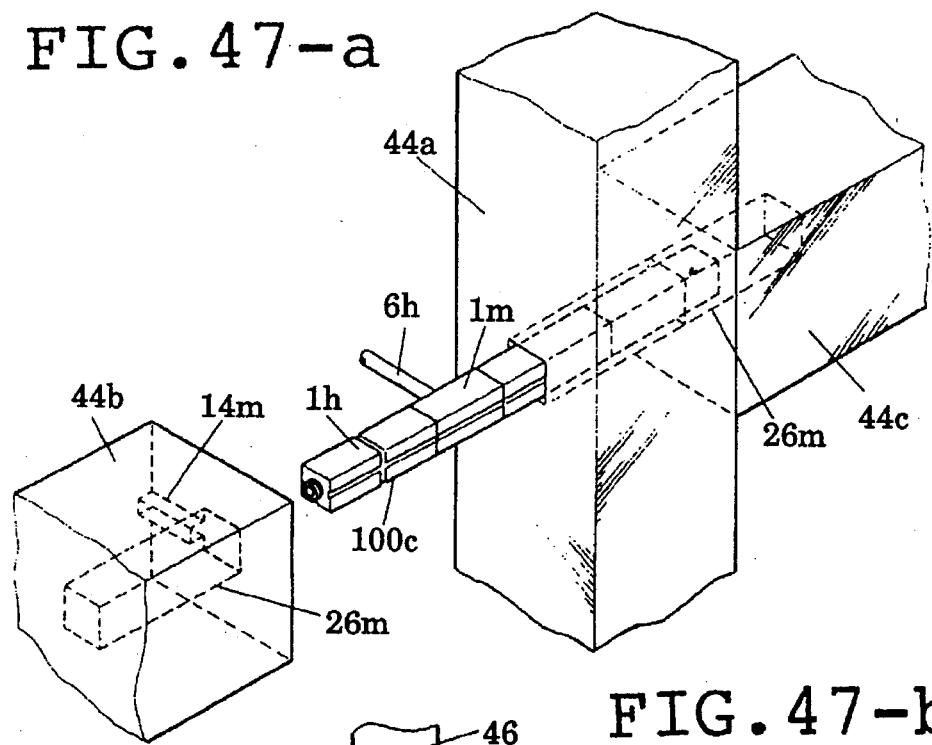
FIG.47-b
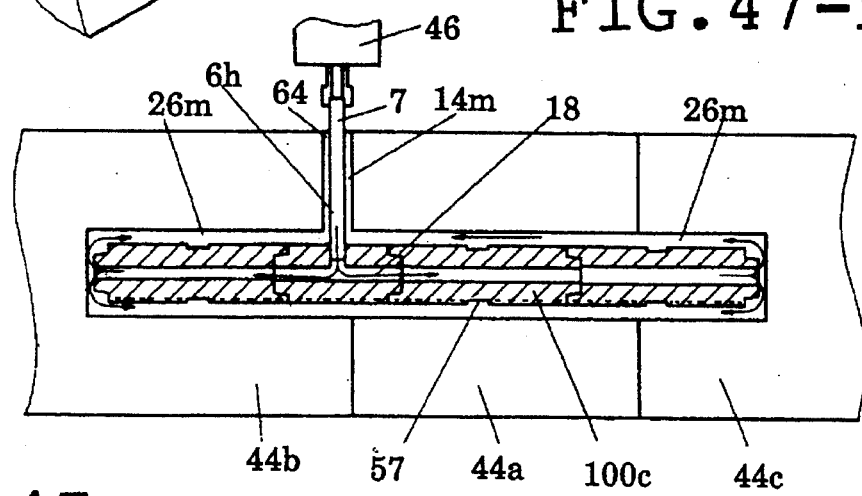
FIG.47-c
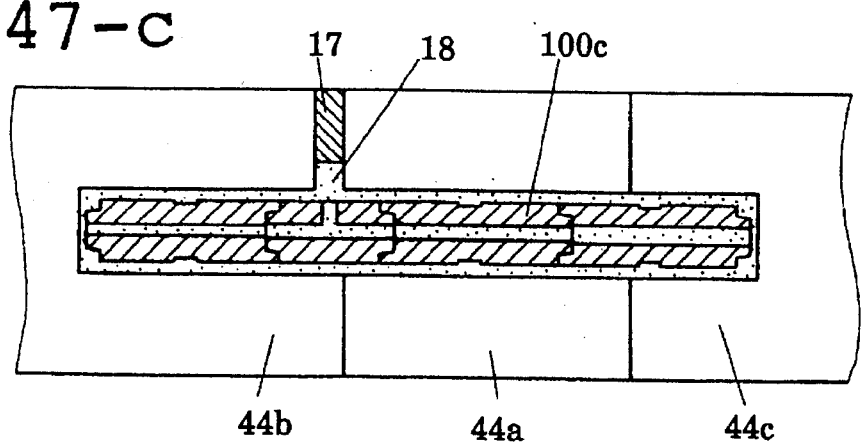

FIG.48-a
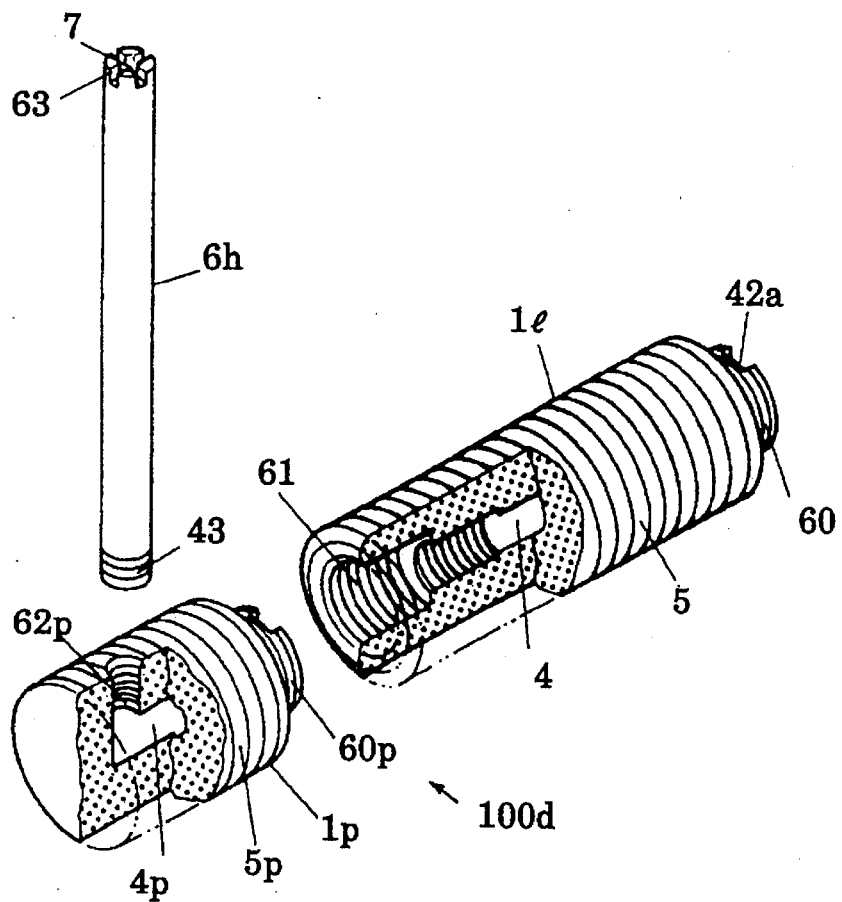
FIG.48-b
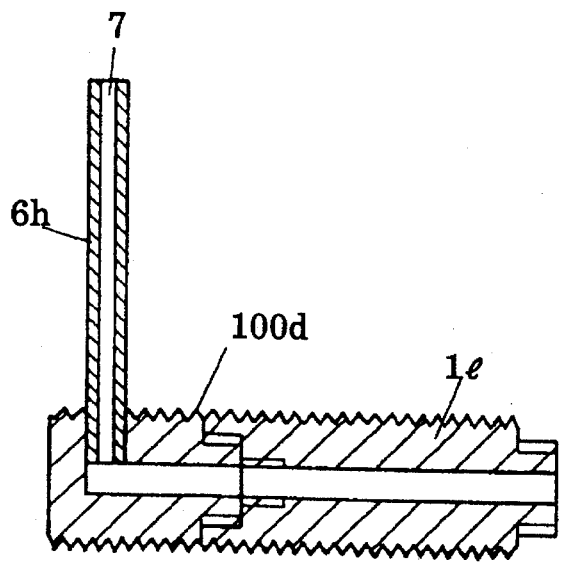

FIG.50-a
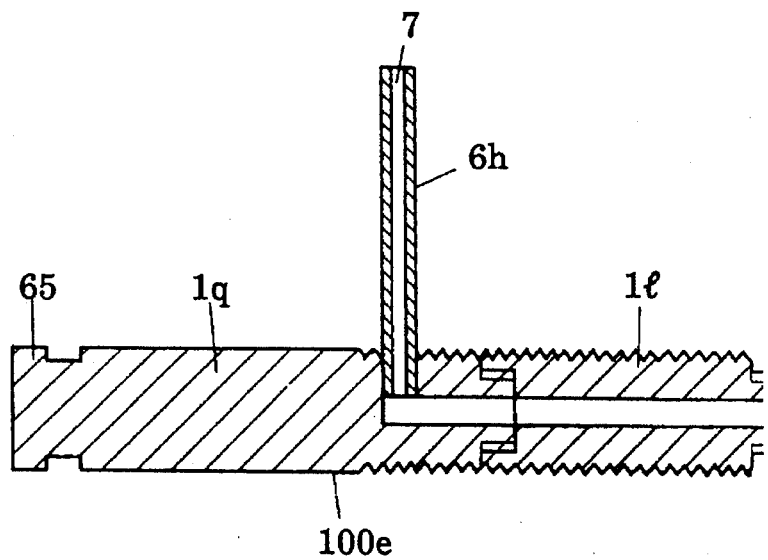
FIG.50-b
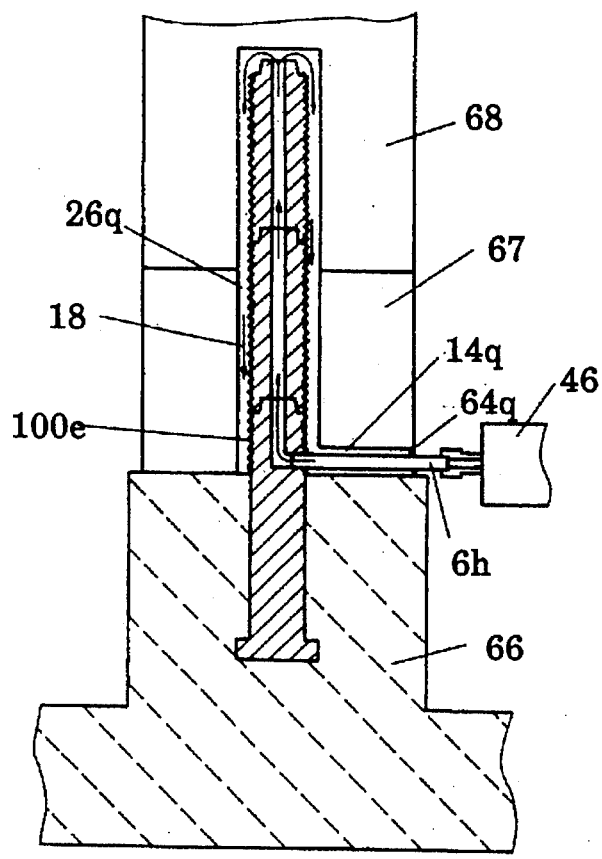

FIG.52
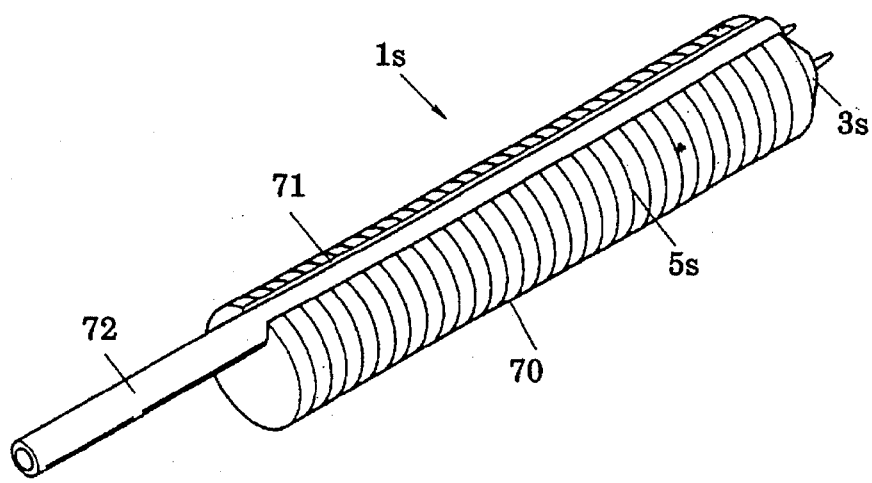
FIG.53-a
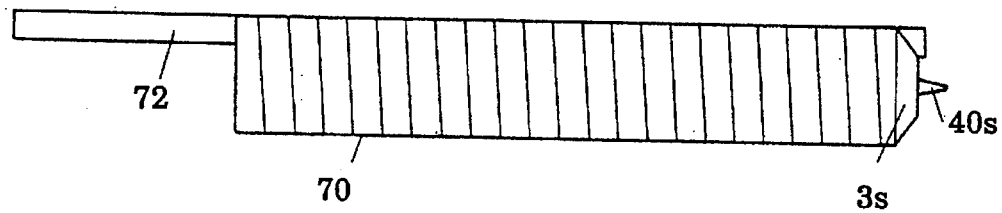
FIG.53-b
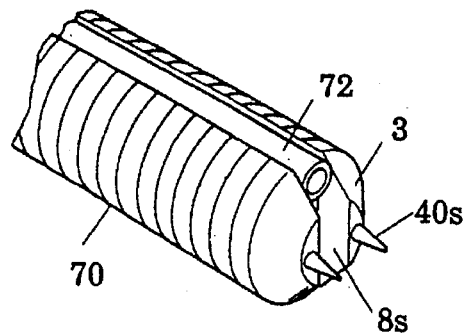

CONNECTOR, METHOD FOR CONNECTING STRUCTURAL MEMBERS WITH CONNECTOR AND CONNECTION STRUCTURE BETWEEN STRUCTURAL MEMBERS

BACKGROUND OF THE INVENTION

1. Field of the Invention

The present invention relates to a connector for connecting inter-woods or inter-laminated wood or inter-stones or connecting woods or laminated wood or stones or concretes, a method for connecting structural members of a wooden house using the connectors and framework structures of a large-sized wooden building having a heavy timber structure and the like, and a connection structure between the structural members.

2. Description of the Related Arts

In recent years, connecting method have been developed aimed at labor saving or streamlined processes for building of a dwelling house or the like and further aiming at a connection between a beam and a pole plate, a pole plate and a column, a body joint and an independent column and the like or a connection structure or a coupling structure and the like aiming at a streamlining of work.

For example, ① Jap. U.M. Laid-Open No. Sho 63-162008 discloses a framework fitting to be used in a wooden framework, ② Jap. U.M. Laid-Open No. Hei 2-93401 discloses a reinforcing fitting for a lower end of a column of a framework wooden building and a Connection part with a foundation of the building, ③ Jap. Pat. Laid-Open No Hei 3-295946 discloses a trap dowel fitting and a lathing structure of a framework wooden building using the dowel fitting, ④ Jap. Pat. Laid-Open No. Hei 2-300442 discloses a connection structure of wooden structural members in which the wooden framework is not disassembled after its connection. All these prior arts use fittings, bolts and nuts for connecting inter-structural members.

In addition, as connection part structures, Jap. Pat. Laid-Open Nos. Sho 63-14939, Sho 63-14940 and Sho 63-14941 disclose a connection part structure in a wooden framework aiming at improved structural strength of the connection part.

However, the aforesaid prior art connectors or connection part structures had problems in that their structures were complex and lacked operability due to the fact that bolts or nuts or washers had to be inserted and fixed during laminated wood and an excessive plurality of component parts were required. In addition, they had problems that their fittings were large in size, heavy in their weight and lacked convenient transport characteristics and further they were lacking in safety for working at a elevated locations due to the fact that physical strength such as bending, tention, compression or shearing and the like were required.

During the laminated wood, problems occurred in fixing the fitting and another problem was the troublesome operation of removing the fitting and rearranging it and at the same time another problem was that a cutting work was mistakenly carried out at the connecting surface to cause loss of a structural member such as wooden member. In addition, it had problems that installing a cylinder punched at a predetermined position or a plug member at a predetermined position and a threadable fitting of a bolt into a punched hole of the installed cylinder or the plug was difficult, their operability was inferior, a quite large number of working steps were required and the working period was extended.

The system in which the wooden members were fixed by bolts or nuts had problems that shrinkage of wooden members caused wooden members to loosen easily and also physical strength of the system to be decreased. In addition, problems occurred such that bolts or nuts or fittings and the like were oxidized by dew formation and the like to cause their strength to be decreased and at the same time some imported wooden members due to their storage in marine areas, caused the bolts or fittings and the like to be declayed by salt pollution, resulting in showing deterioration of their physical strength and durability.

In addition, problems occurred in disasters in that the outer connecting bolts or fittings were the first melt during a fire, their strength was insufficient and housing collapsed. In addition, the maximum disadvantage of a framework structure having wooden members therein was brittleness of the connecting parts. Although various kinds of connection parts or couplings were devised by carpenters in the past to retain their physical strength, almost all these structures had problems in that they were complex in structure, a large number of working steps were required and poor productivity resulted. In addition, problems occurred in insufficient production of wooden members having a large sectional area, their procurement was difficult and a wooden structure such as a beam of long span or the like could not be transported due to Road Traffic Control Law restrictions.

Further, in recent years, there have been developed connecting methods for connecting structural members or a connection structure in which a metallic connector is used in place of various kinds of prior art joints or coupling structures in wooden buildings so as to improve a operability during installation and a working time is shortened.

For example, Jap. Pat. Laid-Open No.Hei 3-5543 discloses a connecting method for members in a wooden structure which is superior in its operation and has high reliability in view of its structure in which a steel rod is inserted into each steel rod buried hole punched at each of the wooden members to be connected to each other, extending axially of the members, and opened at connecting end surfaces and an adhesive agent is filled in the burying holes, outer circumferences of the connecting surfaces of both wooden members are sealingly closed in advance, thereafter the adhesive agent is forcedly fed into the steel rod inserting holes and the adhesive agent is filled in a clearance between an inner circumferential surface of each of the burying holes and the steel rod and also the adhesive agent is charged in a clearance between the connecting surfaces of both wooden members and they are in close contact with each other.

However, the aforesaid prior art configuration has the following problems, i.e.

① opening of three holes for use in aeration of air and filling confirmation for one steel rod burying hole not visible to human eyes may reduce ease of operation, requires a strict forming angle of the buried hole and further accompanying a difficulty in performing the punching operation;

② the adhesive agent filled the clearance between the connecting surfaces sealingly closed at their circumferences when the adhesive agent is fed through a feeding hole flows into another burying hole-or accompanied with air from another burying hole or another feeding hole to cause nonuniform filling;

③ a solidification of sealing agent requires a long period, a pressurized feeding stage of the adhesive agent cannot be performed at once and it is a slow operation;

④ an independent column and a beam cannot be connected at their ends at particular sites and it lacks ease of operation; and ⑤ upon completion of the work, reinforcement work can not be carried out in view of its ease of operation process.

It is the first object of the present invention to provide a connector in which the conventional complex connection part or coupling structure is of quite simple structure, structural strength is improved together with adhesive agent, operability of connection part or coupling or connecting work is remarkably improved and the working period can be remarkably shortened; a method for connecting the structural members in which a working technology for the connection part, coupling or connecting operation is simplified by using the connector, the number of working steps is remarkably reduced and it has a superior productivity of a building and the like; and a connection structure between structural members which is superior in structural strength and provides improved strength during disasters.

The second object of the invention is to provide a connector in which an adhesive can be easily poured, removal of the connector is eliminated, executability is remarkably improved, productivity of buildings is enhanced and excellent disaster preventive effects are obtained and a method for connecting the structural members by using the connector.

It is the third object of the present invention to provide a connection structure between the structural members in which their-operability is superior at the time of the installation, there is no non-uniform filling, it has a superior connection strength and high reliability.

It is the fourth object of the present invention to provide a connector in which various kinds of removable connectors are connected, connectors having different lengths and shapes can be easily adjusted at site, their operability or operation process is remarkable improved, productivity is improved, a high connection strength is provided and the anti-disaster effect is superior.

In order to achieve the first object, the present invention comprises the following:

A connector in claim 1 is comprised of a straight or bent tubular member of which sectional shape is one of a circle, an ellipse or a polygon.

A connector in claim 2 as set forth in claim 1 is comprised of a surface of said tubular member formed with a projection.

A connector in claim 3 as set forth in claim 1 or claim 2 is comprised of a branch pipe of tubular member fixed to a hole punched at a predetermined longitudinal part of a circumferential wall of said tubular member and communicated up to said hollow part.

A connector in claim 4 as set forth in claim 3 is comprised of said hollow part closed at its end part or formed in solid state from a predetermined longitudinal part of the tubular member to one end thereof.

A method for connecting structural members in claim 5 is comprised of steps of punching each of a pair of holes forming connecting holes having the same diameter as or larger diameter than that of the connector as set forth in claim 1 or claim 2 at predetermined parts of abutting surfaces of a plurality of structural members composing laminated wood or wood or stone or concrete and the like, inserting the connector into each of holes punched at said step and abutting each of the structural members to each other, and feeding adhesive agent at one opening part of the hollow part of said connector inserted into the connecting hole abutting against each of the holes at said step, flowing out it at an opening of the other end and filling adhesive agent between the surface of said connector and a circumferential wall of said connecting hole.

A method for connecting structural members in claim 6 is comprised of the steps of punching each of a pair of holes forming a connecting hole of the same diameter as or larger diameter than that of a main body of said connector having a branch pipe as set forth in claim 3 or claim 4 at a predetermined part of an abutting surface of a plurality of structural members composed of laminated wood or wood or stone or concrete and the like, cutting a groove for installing the branch pipe at the abutting surface of at least one hole punched at said step, inserting the main body of the connector into each of the connecting holes punched at said step, installing the branch pipe at the groove, installing the connector having the branch pipe in the connecting hole between the structural members and abutting each of the structural members, feeding adhesive agent at an opening at an end part of the branch pipe, flowing out the adhesive agent from one or a plurality of ends of the hollow part of said connector and filling the adhesive agent at least between the surface of said connector and a circumferential wall of said connecting hole.

A connection structure between structural members in claim 7 is comprised of the connector as set forth in one of claims 1 to 4, a plurality of structural members composed of laminated wood or wood or stone or concrete and the like, grooves for installing the branch pipe formed by a pair or connecting holes at an abutting surface between said structural members and cutting the abutting surface as required, said connector inserted into said connecting holes or the groove, and adhesive agent fed from one end part of the hollow part of said connector or the opening part of the branch pipe, flowing out of one or a plurality of openings at the other end of the hollow part of the tubular member and substantially filled at least between the surface of said connector and a circumferential wall of said connecting hole.

A connection structure between structural members in claim 8 is comprised of a plurality of structural members composed of laminated wood or wood or stone or concrete and the like, the rod-like connector in which the hollow part of the tubular member inserted into the connecting hole is solid; and adhesive agent substantially filled between the circumferential wall of the connecting hole and the surface of the connector.

In order to achieve the second object, the present invention comprises the following:

A connector described in claim 9 comprises a tubular member having an engaging portion formed on at least one end of a hollow part, and a hollow branch pipe having an engaging portion formed on at least one end thereof, said engaging portion being detachably engaged with said engaging portion of said tubular member.

The connector described in claim 10 according to claim 9 comprises an arrangement wherein said tubular member is formed on the surface thereof with protruded portions or concave or convex parts, and/or said tubular member is provided with a projecting portion at an end thereof.

A connector described in claim 11 comprises a hole portion for a branch pipe bored in a predetermined portion in a longitudinal direction of a hollow tubular member so as to be communicated with said hollow part, an engaging portion formed in said hole portion for a branch pipe, and a hollow branch pipe having an engaging portion formed on at least one end thereof, said engaging portion being detachably engaged with the first mentioned engaging portion.

A connecting method for structural member described in claim 12 comprises the steps of: boring a connecting hole portion communicated from one structural member to the other structural member in a connecting portion between structural members of a building, inserting a connector comprised of a tubular member with which end is engaged a branch pipe into the connecting hole bored by said step, pouring an adhesive into said branch pipe of said connector inserted by said step until the adhesive flows back into an opening of said connecting hole, and as required, releasing the engagement between said branch pipe and said tubular member to remove said branch pipe.

A connecting method for structural member described in claim 13 comprises the steps of: boring a connecting hole portion for embedding a connector in a connecting portion between structural members, forming a cutting portion for mounting a branch pipe from an open end of at least one of the connecting hole portions bored by said step, bringing the structural member on which is mounted the connector having a branch pipe engaged with a predetermined portion of a tubular member into contact with the connecting hole portion bored by said step and the groove portion, pouring an adhesive into the branch pipe of said connector inserted by said step until the adhesive flows back into an opening of the groove portion for mounting the branch pipe, and as required, releasing the engagement of said branch pipe to remove said branch pipe.

The present invention accomplishing the third object is comprised of the following configurations.

The connection structure between the structural members as set forth in claim 14 is comprised of an adhesive agent accumulation part formed between the connecting surfaces of building materials such as wooden members, connecting holes of the connector formed to be communicated with each of the connecting surfaces, an air discharge part formed at either one or both of the connecting surfaces from an end part of the connecting hole to an outside part of the building material, the connector buried in the connecting hole and adhesive agent filled in the adhesive agent accumulating part and in the connecting holes.

The connection structure between the structural members as set forth in claim 15 is formed with a grooved seal having a groove for use in forming an air discharge part where the adhesive agent accumulation part as in claim 14 adheres to an outer circumference of one of the connecting surfaces of the building materials.

The connection structure between the structural members as set forth in claim 16 is constructed such that the adhesive agent accumulating part and the air discharge part are formed by being scooped out except for the outer circumference of the connecting surface of one of the building members in claim 14.

The connection structure between the structural members as set forth in claim 17 is constructed such that the adhesive agent accumulation part in claim 4 is comprised of a groove formed near an outer circumference of a connecting surface of each of the building members and a seal member fitted to the groove.

The connection structure between the structural members as set forth in claim 18 is constructed such that the adhesive agent accumulating part in any one of claim 14 or 15 or 17 is firmed by an edging work except the outer circumference of the connecting surface of one of the building materials.

The connection structure between the structural members as set forth in claim 19 is comprised of a connecting hole of a connector formed through each of connecting surfaces of a building material such as a wooden material and the like, the air discharge part formed at one of the connecting surfaces from an end part of the connecting hole toward an outside part of the building material, a connector buried in the connecting hole, the adhesive agent accumulation part formed between the connecting hole and the connecting surface around the air discharge part, an adhesive agent application part formed between the adhesive agent accumulation part and the connecting surface except for the outer circumference of the connecting surface, and adhesive agent fed to and fixed to the connecting holes and the adhesive agent accumulation part.

The present invention accomplishing the fourth object is comprised of the following components.

The connector described in claim 20 is made such that at least one end of a tubular member is formed with a concave and/or convex end engaging part removably connecting with another connector.

The connector described in claim 21 is made such that in claim 20 it has a hollow part formed in a longitudinal central part of a section of the tubular member and opened at at least one end of the tubular member.

The connector described in claim 22 is made such that there is provided a wall engaging part or a branch pipe engaging part communicated up to a hollow part and punched at a predetermined part in a longitudinal direction of a circumferential wall of the tubular member in claim 21, removably connecting to the other connector or hollow branch pipe and communicating with the hollow part.

The connector described in claim 23 is made such that an end part engaging part of at least one end of the hollow part in claim 21 is formed with an engaging part for a branch pipe for removably engaging with the hollow branch pipe.

The connector described in claim 24 is made such that the engaging part for the branch pipe is coaxially in a step-wise manner or in a substantial frustum of a circular cone within the end part engaging part and/or the wall surface engaging part in any one of claims 21 to 23.

The connector described in claim 25 is made such that a surface of the tubular member is formed with a projection or a concave or a convex part in any one of claims 20 to 24.

The connector described in claim 26 is made such that the branch pipe is fixed to the engaging part for the branch pipe in any one of claims 22 and 23.

The connector described in claim 27 is made such that a plurality of connectors in claims 20 to 25 are connected by the end part engaging part and/or the wall surface engaging part.

The connector described in claim 28 is made such that the branch pipe is fixed to the engaging part for the branch pipe of the connector in claim 27.

It is the fifth object of the present invention to provide a connector having a simple structure which is suitable for a mass production at a low cost and capable of attaining a remarkable workability, a remarkable shortened working period and further a remarkable shortened number of manufacturing steps.

The present invention accomplishing the fifth object is comprised of the following components.

A connector in claim 29 comprises a tubular member having a concave part of which sectional shape is circle, ellipse or polygon and formed at an outer circumference thereof in a longitudinal direction from one end or a predetermined part near it to the other end or to a predetermined part near it; and a pipe-like part fitted to the concave part of the tubular member with one end thereof being opened at the end part or a predetermined part near it of the tubular member and the other end thereof being extended from the other end of the tubular member or a predetermined part thereof.

A connector in claim 30 as set forth in claim 29 comprises a pipe-like branch pipe removably inserted into one opening of said pipe-like part.

A connector in claim 31 comprises a tubular member having a concave part of which sectional shape is circle, ellipse or polygon and formed from an outer circumferential end part in a longitudinal direction or a predetermined part near it to the other end thereof or a predetermined part near it, a pipe-like part fitted to the concave part; and a pipe-like branch pipe removably inserted into holes punched at a predetermined part in a longitudinal direction of the pipe-like part or integrally formed at a predetermined part in T-shape form.

A connector in claim 32 as set forth in any one of claims 29 to 31 in which a side surface of at least one end of the tubular member is formed with an adhesive agent guiding groove.

A connector in claim 33 as set forth in any one of claims 29 to 32 comprises an adhesive agent guiding groove of the tubular member communicated with the concave part and an opening of at least one end of the pipe-like part opened at the adhesive agent guiding groove.

A connector in claim 34 as set forth in any one of claims 29 to 33 in which the pipe-like part fitted to the concave part of the tubular member is fixed to the tubular member by welding or with adhesive agent.

A connector in claim 35 as set forth in any of claims 29 to 33 comprises a pipe-like part fitted to the concave part of the tubular member fixed by a metallic wire such as a stainless steel wire or a synthetic resin rope-like material made of nylon fiber or the like.

A connector in claim 36 as set forth in any of claims 29 to 35 comprises an outer circumferential surface of the tubular member formed with a helical projecting stripe or a helical projecting ridge or a concave or convex part.

In this case, the tubular member for the connector is comprised of metal such as iron or molded by organic fibers, non-organic fibers such as carbon fibers, boron fibers, glass fibers and metallic fibers or ceramics using cement and its complex materials or the like of which sectional shape is circle, ellipse or polygons such as triangle, square, hexagon or the like and is formed linearly, ←-shape or arcular shape. A hollow part for use in flowing in adhesive agent is formed from an end part to an end part in a longitudinal direction of a substantial central part in section or formed from an end part to a branch pipe hole. It is preferable that a diameter of the hollow part is formed to be small enough not to prevent a flowing-in of the adhesive agnet. This is formed for aiming at no-decreasing of mechanical strengths such as shearing force or bending stress and the like.

The projection (a projecting part or a concave or convex part) formed at an outer surface of the connector is comprised of a random formation or a helical formation of concave or convex parts of continuous projection or non-continuous projection and it is preferable that the projection may function as a buffer for adhesive agent flowing out of the other end of the connector, the adhesive agent is filled between the outer surface of the connector and the circumferential wall of the connecting hole of the structural member so as to expand an adhering area and also the projection is formed in such a shape as one providing an anchoring effect. One or a plurality of projections may be formed or may not be formed at an end part of the tubular member or the branch pipe where the adhesive agent turns back in response to the operating place or application or the kind of adhesive agent (having a high viscosity). Width or depth of the concave or convex part projection such as a helical groove or the like may be varied in response to viscosity of the adhesive agent. One end part of the connector may solid in response to the connecting structure between the structural members. The connector may be formed in the same diameter or different diameter.

A shape of an end part of the connector may be of a bulged shape, a flat shape or a concave shape, although it is efficient for it to be properly applied in response to the type of application or kind of structural member. For example, wooden tips or the like around a circumferential wall within the punched connecting hole can be pressed with the bulged-out end between the wooden members or laminated wood and further inserted and in the case of concrete or stone material, the connector having an end shape formed into a concave part can be inserted while the convex part in the hole is being crushed and a flat-shaped connector is preferably used for the connecting hole finished into a mirror surface. If a guiding part such as a guiding groove for use in guiding the fed adhesive agent towards the outer surface is formed at the surface of the end part, the adhesive agent can be smoothly guided between the surface of the connector and the circumferential wall of the connecting hole so as to improve the operation of feeding the adhesive agent.

The branch pipe is formed by a tubular member, made of the same material as that of the connector or different material and the branch pipe is fixed or engaged in such a way that the hollow part of the tubular member and its hollow part are communicated to each other. The diameter of the branch pipe is substantially the same or smaller or larger as or than that of the tubular member. The fixing or engaging method is carried out such that the branch pipe fixing part or the engaging part and the fixing part of the connector are formed with threaded holes to make their threaded engagements or formed with-fitting parts to make a fitted part or they may be fixed by welding or the like. In the case that the branch pipe is molded by fiber-reinforced synthetic resin, it may be formed as an integral product.

Forming of the branch pipe enables smooth feeding of adhesive agent into the connector in response to its operating place. In the case that the branch pipe is used in a connecting place for a truss structure having more than three connecting holes, it may be formed as part of the connector.

Although the hollow part of the connector is preferably finished with a mirror surface in order to reduce the flow resistance of the adhesive agent, its mirror surface is not needed when viscosity of the adhesive agent is low. The tubular member and the hollow part of the connector are preferably set to satisfy a relation of $$r \leq R \sqrt{1 - 0.0165\, l/R}$$

in the case that the connector is of metal, where l is a length of the connector, R is a radius of the tubular member and r is a radius of the hollow part. This is set to perform a smooth feeding operation of the adhesive agent and to prevent breakage of the connecting part from being generated in the connector. As an adhesive agent, it is properly selected in response to the kind of structural members such as a wooden member to a wooden member, laminated wood to laminated wood, a stone member to a stone member, a concrete structure, a stone member to a concrete structure or the like. As a practical example, organic adhesive agent such as epoxy or polyurethane or nonorganic adhesive agent such as mortar is used. It is preferable to feed the adhesive agent in double-stage feeding or a pressure feeding for wooden materials or laminated wood or a concrete structure. This work is carried out to prevent the adhesive agent from being absorbed, be lacking in amount and having its adhering force, reduced in response to the kind of wooden material (laminated wood) or concrete.

As the structural members, wooden members such as square timber or laminated wood of materials or laminated plate, stone material such as stone columns or concrete columns, beams, walls and the like are used.

One or a plurality of connecting holes are punched at an abutting surface between a plurality of structural members in compliance with a shape of the connector, the diameter of the connecting hole is preferable to be approximately the same or slightly larger than the maximum diameter of the tubular member and its depth is formed at least slightly deeper than the length of the connector to be stored. This is to facilitate a flow of adhesive agent between the connector and the circumferential wall of the connecting hole. The connecting hole or the cutting part may be formed at the site by a drilling or a cutting operation or pre-cutting at the factory. The connecting hole is formed in a substantial vertical, a slant, a slant crossing or in a parallel form against the abutting surface according to the installing location. Applying adhesive agent around the connecting hole is preferable for further improving structural strength. Upon completion of feeding of the adhesive agent into the connecting hole, the hole is covered by a plug or a wooden dowel and the like to make a flush surface or by repairing with putty to obtain a clean finished surface.

In the tubular member having a hole portion for a branch pipe at a longitudinal predetermined portion, the diameter of the hollow part may be changed before or behind the hole portion for the branch pipe. In the tubular member which has substantially the same length on the left and right sides about the hole portion for the branch pipe, the back flow is concurrent since the flow velocity of the adhesive is substantially the same and therefore the diameter of the hollow part may be the same. However, in the case where lengths thereof are different, it is necessary to make the diameter of the longer tubular member large while making that of the shorter tubular member small, to change the flow velocity of the adhesive to make the timing of the back flow the same.

As the projection at a flowing-out end of the tubular member, one for preventing rotation of the tubular member abutting against the bottom part of the connecting hole may be applied and more practically one having an acute leading end may be applied. For example, the end part may be formed into an acute angle or a projection may be separately arranged. The projection may be arranged at the anchor part. Piercing of the projection at the bottom part of the connecting hole enables the connector to be fixed and also to prevent the connector from being rotated when the engagement of the branch pipe is disengaged and the branch pipe is pulled out of the hole for the branch pipe and to prevent the projection from being pulled out together with the branch pipe, resulting in that reliability and operability of the projection can be improved. The branch pipe is pulled out by releasing the engagement with the tubular member after feeding the adhesive agent and in the case that the length of the branch pipe is short and there is no trouble when a plug is inserted, the branch pipe may be left without releasing the engaged state.

As the adhesive agent accumulation part, it may be formed by a seal member arranged between the connecting surfaces, a grooved seal member or a concave part formed by scooping out work at one of the connecting surfaces or a groove formed by edging work. A space between the connecting surfaces of each of the structural members forming the adhesive agent accumulation part is 0.01 to several millimeters, preferably 0.1 to several millimeters and it is properly selected in response to the size of the building material or its place of use.

The part for adhesive agent coating is coated with a thickness of 0.1 to several millimeters in response to the viscosity of adhesive agent. Coating of the adhesive agent enables a connection strength at the connecting surface to be remarkably improved. In particular, in the case that a plurality of connecting holes are formed at the same connecting surface and the viscosity of the adhesive agent is high and the adhesive agent is easily dried, the adhesive agent that has overflown at the connecting surface during its feeding operation enters the other connecting hole and this is effective in the case that the air discharging in the system or an outflow of adhesive agent during the feeding of the adhesive agent is not easily prohibited.

The end part of the connector or the enaging part of the wall surface may be of either convex or concave shape, one or a plurality of connectors are connected in response to size, shape, combination of the structural members to be connected or the required strength of the connecting location so as to receive connectors having different lengths or different shapes, wherein in the case that a plurality of connectors are connected, the hollow parts between the connectors may be formed to be communicated with each other. All of the connectors or one end of the connector may be solid in response to the connecting structure between the structural members. One end of the connector may be solid in respone to the connecting structure between the structural members or either the entire or one end of the connector may be solid in response to the connecting structure between the structural members.

A plurality of wall surface engaging parts punched to be communicated with the hollow part of the connector may be formed at longitudinal predetermined parts of the connector. The plurality of wall surface engaging parts are connected to the other connector, thereby a connector for a complex shape as found in a truss structure can be attained.

The branch pipe may commonly have an end part engaging part for connecting the connectors to each other or the wall surface engaging part and further the branch pipe engaging part for use in engaging with the branch pipe may be separately arranged.

The engaging method for connecting the connectors to each other is carried out by forming the threaded holes in the end part engaging part or the branch pipe engaging part, threadably engaging them or forming the fitted parts and they are then fitted to each other and engaged to each other. In particular, in the case that the engaging units are threadably engaged to each other, the engaging parts are tapered to prevent the adhesive agent from leaking out and it is preferable to enforce the connecting strength through this formation.

In the case that the connectors of the same number as that of the right and left sides of the other connectors are connected to the latter connectors having the branch pipe engaging parts at the longitudinal predetermined parts of the tubular members, flow speed of adhesive agents flowing at the hollow parts of the connectors are approximately equal to each other which cause their return flows to be concurrently generated and the diameters of the hollow parts in the right and left connected connectors may be the same as each other. However, in the case that the lengths of the branch pipes are different from each other, the diameter of the longer connector is required to be large and the other diameter of the shorter connector is made small in order to change the flow speeds of the adhesive agents and the timing of the return back-flow is required to be the same for both branch pipes.

The rod member of the connector is, similar to the tubular member, composed of metallic material or a complex material of organic or non-organic fibers having as its sectional shape a substantial circle, a substantial ellipse, wherein a concave part is formed at a substantial central part thereof in a longitudinal direction from its end part or its near predetermined part to its end part or from its end part to its near predetermined part. In addition, the rod member may be formed in the same diameter or different diameter. The end part of the rod member may be formed with a connecting part such as a threaded engaging means or the like, a plurality of rod members may be connected in such a length as one corresponding to a working site so as to make the tubular member having a predetermined length.

It is preferable that an outer surface of the rod member may also be formed with a continuous projecting ridge or a non-continuous projecting ridge the like to act as a buffer.

Although a shape of a side surface of at least one end of the tubular member may be a bulged-out shape, a flat shape or a concave shape, it is efficient if its shape is properly and selectively applied in response to its application or the type of structural member.

A sectional shape of the concave part formed in a longitudinal direction of the outer surface of the rod member is a V-shape, a U-shape, a semi-circle or a rectangular shape or the like which is properly selected in compliance with a shape of the pipe part to be fitted. A depth of the concave part is properly selected in response to the type or size of the rod member or a shape of the pipe-like part.

In the case that the end part of the rod member is formed with a guiding part for use in guiding the adhesive agent fed thereto toward the outer surface, the adhesive agent can be smoothly guided between the surface of the tubular member and the circumferential wall of the connecting hole, resulting in that the feeding operation of the adhesive agent can be improved.

When the flowing-out part of the adhesive agent at the rod member is formed with a projecting part of acute angle, the connector is inserted into the connecting holes and the projecting part is pierced into the bottom part of the connecting hole, thereby a rotation of the rod member can be prevented. In particular, when an engagement of the branch pipe is released and the branch pipe is pulled out of the opening part of the pipe-like part, the connector can be prevented from being rotated or the rod member can be prevented from being pulled out together with the branch pipe so as to enable reliability and workability to be improved.

The pipe-like part or the branch pipe is composed of a tubular item and is formed of the same material quality as that of the rod member. It is preferable that the pipe-like part or the branch pipe can be cut at the site so as to enable its length to be adjusted if it is made of synthetic resin or thin metallic material. A shape of the pipe-like part or the branch pipe has a round sectional shape, a polygon sectional shape such as a triangle or a square, and a dome-like shape. A method for engaging the pipe-like part with the branch pipe may be carried out by forming some threaded holes at the engaging part of the pipe-like part and the engagement part of the branch pipe so as to make their threaded connection or by forming the fitted parts and engaging them through their fitting.

Forming the branch pipe enables a smooth feeding of the adhesive agent into the connector to be performed in response to the working site. After feeding the adhesive agent, the branch pipe may be pulled out by releasing the engagement with the rod member or if there is no trouble in the case that the length of the branch pipe is short and that the plug is set, the branch pipe may be left as it is.

Since the outer surface of the rod member is merely formed with a concave part for an abutment or fitting of the pipe-like part, the connector can be quite easily made. In addition, since the pipe-like part corresponding to the connecting location can be selected, the workability and a freedom of work can be improved or expanded. In addition, the pipe-like part can be properly selected in response to the shape of the concave part or the kind of adhesive agent.

With the aforesaid arrangement, since the connector made of metal or the like is buried and fixed at the connection part between the structural members, it is possible to make a remarkable improvement in strength against bending, tensile, compression, shearing and the like. Further, it is possible to change some features of the connector such as type, diameter, length and number in response to its strength required at the connecting location. Although the adhesive agent has a disadvantage that it is fragile in general against a peeling-off power, it is possible to make a substantial improvement in the connecting power by forming the connecting holes into slant or slant crossed states against a stress acting between the structural members. Since the connecting hole is filled with the connector and the adhesive agent around its outer circumference, mechanical strength against bending stress can be improved and at the same time the connector is covered by the adhesive agent, with the result it is possible to prevent the connector from being oxidized dew formation or being made brittle by salt corrosion.

It is possible to perform a reinforcement having a high withstand force under a simple operation through formation of the connecting hole at a repairing location with a drill and the like in the repairing of an existing wooden building, inserting of adhesive agent into the hole and feeding of the adhesive agent.

Since the connecting method is merely carried out by forming the connecting hole and groove at the abutting surface of each of the structural members and the connector is inserted and buried therein and after that the adhesive agent is merely fed into the communication hole, the result is that the working steps can be quite simplified and the number of working steps reduced.

Since complex fitting operations having many component parts are not used, it is possible to prevent damage and loss of material caused by errors in fitting.

In addition, the connector is buried in the wooden members, with the result that internal parts are protected against fire with a carbonized film on the surface of the wooden members the connector is prevented from being melted down, further a structural strength is retained, buildings may not be destroyed and safety characteristics improved.

In addition, it is possible to eliminate nonuniform filling due to the fact that the adhesive agent is filled while air in the hollow part of the connector or in the connecting hole or at the adhesive agent accumulation part being discharged through an air drain part with the adhesive agent flowing in when the adhesive agent is flowed in.

In addition, the connector having complex shape corresponding to size, shape or combination of structural members to be connected or their connecting location can be easily made at the working site only through a connection of various removable connectors to the end engaging part or the wall surface engaging part. Then, the connector corresponding to the working site can be made only through a combination of various kinds of removable connectors as well as their connection. Then, in the case that it is hard to get a space for inserting the connector between the structural members to be connected, an easy working can be carried out only through the rectangular connector. The removable connector is made small in size and simplified and its number of type can be less, resulting in that a standardization of the connector can be attained and its mass production can also be realized under a less expensive cost.

In addition, the-present invention is made such that the adhesive agent accumulation part is provided at the connecting surface of the structural member, resulting in that a mere feeding of adhesive agent in the connector enables the connecting surfaces to be adhered with the adhesive agent and a quite powerful connecting withstand force can be attained with a simple work in a high reliability. The connecting surfaces of the structural members are provided with the adhesive agent accumulation part and the adhesive agent coating part, thereby after the adhesive agent coating part is separately coated with the adhesive agent, the connector is adhered to it and this can realize the connecting structure for a building structure in which a more powerful connecting withstand force can be realized under a high reliability, it has a superior workability and the working can be substantially shortened in working period as well as a labor saving can be remarkably improved.

As described above, according to the present invention, since the connector is inserted and mounted within the lumber or the like and coated with the adhesive, the connector can be prevented from salt damage and dew condensation. The connector is free from corrosion or the like. The durability of the connecting construction can be remarkably enhanced. Further, since the connector cannot be viewed from outside, the connection joint structure excellent in beauty can be obtained to increase the added value. In case of fire, the connector within the lumber is protected by the carbonized film of lumber, and the connector may not subject to thermal deformation. Therefore, a building is prevented from being destroyed and an evacuation time can be secured by the connector. By using a plurality of connectors, it is possible to minimize the progress of broken parts to remarkably enhance the safety.

In the past, particularly in wooden structures, connecting portions were variously processed into a thin wall-thickness so that resistance to the tensile compressive stress, bending stress and shearing stress were weak. In order to compensate for this, it is necessary to make structural members such as the wood pieces thicker or to use auxiliary fittings. In the case of the present application, reinforcement with the connector of the present invention enables the lumber to get a sufficient resistance against a mechanical load even though the timbers or the like are thin or fine in size, so that the present invention can perform a saving in resources. In addition, the strength can be artificially controlled by changing the shape, diameter, length and the number of connectors. Therefore, the execution can be performed according to the strength required for connecting parts. In addition, by performing the connection using commercially available square rods, square rods having a heavy timber structure excellent in structural strength, beams of longest span, plate lumber or the like can be easily fabricated in the field.

Furthermore, the combined use of an adhesive agent and a connector, enables a rigidity at the connected part to be the same rigidity and proof stress of one integral piece item such as timber. Hence, this can be fully applied to multi-stories building such as a building of three-stories or more. In addition, such an effect as above can be obtained with a few number of connectors during the work. Accordingly, it is possible to get a remarkable improvement in operability, labor saving and streamlining of the work and also the connected part shows that the connector and adhesive agent become a core member to perform a sufficient adaptation against tensile or bending shearing stress of the like and so the present invention can realize a remarkable improvement in workability, labor saving and rationalization and at the same time the connected part has a core member composed of the connector and the adhesive agent so as to enable this core member to accommodate sufficiently against any tension or bending stress or the like, resulting in that the present invention can prevent any accident of collapsing of a building during its work and the like.

BRIEF DESCRIPTION OF THE DRAWINGS

FIG. 3a is an end view in elevation of one embodiment of the transverse member with a circular cross section.

FIG. 3b is an end view in elevation of another embodiment of the transverse member with an elliptical cross section.

FIG. 3c is an end view in elevation of another embodiment of the transverse member with a square cross section.

FIG. 3d is an end view in elevation of another embodiment of the transverse member with a hexagonal cross section.

FIG. 3e is an end view in elevation of another embodiment of the transverse member with a triangular cross section.

FIG. 11 is a configuration view showing a dowel coupling using the connector of the first preferred embodiments

FIG. 20-a is a sectional view showing a linear connector of the third preferred embodiment.

FIG. 20-b is a sectional view showing a bent connector of the third preferred embodiment.

FIG. 23 is a configuration view showing a coupling between an independent column and a lateral member using the connector of the third preferred embodiment.

FIG. 24-a is a configuration view showing a diagonal coupling using the connector of the third preferred embodiment.

FIG. 24-b is a substantial front elevational view of FIG. 24-a as set forth above.

FIG. 28-a is a side view of the connector according to the fourth embodiment of the present invention, and FIG. 28-b is a perspective view of essential parts showing an outflow end of an adhesive of the connector according to the fourth embodiment of the present invention.

FIG. 30-a is a sectional view of essential parts in a central portion of a connecting hole portion showing a connection joint execution using the connector according to the fourth embodiment of the present invention;

FIG. 30-b is a sectional view of essential parts in a central portion of a connecting hole portion showing the state after a connection joint execution using the connector according to the fourth embodiment of the present invention.

FIG. 31-a is a perspective view showing the state of a scarf joint execution performed in the execution of ground-sill or the like using the connector according to the fourth embodiment of the present invention; and FIG. 31-b is a perspective view showing the state after the scarf joint execution using the connector according to the fourth embodiment of the present invention.

FIG. 37-a is a sectional view showing a flow of adhesive agent when the structural members of the building structure of the sixth preferred embodiment of the present invention.

FIG. 37-b is a sectional view showing a connecting structure of the building structure of the sixthe preferred embodiment of the present invention.

FIG. 40-a is a perspective view showing a connecting method for a connecting structure of the building structure of the eighth preferred embodiment of the present invention.

FIG. 40-b is a perspective view showing a connecting method for a connecting structure of the building structure of the eighth preferred embodiment of the present invention.

FIG. 40-c is a perspective view showing a connecting method for a connecting structure of the building structure of the eighth preferred embodiment of the present invention.

FIG. 44-a is a sectional view of a central part of a connecting hole showing a state in which the connectors of the ninth preferred embodiment of the present invention to illustrate a state in which the end parts are connected with it.

FIG. 44-b is a sectional view showing a central part of a connecting hole to illustrate a state after working of the end connection using the connectors in the ninth preferred embodiment of the present invention.

17 of the present invention.

Figure 46:
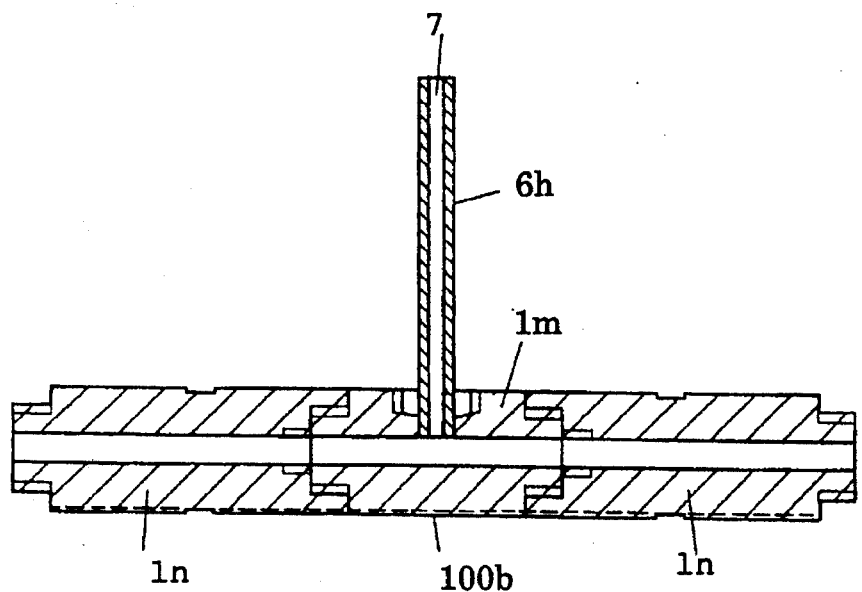

FIG. 46 is a sectional view showing the connectors connected in the tenth preferred embodiment of the present invention.

FIG. 47-a is a perspective view showing an end part connecting work for connecting an independent column and a beam using the connectors connected in the tenth preferred embodiment of the present invention.

FIG. 47-b is a sectional view showing a central part of a connecting hole to illustrate a state in which the end part connecting work for an independent column and a beam using the connectors of the tenth preferred embodiment of the present invention.

FIG. 47-c is a sectional view showing a central part of a connecting hole to illustrate a state after the end parts of ah independent column and a beam are connected using the connectors of the tenth preferred embodiment of the present invention.

FIG. 48-a is a perspective view partly broken away before connection of the connectors in the eleventh preferred embodiment of the present invention.

FIG. 48-b is a sectional view showing a connector connected in the eleventh preferred embodiment of the present invention.

Figure 49:
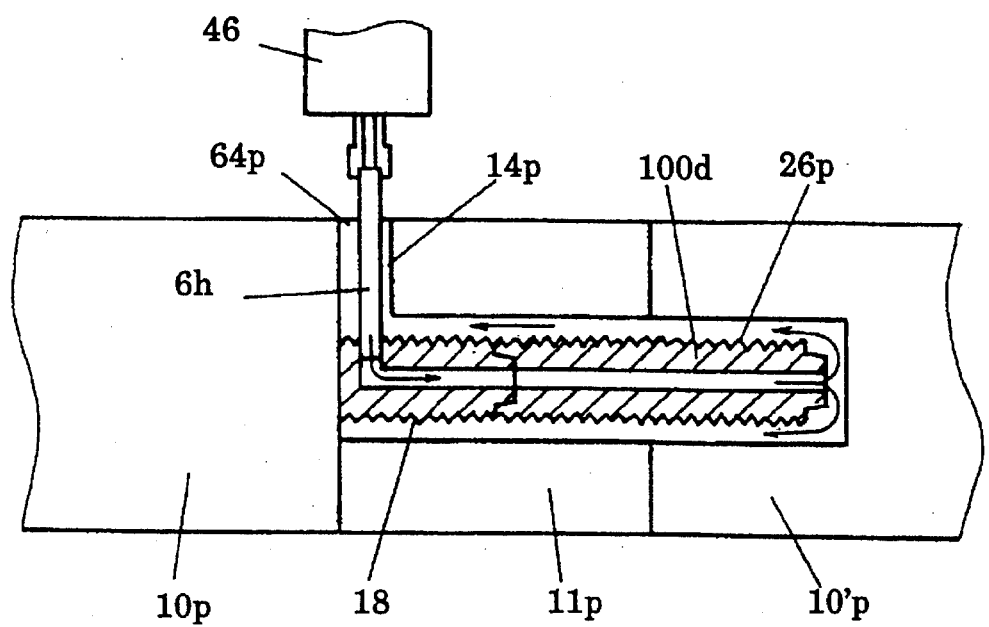

FIG. 49 is a sectional view showing a central part of the connecting part to illustrate a state of performing the end part connection used in a connection between a beam and a cross-beam using the connector connected in the eleventh preferred embodiment of the present invention.

FIG. 50-a is a sectional view showing a connector to illustrate an example of application in the eleventh preferred embodiment of the present invention.

FIG. 50-b is a sectional view showing a central part of a connecting hole when a foundation and a concrete foundation are connected by using the connector in the twelfth preferred embodiment of the present invention.

Figure 51:
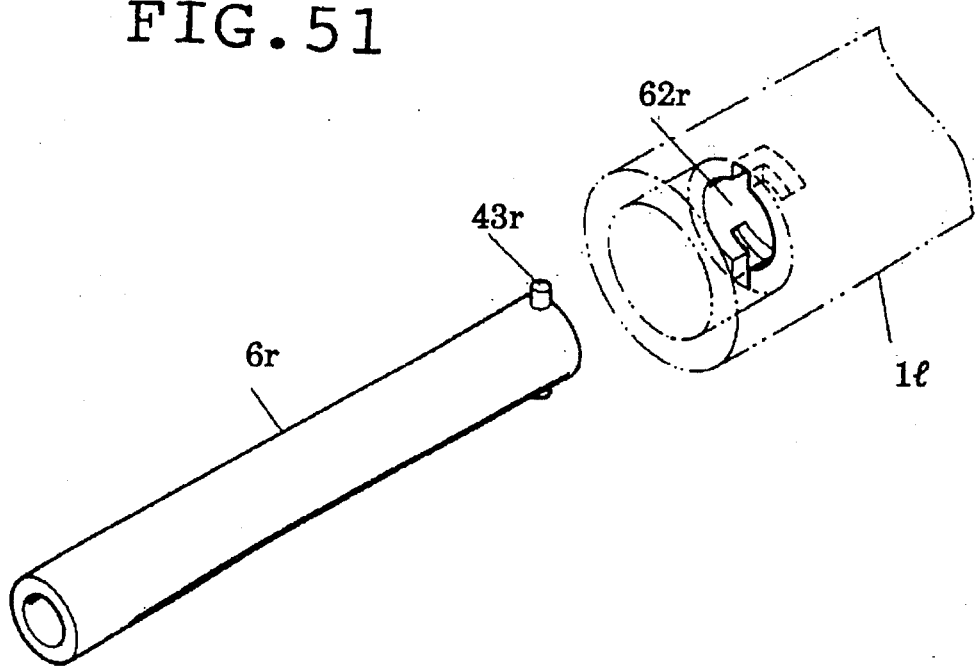

FIG. 51 is a view showing another example of the application of the branch pipe engaging part.

FIG. 52 is a perspective view for showing the connector of the 13-th preferred embodiment of the present invention.

FIG. 53-a is a side elevational view for showing the connector of the 13-th preferred embodiment of the present invention.

FIG. 53-b is a substantial perspective view for showing flowing-out end of the adhesive agent of the connector of the 13-th preferred embodiment of the present invention.

Figure 54:
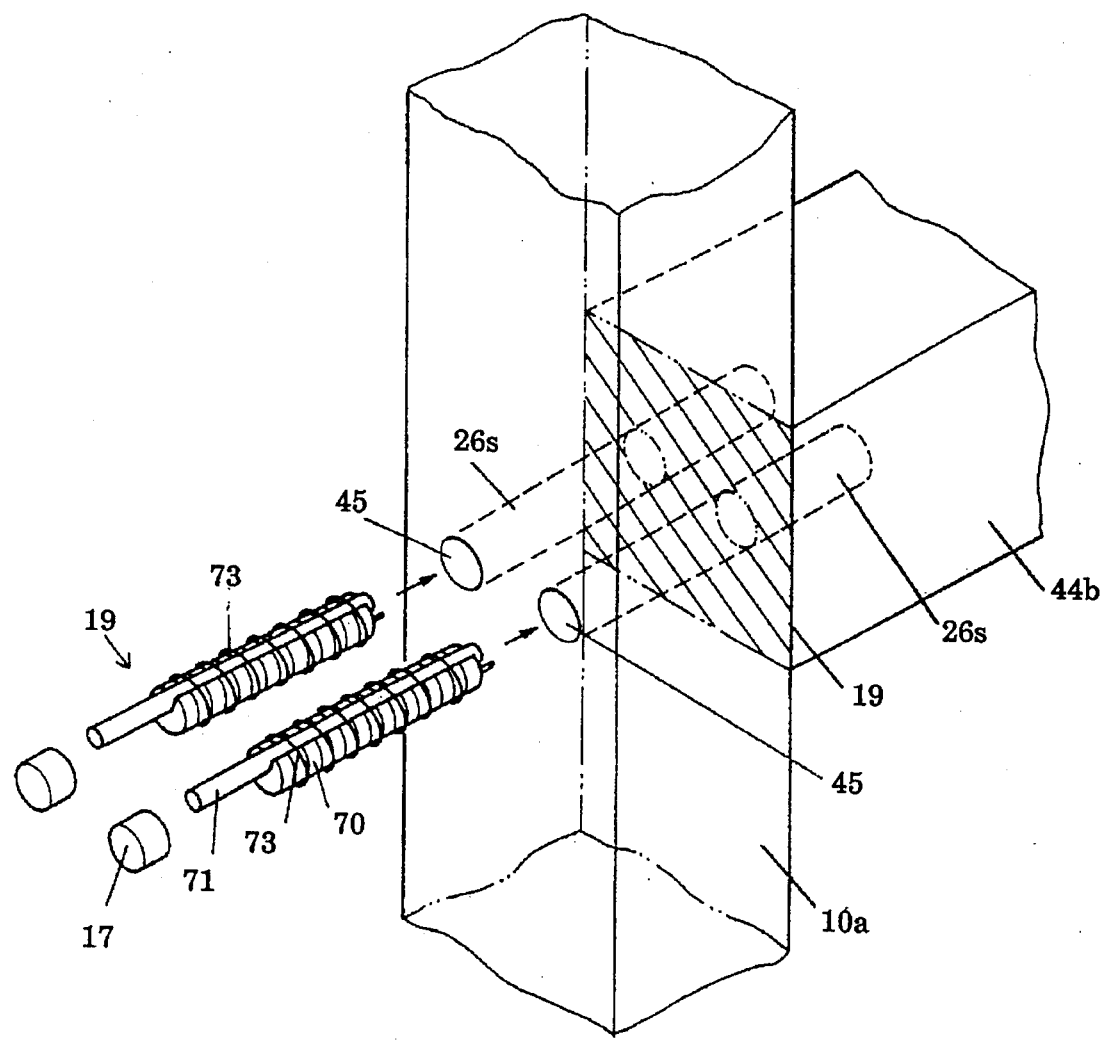

FIG. 54 is a perspective view for showing a case in which an independent column end is connected to a joint using the connector of the 13-th preferred embodiment of the present invention.

Figure 55:
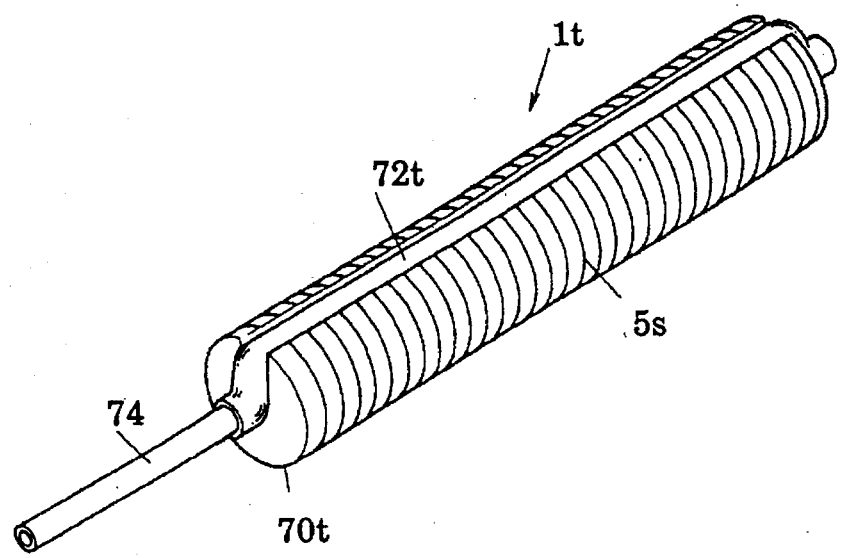

FIG. 55 is a perspective view for showing a connector in the 14-th preferred embodiment of the present invention.

Figure 56:
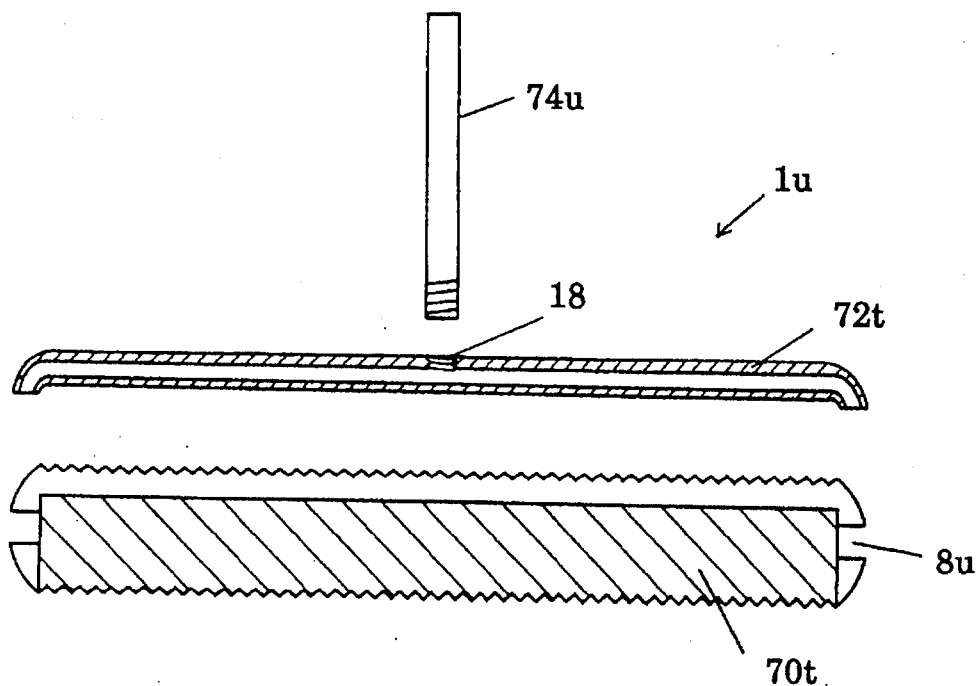

FIG. 56 is a partial sectional end view for showing the connector of the 15-th preferred embodiment of the present invention.

Figure 57:
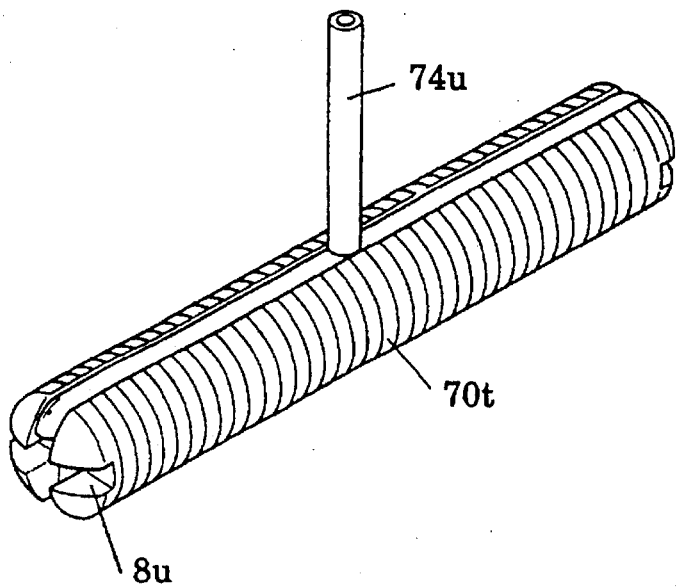

FIG. 57 is an entire perspective view for showing the connector of the third preferred embodiment of the present invention.

Figure 58:
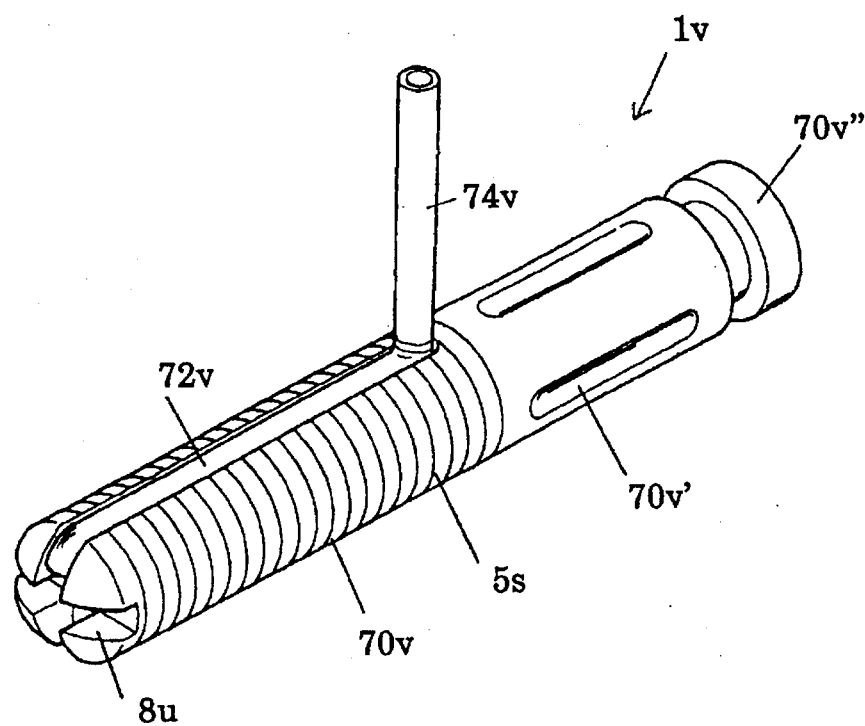

FIG. 58 is an entire perspective view for showing the connector of the 16-th preferred embodiment of the present invention.

DETAILED DESCRIPTION OF THE PREFERRED EMBODIMENTS

Referring now to the drawings, one preferred embodiment of the present invention will be described as follows.

18

Preferred Embodiment 1

Figure 1:
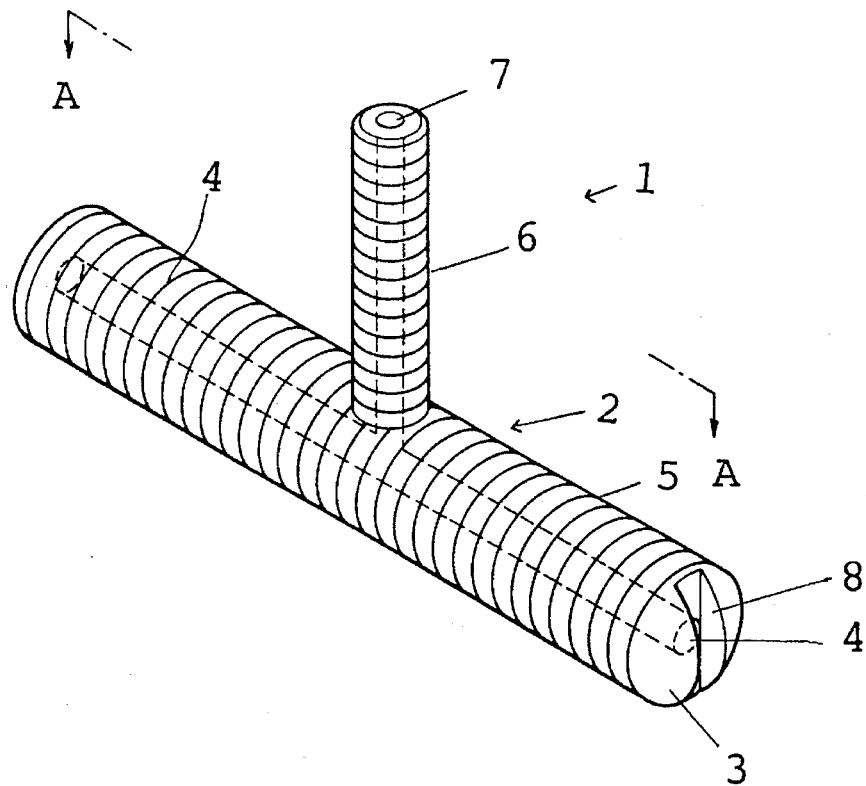
FIG. 1 is a perspective view for showing the connector of the first preferred embodiment.
Figure 2:
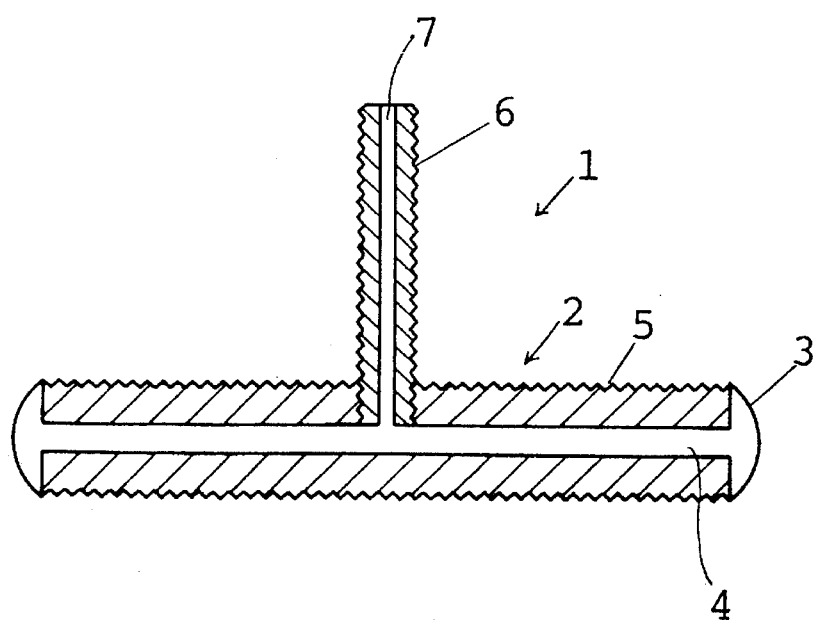
FIG. 2 is a sectional view taken along a line A—A of FIG. 1.

FIG. 1 is a perspective view for showing a connector in the first preferred embodiment of the present invention. FIG. 2 is a sectional view taken along line A—A of FIG. 1 and FIG. 3 is a substantial front elevational view for showing an end part of each of the examples of applications of sectional shapes of the tubular member of the connector.

Reference numeral i denotes an iron connector provided with a branch pipe at a central part of the first preferred embodiment, 2 denotes a metallic rod member, 3 denotes an end part of the rod member 2 formed into a bulged shape, 4 denotes an adhesive agent feeding into a hollow part formed in the longitudinal direction of the central part of the tubular member 2 and having both ends opened, 5 denotes a concave or convax part projection formed at the surface of the tubular member 2, reference numeral 6 denotes a branch pipe of synthetic resin threadably fitted at the central part of the tubular member 2, reference numeral 7 denotes a hollow part of the branch pipe communicating with the hollow part 4 of the tubular member 2 formed at the branch pipe 6, and reference numeral 8 denotes an adhesive agent guiding groove formed in a concave shape at a surface of the end 3 formed into a bulged shape.

FIG. 3-a illustrates that a sectional shape of the tubular member 2 is formed into acircle so as to facilitate its insertion into the communication hole or the like roughly cut and formed in the wooden material or the like.

FIG. 3-b illustrates that the sectional shape of the rod member 2 is formed into a substantial ellipse so as to prevent a connection between a foundation and a column, a dispersion of external force, to make a reinforcement and to prevent a rotation of the member. In particular, resistance to bending stress from its major diameter direction is strengthened. FIG. 3-c to FIG. 3-e are formed such that the end part is formed into a square or rectangle, a hexagon and a triangle so as to prevent rotation between the members and to make a suitable connection of the members.

A connecting method for the structural members and the connection structure between the structural members will be described in reference to the connector of the first preferred embodiment constructed as described above.

WORKING EXAMPLE 1

Figure 4:
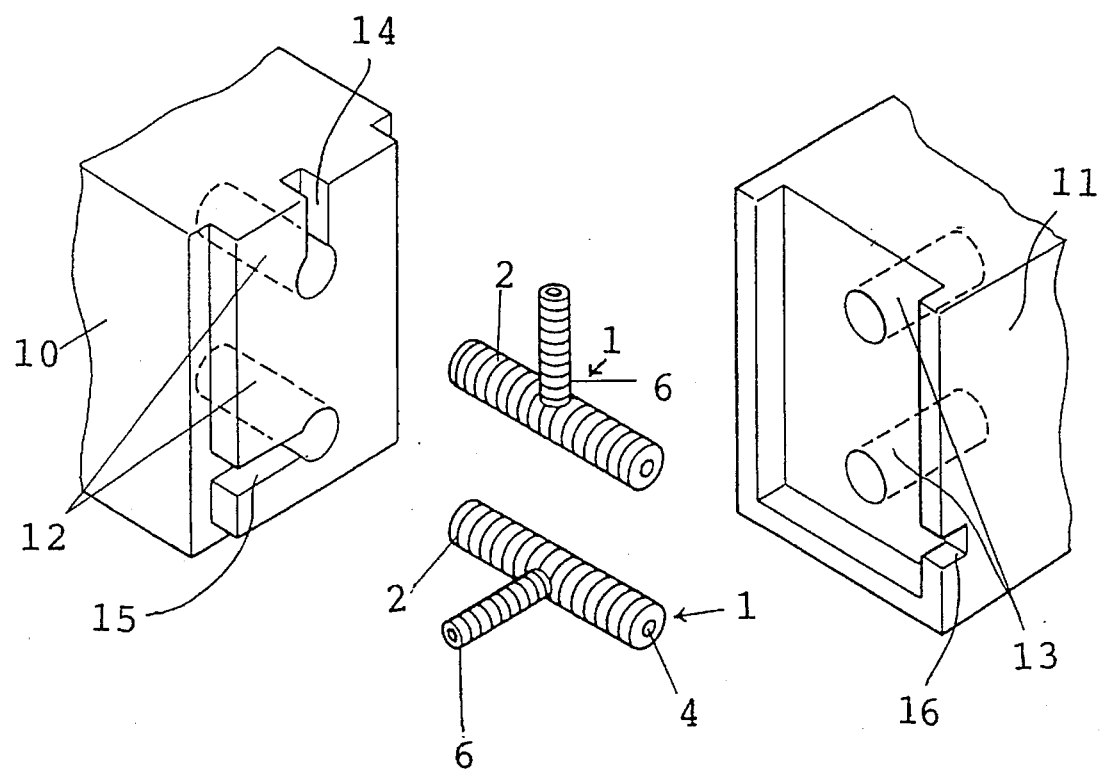
FIG. 4 is a configuration view for a dado joint coupling with the connector of the first preferred embodiment.
Figure 5:
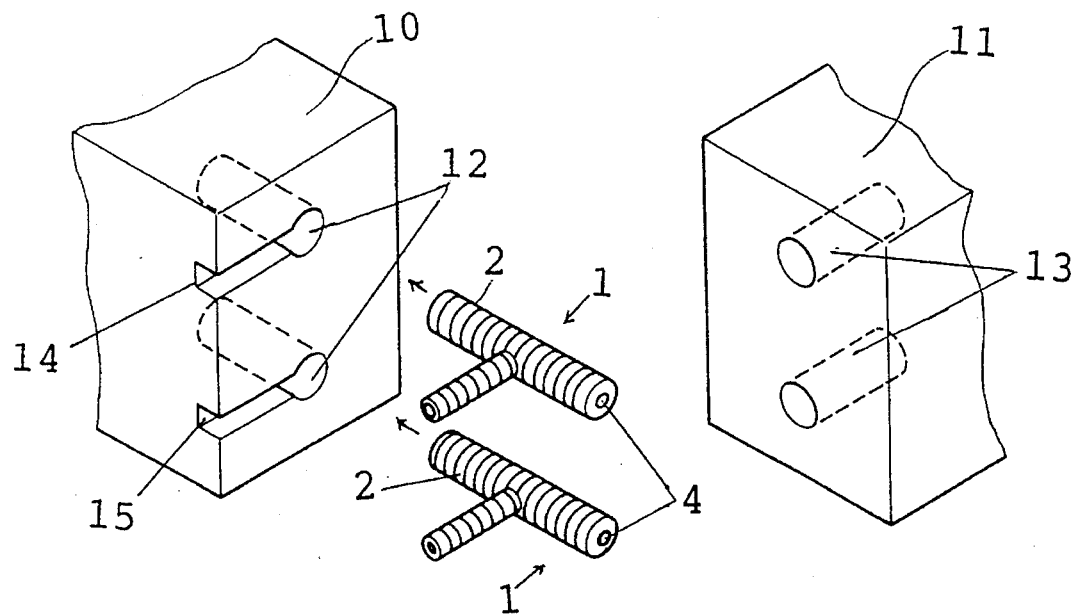
FIG. 5 is a configuration view for an abutment coupling used with the connector of the first preferred embodiment.
Figure 6:
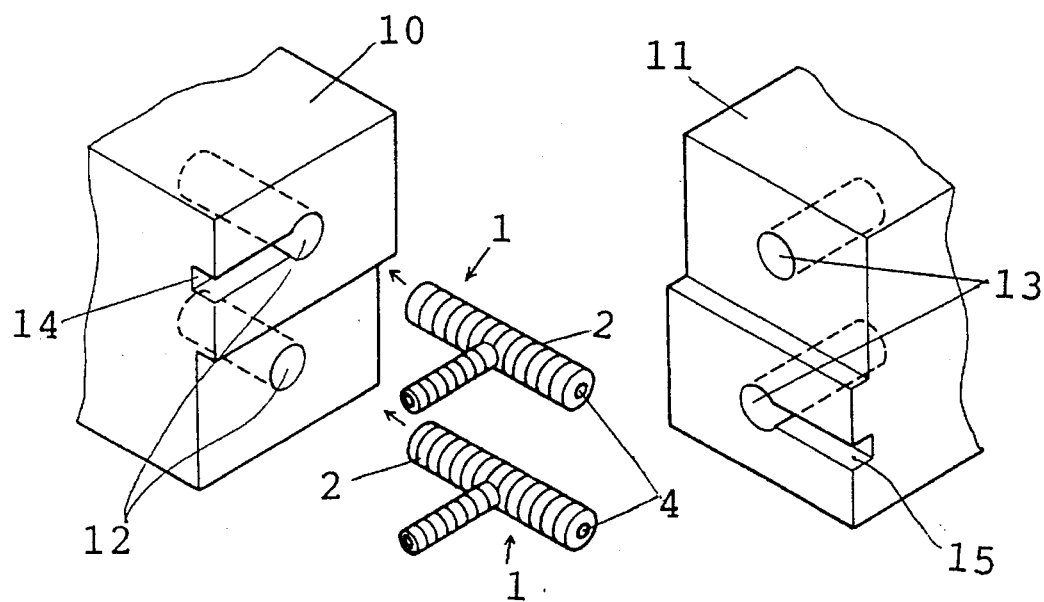
FIG. 6 is a configuration view for a halving joint used with the connector of the first preferred embodiment.

FIG. 4 is a configuration view showing a dado joint coupling carried out by using the connector of the first preferred embodiment, FIG. 5 is a configuration view showing an abutment coupling and FIG. 6 is a configuration view showing a halving joint.

Reference numeral 10 denotes a joint composed of timber or laminated wood to which a dado joint coupling working or an abutment coupling or a halving joint coupling is applied. Reference numeral 11 denotes a bracket composed of timber or laminated wood which is made in the same manner as that of the joint 10, and reference numerals 12 and 13 denote connecting holes into which the tubular member 2 of the connector 1 is inserted and fitted and the connecting holes are formed by abutting the holes 12 and 13 to each other. Each of the holes is referred to as a connecting hole as follows. Reference numerals 14, 15 and 16 denote groove parts for arranging the branch pipes 6, 6 of the connectors 1, 1, respectively.

At the time of execution, at first, the connecting holes 12, 13 having a substantial same diameter as or larger diameter than that of each of the tubular members 2 of the connector 1 and a length slightly longer than the former diameter and grooves 14, 15, 16 are formed in joint 10 and the bracket 12. Then, the connectors 1 are inserted into the connecting holes 12 and the groove parts 14, 15, adhesive agent is applied to the surface of the bracket 11 as required, thereafter the other side of the connector 1 is installed in each of the connecting holes 13 and the branch pipe 6 is installed at the groove part 16, and the joint 10 and the bracket 11 are held horizontal so as to abut each of the abutment surfaces to each other. Then, the connected parts are held against their joined sections with a temporary nailing or a thread clamp at a location where it is barely visible from the outside and Woodlock (manufactured by Nihon Polyurethane Kogyo Co., Ltd.) acting as an adhesive agent is fed through a gun for pouring a adhesive agent (not shown) from the branch pipe 6 and the adhesive agent is fed until it can be seen from between the branch pipe 6 and the circumferential walls of the groove parts 14, 15 or 16 or until the adhesive agent overflows. In case that the timber is of the absorption type, the feeding of the adhesive agent is repeated two or three times. Then, the groove parts 14, 15, 16 for the branch pipe 6 are plugged or applied with a sealing agent such as wood putty and the like. After the adhesive agent is set, the temporary nailing or thread clamp is removed.

In reference to the method for connecting structural members as described above, its connection structure will be described as follows.

Figure 7:
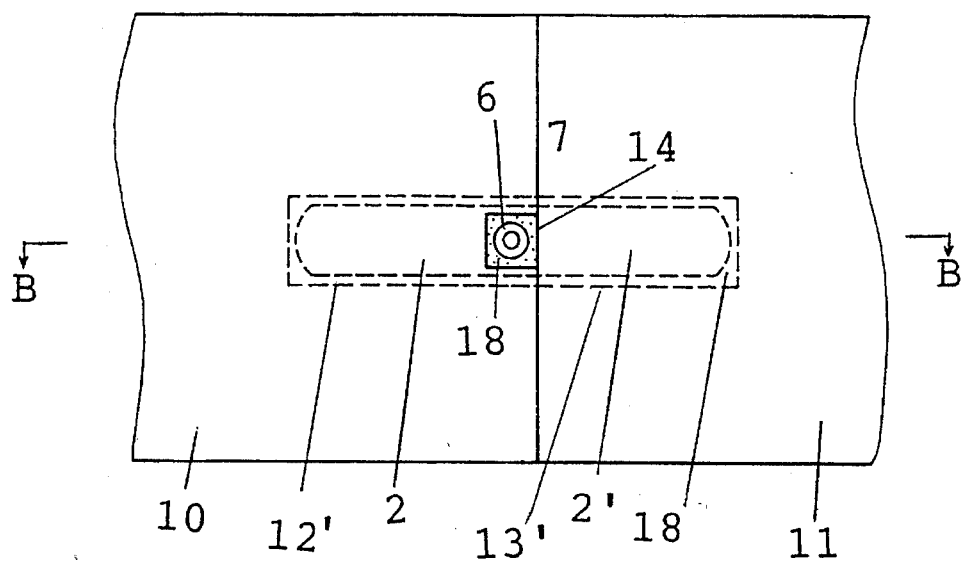
FIG. 7 is a substantial front elevational view showing a connection structure using the connector of the first preferred embodiment.
Figure 8:
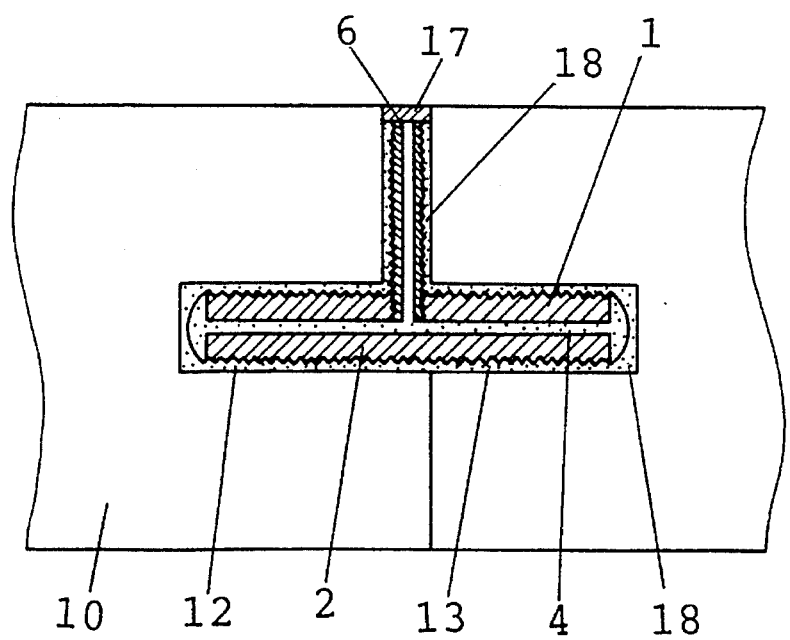
FIG. 8 is a sectional view taken along a line B—B of FIG. 7 showing the connection structure.
Figure 9:
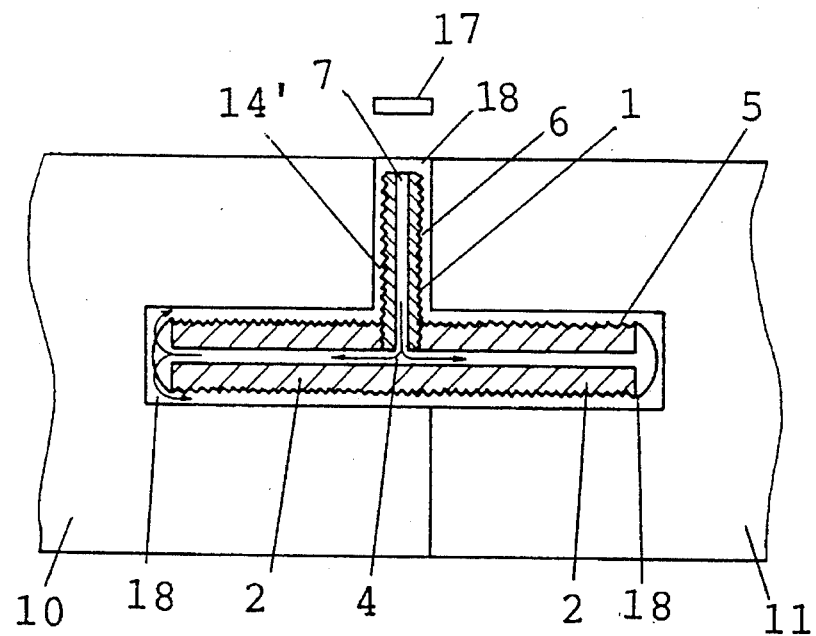
FIG. 9 is a sectional view taken along a line B—B of FIG. 7 showing in a schematic form, the flow of adhesive agent.

FIG. 7 is a substantial front elevational view for showing the connection structure, FIG. 8 is a sectional view taken along a line B—B of FIG. 7 for showing the connection structure and FIG. 9 is a sectional view taken along a line B—B of FIG. 7 for schematically illustrating a flow of the adhesive agent.

Reference numerals 12' and 13' denote circumferential walls of the connecting holes 12 and 13, reference numeral 14' denotes a circumferential wall of the groove part 14, reference numeral 17 denotes a plug made of the same wood material as that of the groove part and reference numeral 18 denotes the adhesive agents.

In FIG. 7, the rod member 2 of the connector 1 is buried within the connecting holes 12 and 13 formed in the joint 10 and the bracket 11, and the adhesive agent 18 is filled in the connecting holes 12, 13 and between the circumferential walls 12', 13' and 14' of the groove part 14 and the surface of the connector 1.

In FIG. 8, a closing plug 17 is provided at the groove part 14 to cover it and so that the branch pipe 6 and the like may not be seen from outside after a finishing process.

In FIG. 9, adhesive agent is fed from the hollow part 7 of the branch pipe 6 as indicated by an arrow, the adhesive agent passes through the hollow part 4 and fills the clearance between the surface of the tubular member 2 and the circumferential walls 12' and 13' of the connecting holes 12 and 13. In this case, a channeling or a short pass of the adhesive agent is prevented under an effect of the buffer of the projection 5 at the surface of the tubular member 2, and the clearance is filled with adhesive agent without any leakage. In addition, as the feeding of the adhesive agent 18 is continued, it can be confirmed visually that the adhesive agent 18 rises up while filling the clearance between the outer surface of the branch pipe 6 and the circumferential wall 14' of the groove part 14, resulting in that non-uniform filling can be prevented.

A structural strength test was carried out on an example of the present application. Its result is described as follows.

Twenty timber members of 10 cm by 10 cm square with a length of 90 cm were prepared, each of two timber members was set as one unit, five units were processed with a halving joint for the preferred embodiment and the other five units were processed with a mortise and tenon which is superior in a tensile strength as a comparative example.

In this preferred embodiment, a connecting hole with a diameter of 18φ and a depth of 5 cm is drilled with a drill tool at the central part of a halving joint working part of each of a set of wooden members. Then the connector 1 composed of a tubular member with a diameter of 15φ, a hollow part 5φ and a full length of 9 cm having a branch pipe with a diameter of 5φ and a hollow part 2φ threadably fitted at the central part was installed in the connecting hole one by one, their abutment surfaces were abutted to each other. Wood-Lock acting as an adhesive agent was filled by an adhesive agent feeding gun, these three pieces parts were connected and fixed to each other to make test pieces. It was found after performing a tensile test for each of these test pieces that the pieces of the preferred embodiment had a tensile strength of 90 kg/cm$^2$ or more. As opposed to this, the pieces of the comparison example had a tensile strength of 30 kg/cm$^2$ or less.

As apparent from the structural strength test described above, it was found that the connecting structure of the preferred embodiment had a tensile strength more than three times that of the connecting structure of the comparison example which has been said to be superior in strength irrespective of a disadvantageous connecting method in contrast to the comparison example.

As described above, according to the preferred embodiment, it has been found that the joint of structural members such as timbers is quite simple being the mere formation of the connecting holes and the groove part, the connecting method is also a quite simple operation of merely feeding adhesive agent to the connector and a connection structure having superior mechanical strength can then be attained.

In addition, whether or not the sufficient application of the adhesive agent is attained can be visually checked, so that a rigid connection structure having no adhering marks can be attained. In addition, it has also been found that the connector is protected by a carbonic film at a surface of the timber against fire with the result that collapse of columns or beams is prevented and a remarkable improvement in fire-proof characteristics and safety due to the fact that the connector in the preferred embodiment is buried in the timber as compared with that of the prior art in which the timbers are connected with the connecting fittings from outside. In view of this fact, it will take longer for a wooden house to collapse substantially contributing to safety and preventing loss of life.

The connection part is made such that the connector and the adhesive agent may act as cores to enable tension or bending hearing stress or the like to be accommodated with a result that an accident of dislaminated wood of the structure during the working operation is prevented.

In addition, after completion of the building, durability is retained against external forces such as earthquakes or typhoons due to the increased mechanical strength of the connector and further it is possible to prevent the connector from rust from a dew formation or the like, from bulging and damaging the stone materials or concrete materials due to the fact that the surface of the connector is covered by the adhesive agent.

WORKING EXAMPLE 2

Next are described the working example for a column and a foundation, a column and a cross-beam or a side joint, a lateral beam such as an upper floor beam, a gable beam and a strut and a purlin (a ridge piece), a pole plate and a tie beam and the like using the connector of the first preferred embodiment.

Figure 10:
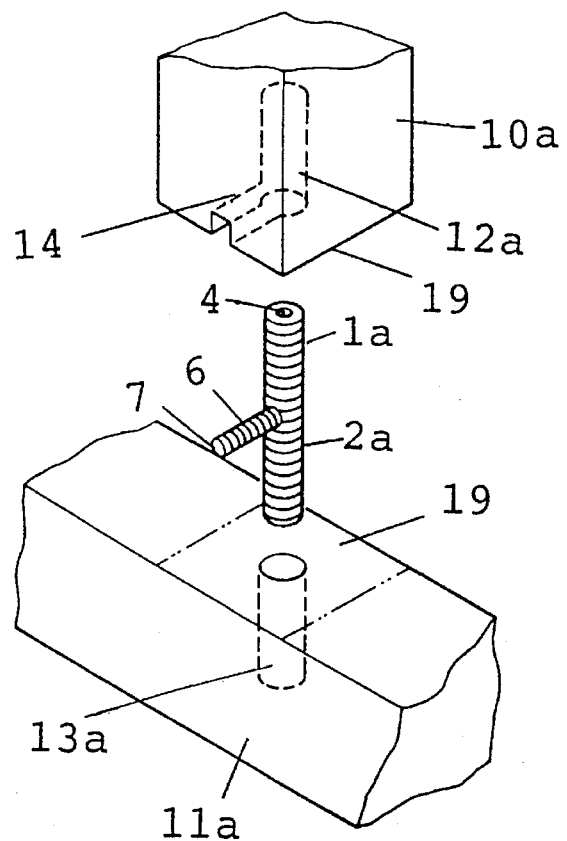
FIG. 10 is a configuration view showing a coupling between vertical material like a column or a strut and lateral material like a foundation or a lateral beam using the connector of the first preferred embodiment.

FIG. 10 shows the configuration when the column or strut or a foundation or a lateral beam (a cross-beam, a side joint, a purlin) using the connector of the first preferred embodiment are connected. Reference symbol 1a denotes an connector in which sectional shape is formed into an ellipse, an adhesive agent feeding hollow part 4 having a diameter of about ½ to ¼ of a section of it is formed at a central part and a convex projection 5 is formed at the surface thereof, reference symbol 10a denotes a connecting timber such as a column or a strut or the like, reference symbol 11a denotes a bracket timber composed of a foundation or a beam, a side joint, a purlin and the like, reference numeral 19 denotes a joint surface, reference symbols 12a and 13a denote connecting holes which are formed substantially in the same diameter as an outer diameter of the connector 1a or slightly larger than the outer diameter.

First, the connecting holes 12a, 13a and the groove part 14 for use in inserting and fitting the connector 1a are punched at the joint timber 10a and the bracket timber 11a. Then, the connecting surface 19 is made smooth so as to prevent adhesive agent from leaking. Then the connector 1a is fitted and inserted so as to cause the joint timber 10a to be abutted against the bracket timber 11a. Adhesive agent is fed from the branch pipe 6 and the feeding of the adhesive agent is continued until the adhesive agent can be visually confirmed between the outer circumference of the branch pipe 6 and the circumferential wall of the groove part 14. Then, the groove part 14 is finished with putty or the like.

The connecting structure of the structural members will be described as follows in reference to the connecting method for the structural members configured as described above.

Since the connector 1a has an ellipse shape in the present working example, it is possible to prevent the joint timber 10a such as a column from being, rotated concurrently with the connection of the connector and to connect the joint timber with the bracket timber 11a. Accordingly, even if the joint structure does not have a complex joint structure as found in the prior art, a solid connection structure can easily be attained. In the case for example that a ridge is raised, its force is received at the thick walled part of the connector 1a against an external force applied from a front elevational surface or a rear surface of it as viewed in the drawing, resulting in that excessive strain can be prevented.

WORKING EXAMPLE 3

A joint between a tie beam and a cross-beam with a joggle joint (Daimochitugi) using the connector of the first preferred embodiment will be described.

Figure 12:
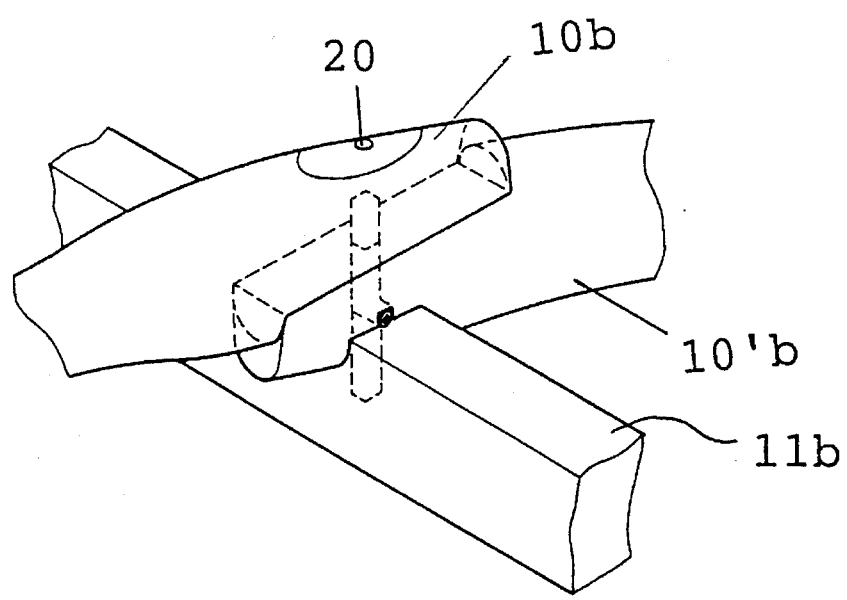
FIG. 12 is a substantial perspective view showing a connecting structure of a dowel coupling using the connector of the first preferred embodiment.
Figure 13:
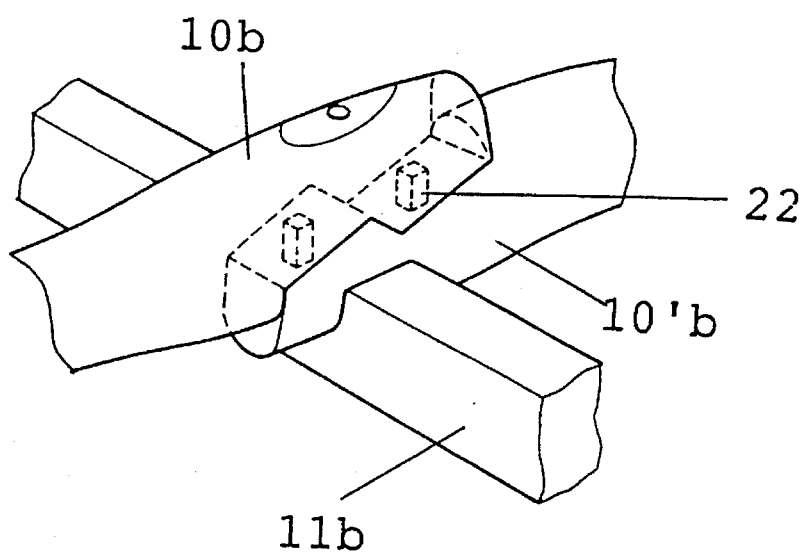
FIG. 13 is a substantial perspective view showing a connecting structure of a prior art general dowel coupling.

FIG. 11 shows a configuration when the joggle joint (Daimochitugi) is made with the connector of the first preferred embodiment, FIG. 12 is a substantial perspective view showing a connecting structure of the joggle joint (Daimochitugi) and FIG. 13 is a substantial perspective for showing a joint structure of the prior art general joggle joint (Daimochitugi).

Reference, numeral 1b denotes a connector in which a sectional shape of the tubular member is formed into a square, and reference numeral 2b denotes a tubular member in which lengths of the segments 2'b and 2'b are formed in a ratio of 2:1. Reference numeral 4 denotes a hollow part, the segment 2'b of the tubular member 2b is formed slightly larger than the segment 2"b so as to cause a return flow of the adhesive agent to be concurrently carried out at the cutting part 14'b. Reference numerals 10b and 10'b denote the joint timbers composed of tie beams, reference numeral 11b denotes a bracket timber composed of a cross-beams, reference numerals 12b, 12'b and 13b denote the connecting holes, reference numeral 20 denotes a strut hole, reference numeral 21 denotes a recess cut to a width of the bracket timber 11b and the cutting part 14' is formed at the central part of the recess 21.

Since the connecting method is carried out substantially in the same manner as that of working example 1 or 2, its explanation will be eliminated.

Comparing the present working example with the prior art example shows that in the prior art the complex cutting job for a corbel joint for the joint timbers 10b and 10'b was performed by a skilled worker, a dowel hole subsequently formed, dowel 22 then fitted to perform a joint, although according to the present preferred embodiment, square communication holes are formed with a drill and adhesive agent is merely fed into the communication holes, resulting in that even a non-skilled worker can perform this work and the finishing work of the present working example is completed much faster than that of the prior art.

As described above, according to the present preferred embodiment, changing the length of the connector enables a plurality of structural members to be connected at once, a shape of the rod member is formed into a polygon such as a square or the like to prevent the member from being twisted under its rotation, an unskilled worker can easily connect the member strictly in accordance with the design drawing and work time is shortened to approximately 1/20 of that of the prior art.

WORKING EXAMPLE 4

Next, a connecting structure in manufacturing an overlapped cross-beam or overlapped beam of large sectional area or a connecting structure at an inclined joint of the laminated wood of materials at an arch structure using the connector of the preferred embodiment will be described.

Figure 14:
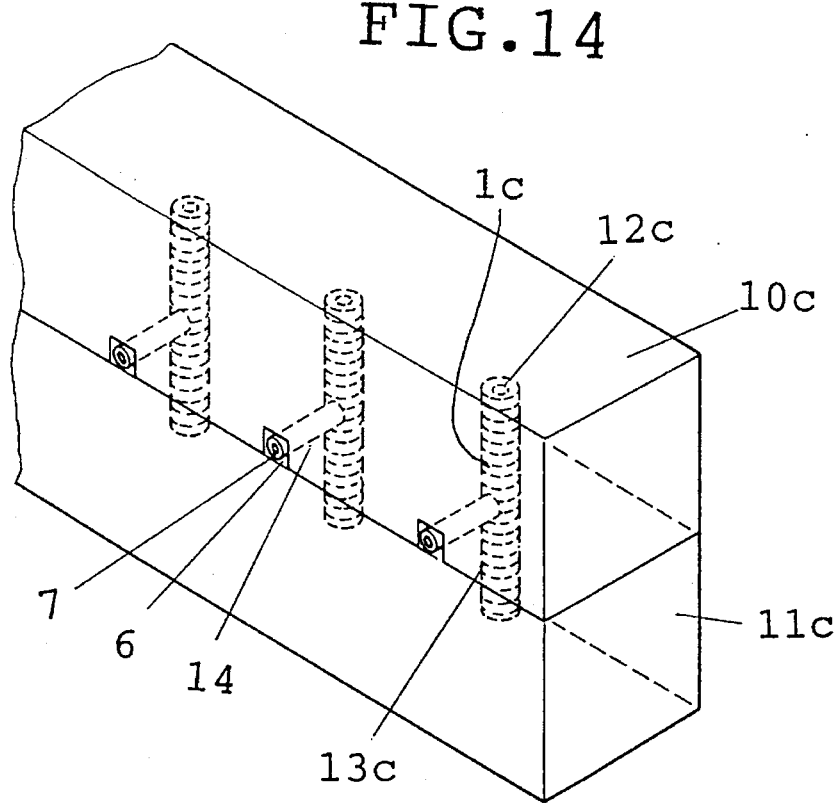
FIG. 14 is a substantial perspective view showing a connecting structure of overlapped beam using the connector of the first preferred embodiment.
Figure 15:
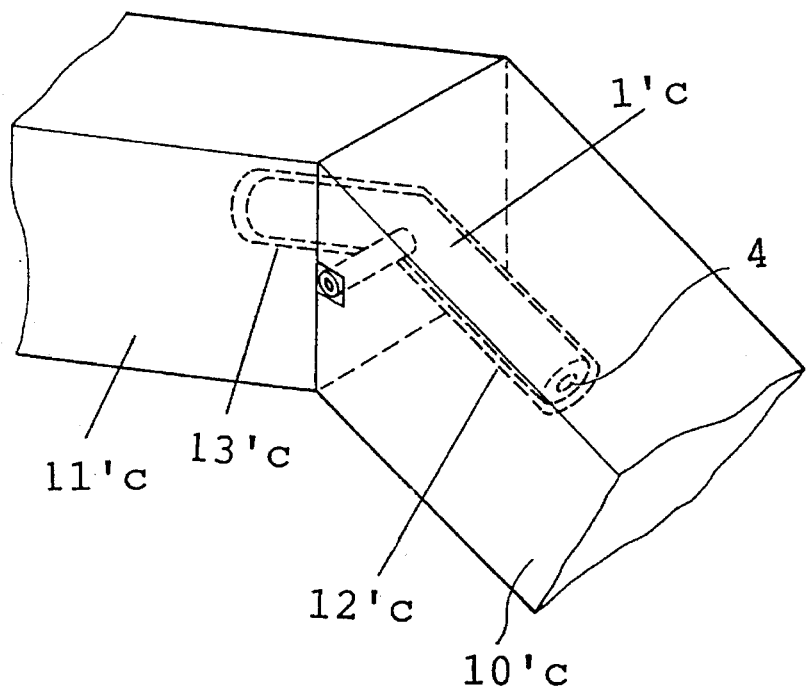
FIG. 15 is a substantial perspective view showing a connecting structure of an inclined coupling of laminated wood of materials using the connector of the first preferred embodiment.

FIG. 14 is a substantial perspective view for showing a connecting structure for a rectangular timber of 21 cm by 10.5 cm for an overlapped beam in which two square columns of 10.5 cm by 10.5 cm are coupled together and FIG. 15 is a substantial perspective view for showing a connection structure of an inclined joint of the laminated wood.

In FIG. 14, a connector 1c is installed in the punched connecting holes 12c and 13c, the joint timber 10c and the bracket timber 10c were abutted to each other through an adhesive agent layer, resulting in the rectangular column having a large sectional area of superior structural strength allowing manufacture in the same manner as that of the working example 1.

In the prior art, the rectangular column having a large sectional area had a low production volume and was not available insufficient quantities, so that its procurement was difficult. However, it has been found that the present working example enables a rectangular column having a large sectional area as well as superior strength to be manufactured on-site less-expensively manner and easier way.

In FIG. 15, the connector 1'c bent in the substantially same manner as that of an inclined rectangular column of the inclined connection surface at the central part is installed in the connecting holes 12'c and 13'c punched at the joint timber 10'c and the bracket timber 11'c of which joint surfaces are inclined away from each other, wherein the joint timber 10'c is abutted against the bracket timber 11'c through the adhesive agent layer, then the arch beam member having superior structural strength is attained in the same manner as that of the working example 1. In the prior art, the arch-shaped beams were connected by fittings, bolts and nuts or the like, resulting in an ugly outer appearance. However, it has been found that the arch-shaped beam having a superior outer appearance can be manufactured on-site in a simple and easy process using the present working example.

Preferred Embodiment 2

Referring now to the drawings, the connector of the second preferred embodiment of the present invention will be described.

Figure 16:
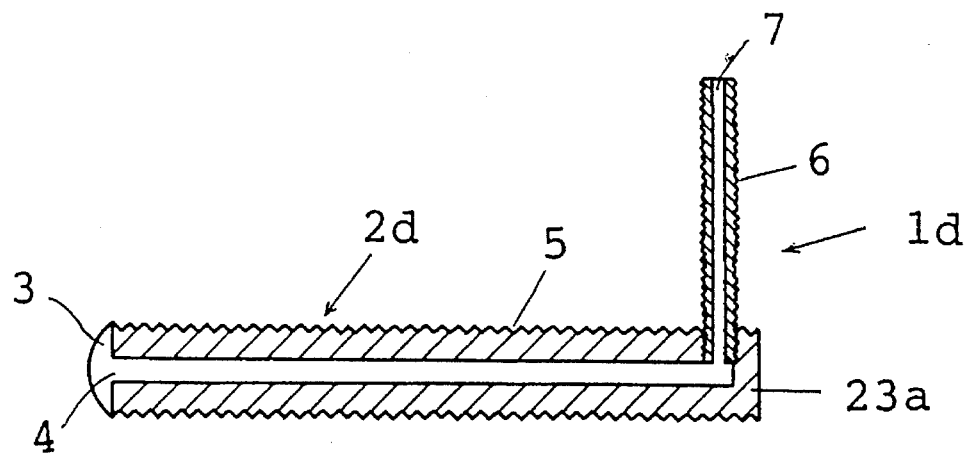
FIG. 16 is a sectional view showing a connector to be used in connecting a beam and a cross-beam of the second preferred embodiment.
Figure 17:
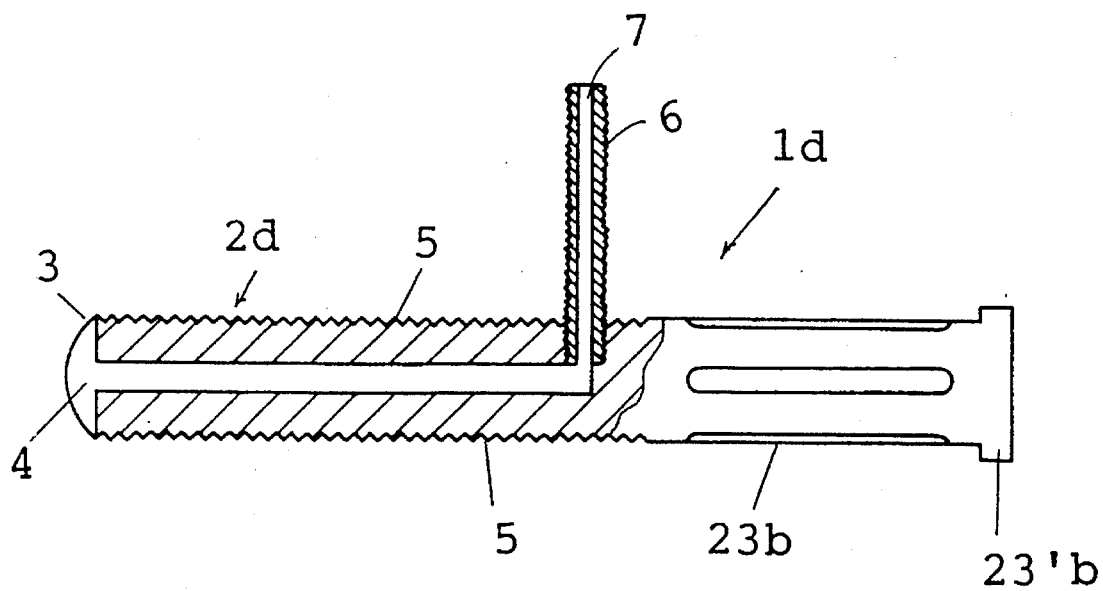
FIG. 17 is a sectional view showing essential parts in section of a connector of the second preferred embodiment to be used in the case that a concrete wall is connected with a wooden beam.

FIG. 16 is a sectional view for showing a connector to be used in a connection of the cross-beam and the beam of the second preferred embodiment and FIG. 17 is a sectional view for showing essential parts in section of the connector to be used in case a concrete wall is connected to a cross-beam of laminated wood. Reference numeral 1d denotes the connector of the second preferred embodiment, reference numeral 2d denotes a tubular member having a circular section, reference numeral 3 denotes an expanded end of the connector 1d provided with the adhesive agent guiding groove, reference numeral 4 denotes a hollow part, reference numeral 5 denotes a projection, reference numeral 6 denotes a branch pipe, reference numeral 7 denotes a hollow part of the branch pipe. Since these are substantially the same as that of the first preferred embodiment, similar reference numerals are attached to them and their explanation will be eliminated.

Reference numeral 23a denotes end part of a solid part of a tubular member 2d and reference numeral 23b denotes a closing part of a solid rod provided with an anchor 23'b formed in projected shape at its base part of the tubular member 2d. The connector 1d of the second preferred embodiment is effective in the case that the connector may not be opening well at a particulars site.

A connecting method and connection structure will be described in reference to the connector of the second preferred embodiment constructed as described above.

Figure 18:
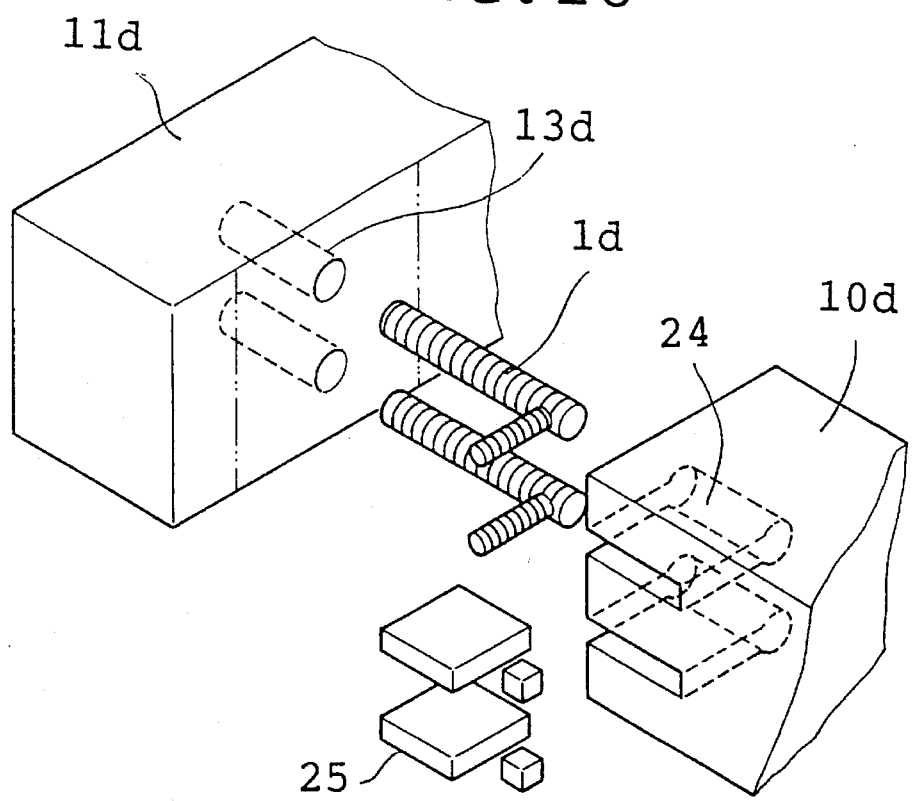
FIG. 18 is a configuration view showing a connection coupling for a beam and a cross-beam using the connector of the second preferred embodiment.
Figure 19:
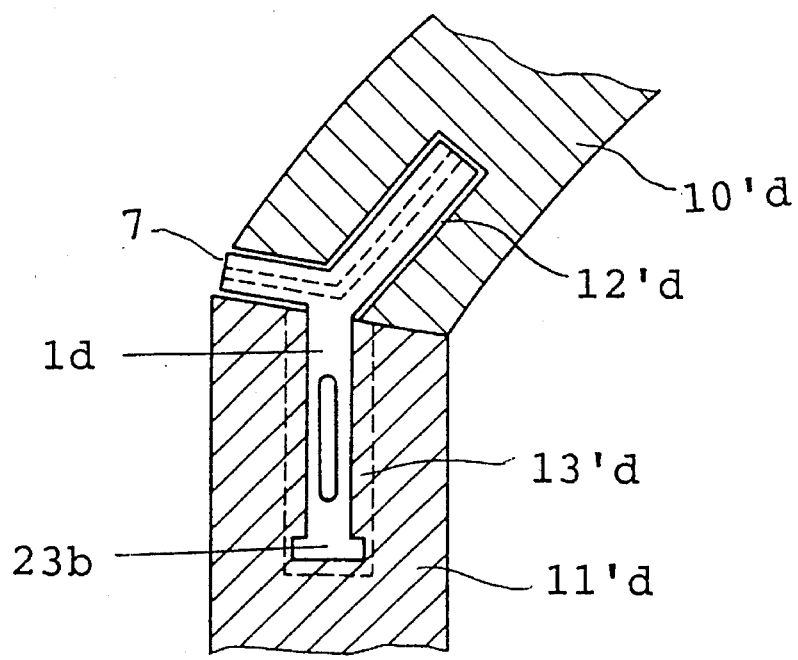
FIG. 19 is a substantial sectional view showing the respective connection parts for a concrete wall and a lateral member using the connector of the second preferred embodiment.

FIG. 18 shows a configuration of a connection for a cross-beam and a beam and FIG. 19 is a substantial sectional view for showing a connection part between a concrete wall and a cross-beam of laminated wood of materials.

In FIG. 18, reference numeral 10d denotes a joint timber composed of beam, reference numeral 11d denotes a bracket material composed of a cross-beam, reference numeral 13d denotes a connecting hole, reference numeral 24 denotes a tenon groove, reference numeral 25 denotes a buried plug inserted into the tenon groove 24 while being closely contacted with a wall of the bracket material 11d with a space around a branch pipe 6 of the connector being left, forming the connecting hole and having the connector 1d buried therein, and reference numeral 25' denotes a plug arranged at the supporting pipe after the adhesive agent is fed into the hole.

At first, the bracket material 11d is punched with the connecting hole 13d into which a substantial half part of the connector 1d is buried, and the joint timber 10d is punched with the tenon groove 24 into which a substantial half part of the connector 1d is buried. Adhesive agent is applied to the part except for the connecting hole 13d of the bracket material 11d as required and then the connector 1d is inserted into it. The joint timber 10d is inserted from the right side of the bracket material 11d in such a way that the connector 1d will not be damaged, the adhesive agent is applied to both sides of the buried plug and the joint timber 10d is struck into it. The joint timber 10d and the bracket material 11d are fixed by temporary nails, adhesive agent is fed from the hollow part 7 of the supporting pipe and an overflow of adhesive agent from an opening wall part of the tennon groove 24 as well as from the supporting pipe 6 is visually checked and a plug 25' is filled to the feeding port. In place of the plug 25', sealing agent may be applied for repair work.

In FIG. 19, reference numeral 10'd denotes a joint timber composed of a lateral timber of laminated wood and the like, reference numeral 11'd denotes a bracket timber composed of a concrete foundation or a concrete wall and the like and reference numerals 12'd and 13'd denote connecting holes. Provided that the hole 13'c forming the connecting hole is made such that the solid rod-like part 23 of the connector 1d is buried and fixed with ballast or the like.

At first, the connector 1d is installed in the hole 12'd of the joint timber 10'd and to the bracket timber 11'd, the adhesive agent is similarly fed from the branch pipe hollow part 7 in the same manner as that of the working example 1, thereafter the filled state of the adhesive agent is visually confirmed and the plug is set to connect the lateral member 10'd with the joint timber 11'd.

As described above, according to the present preferred embodiment, even if the sufficient open space is not available for the connector installation, the connection between the members can be easily carried out. In addition, the connector is formed with a long closing part and its base part is formed with an anchor part, so it can be rigidly connected with the laminated wood or timber material or the like or a concrete wall or foundation and the like and it has been found that an arch-shaped large size housing such as a gymnasium can be easily constructed within a short period of time.

Preferred Embodiment 3

Referring now to the drawings, the connector of the third preferred embodiment of the present invention will be described.

FIG. 20 is a sectional view showing the connector in the third preferred embodiment, wherein FIG. 20-a is a sectional view for showing a straight connector and FIG. 20-b is a sectional view for showing a bent connector.

Reference numerals 1e, 1f denote the connector of the third preferred embodiment, reference numerals 2e, 2f denote the tubular members of the connectors 1e, 1f, reference numeral 3 denotes an end part, reference numeral 4 denotes a hollow part, reference numeral 5 denotes a projection and these are substantially the same as that of the first preferred embodiment, the same reference numbers are applied so their descriptions will be eliminated.

A matter differing from that of the first preferred embodiment consists in that the branch pipe 6 is not fixed to the tubular members 2e, 2f of the connectors 1e, 1f and the connector 1e is formed into a bent shape.

WORKING EXAMPLE 5

The connecting method and connection structure for the connector of the third preferred embodiment constructed as related above will be described.

Figure 21:
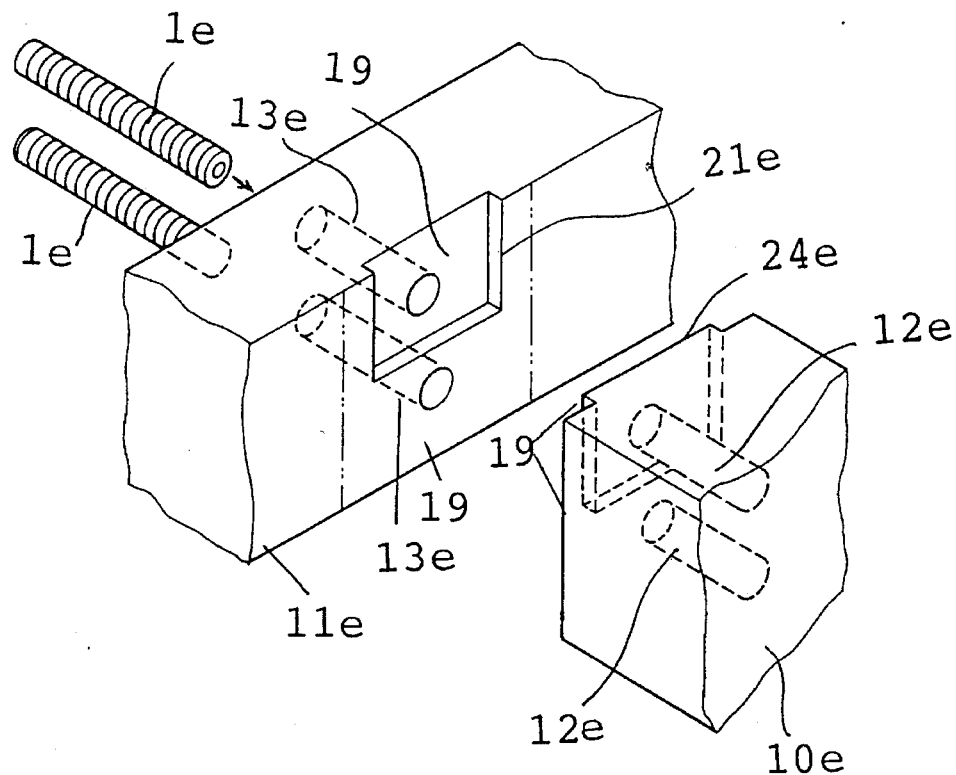
FIG. 21 is a configuration view showing a dado coupling working using the connector of the third preferred embodiment.
Figure 22:
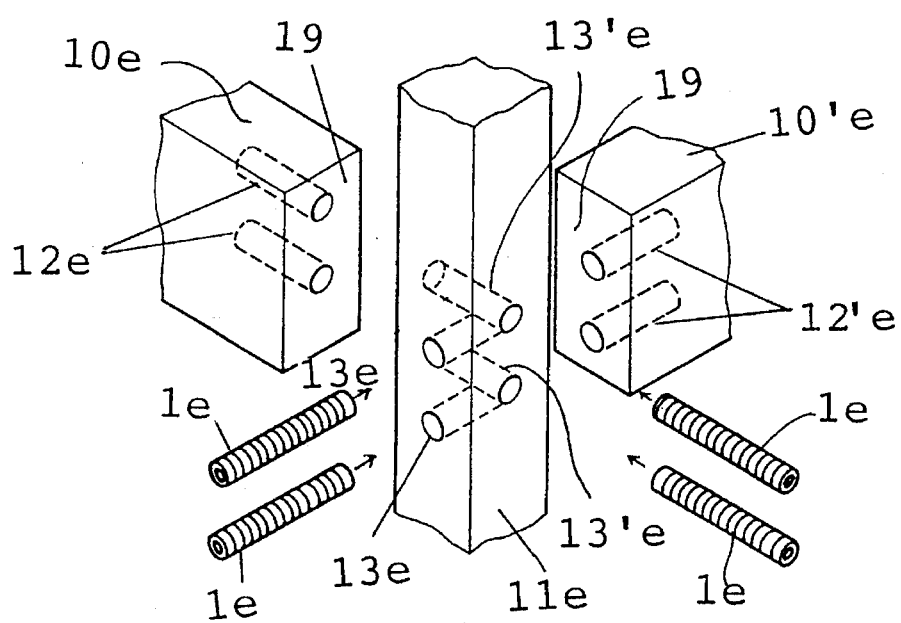
FIG. 22 is a configuration view showing an abutment coupling between an independent column and a joint timber using the connector of the third preferred embodiment.

FIG. 21 is a configuration view for showing a case in which a dado joint coupling is carried out and FIG. 22 is a configuration view for showing a case in which an independent column is abutted against the joint timber.

Reference numeral 1e denotes a straight connector of the third preferred embodiment, reference numerals 10e and 10'e denote a joint timber composed of a girder or a side beam and the like, reference numeral 11e denotes a joint bracket composed of a beam or an independent column or the like, reference numeral 12e denotes the connecting hole formed at each of the joint timbers 10e, 10'e, reference numeral 13e denotes a part of the connecting hole formed to be passed through the bracket timber 11e in which the lengths of the connecting holes 12e and 13e are combined to form a length of the connector 1e and the plug (not shown).

Reference numeral 21e denotes a dado joint recess formed at the bracket timber 11e, and reference numeral 24e denotes a dado joint tenon formed in the connecting timber 10e.

Next, a connecting method using the connector of the third preferred embodiment will be described as follows.

In FIG. 21, the connecting hole 13e is made through the bracket timber 11e in a horizontal direction and the connecting surface 19 is applied with a recess 21e for the dado joint coupling tenon 24e. The connecting timber 10e is dropped to the connecting surface 19 from above, and the timber is fixed by temporary nailing or a clamp so as to cause the connecting holes 12e and 13e to be integrally formed and the connector 1e is inserted from an opposite side of the connecting surface 19 of the bracket timber 11e. Then, adhesive agent is fed into the hollow part of the connector 1e, the adhesive agent is returned from the end part and an overflow at the feeding end is visually confirmed, thereafter the feeding port is repaired by a plug (not shown).

In FIG. 22, the bracket timber 11e composed of joint timber 10e and an independent column and the like is connected in the same manner as that of the aforesaid connecting method, then the connector 1e is inserted into connecting holes 12e, 13e and 12'e, 13'e formed in a step-wise manner, adhesive agent is fed and the return of the adhesive agent from the end part and overflow there is visually checked and the finishing process is then carried out.

As described above, according to the present working example, it has been found that the connection of the girder or the side beam or a cross-beam or the independent column can be carried out without performing any connection work of the tenon, mortise and tenon or a dovetail connection and, a cleanly connected structure having superior structural strength can be attained.

WORKING EXAMPLE 6

Next, the case in which the connector is inserted and fixed in a slant manner to the bracket timber or the joint timber will be described.

FIG. 23 is a configuration view showing a of a connection between the independent column and the lateral member, and FIG. 24-a is a substantial perspective view for showing a diagonal bracing connection structure and FIG. 24-b is a substantial front elevational view of FIG. 24-a.

In FIG. 23, adhesive agent is applied to the abutting surfaces of the joint timbers 10e and 10'e composed of two lateral timber, they are abutted against the bracket timber 11e composed of independent column, temporarily fixed with temporary nailing or clamp and the like, thereafter the connecting holes are punched with a drill from the upper and lower surfaces of the joint timbers 10e and 10'e in such a way as not to cross each other, up to the bracket timber 11e.

For the sake of convenience of description, the forming of the connecting hole has been described as being punched during its working operation. However, the plug or bracket material may be formed with a connecting hole in advance through a pre-cutting operation and 40 may also be applied.

Then, the connectors 1e and 1'e are inserted, adhesive agent is fed from one end of each of the connectors 1e, 1'e, an overflow of adhesive agent from between the outer surface of each of the connectors 1e and 1'e and the circumferential wall of the connecting hole is observed, thereafter the opening of each of the connecting holes is repaired by a plug or a putty or a filling agent.

In FIG. 24, the diagonal bracing 10f is changed from its pin connection to a rigid connection by applying adhesive agent to the abutment surfaces of the column 11f and the foundation 11'f and connecting them with temporary nailing and the like and then it is connected at a slant so as not to cross with the connecting holes 26, 26' and formed at the column 11f and the foundation 11'f in a cross-formed manner, thereafter the connectors 1f and 1'f are inserted, the adhesive agent is fed from the opening of each of the end portions of the connectors 1f and 1'f and after the returning of the adhesive agent is observed by visual inspection at the surface of each of the connectors 1f and 1'f and the circumferential walls of the connecting holes 26, 26', the finishiug process is carried out.

As described above, according to the present working example, since each of the connectors can be oppositely faced against the direction of the external force and can be connected to disperse the external force, the result is that the connection structure can be made into a rigid connection structure in which each of the connectors can resist tension, compression, bending and shearing stresses and the like. In addition, since the connector itself has a certain mechanical strength, merely installing the lesser number of connector enables the connection structure to have a structural strength more than three times that of the prior art system in a lesser number of working steps and it has been found that the working time can be remarkably shortened.

WORKING EXAMPLE 7

Next, a case in which the timbers or laminated wood of materials are connected to each other by the connector of the third preferred embodiment so as to form the beam or a long and large column or a thick plate will be described.

Figure 25:
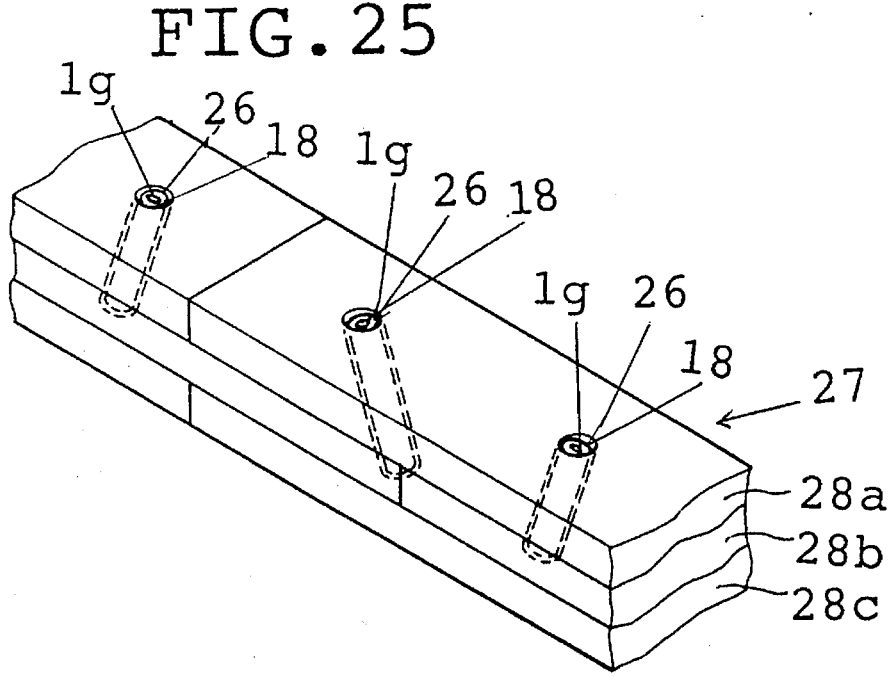
FIG. 25 is a substantial perspective view showing a connection structure for a rectangular column using the connector of the third preferred embodiment.
Figure 26:
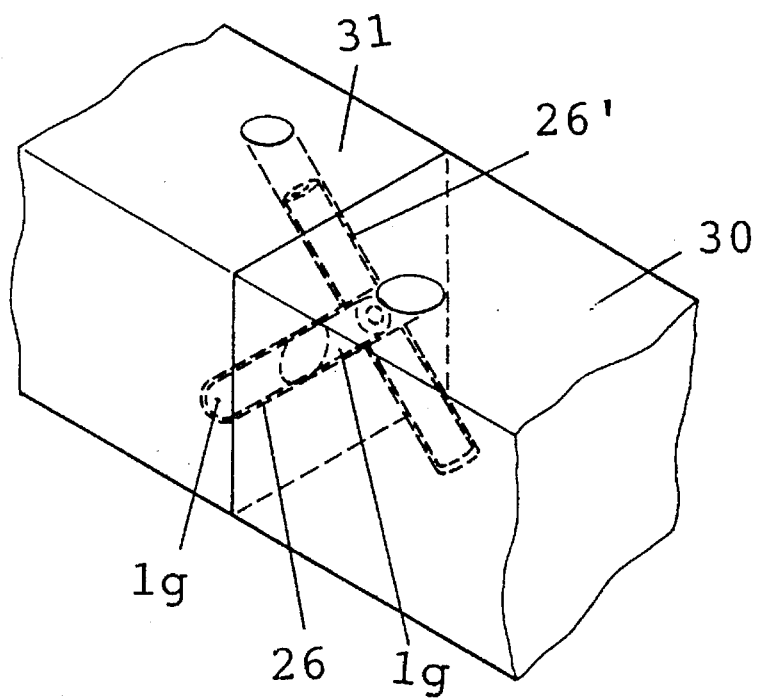
FIG. 26 is a substantial perspective view showing a connection structure of rectangular column using the connector of the third preferred embodiment.

FIG. 25 is a substantial perspective view for showing a connection structure for a rectangular column using the connector of the third preferred embodiment and FIG. 26 is a substantial perspective view for showing a connection structure of a rectangular column having a long and large span by connecting the rectangular columns to each other.

In FIG. 25, reference numeral 1g denotes a straight pipe-connector of the third preferred embodiment, reference numeral 27 denotes a rectangular column of 21 cm ×21 cm, reference numerals 28a, 28b and 28c denote flat plates in which a long plate having a length of 1 m and a short plate having a length of 50 cm are combined with each other, reference numeral 26 denotes a connecting hole formed in series in each of the flat plates 28a, 28b and 28c, reference numeral 18 denotes an adhesive agent filled between the connector 1g and the circumferential wall of the connecting hole 26.

As regards the connection structure of the rectangular column constructed as described above, its connection method will be described as follows.

At first, each of the abutment surfaces of the long plate and the short plate is coupled by the adhesive agent to make a flat plate 28c, the adhesive agent is applied to one surface, the long plate and the short plate are oppositely set using against the flat plate 28 using the adhesive agent, the flat plate 28b is similarly formed as before and the flat plate 28a is made in the same procedure and connected. After connection, three connecting holes 26 are made at the long plate and the short plate of each of the layers with a drill in an inclined manner. In this case, the flat plate 28c is punched up to about a center point of its thickness. The punched hole may be formed by a pre-cut in advance, to a predetermined shape and depth.

Then, adhesive agent is fed from one opening of the hollow part of the connector 1g and fed continually until the adhesive agent 18 can be visually confirmed to fill between the other opening of the hollow part and the circumferential wall of the connecting hole 26 after the adhesive agent returns back to the one opening. After feeding of the adhesive agents if required, when the adhesive agent is reduced in its volume due to an out-flow leakage or absorption in the timber material, the adhesive agent is fed again until the visual confirmation of the adhesive agent can be acknowledged and then the plug is buried or putty is applied to it for performing a finishing work.

In FIG. 26, reference numerals 30 and 31 denote rectangular columns composed of laminated wood of materials.

First, the rectangular columns 30 and 31 are abutted to each others the connector 1g is installed in the connecting holes 26, 26' punched at the end connecting surfaces of the rectangular columns 30, 31 and they are connected in the same manner as described above.

As described above, according to the present working example, a plurality of flat plates are combined with each other to enable the laminated rectangular columns to have superior mechanical strength with a rigid connection and manufactured in a quite simple manner and within a short period of time. In addition, it has been found that it is possible to manufacture the rather long rectangular columns (independent columns) or plates having a superior physical strength and having no deformation by properly selecting the length or number of the flat plates, selecting the connector and applying it. Since a length of the rectangular column in the usual system is restricted by the Traffic Road Law, a long and large wooden span beam or cross-beam could not be manufactured. However, it has been found that a long and large span beam or cross-beam having a superior structural strength can be easily manufactured on-site using the present working example.

As described above, according to the present preferred embodiment, it is possible to achieve a connecting method having structural strength by utilizing the strength of the connector and the adhesive agent along with bending, tension and shearing generated at the connection surfaces under a slant insertion and connection of the connector and so a connection with a wide application range can be attained. For example, a connection can be attained between the foundations, a connection between a column and the foundation, a connection between a column and a lateral member, a connection between an independent column and the lateral member, a connection between the lateral members, a connection between horizontal angle braces, a connection between cross-beams, a connection between a strut and a sleeper, a connection between the strut and a purlin, a connection between the clamps or a clamp and a column or a lateral member, a connection between a lateral rail and a column, a connection between a floor rail and a column, and a connection between an upstairs member and a down-stairs member or the like.

Preferred Embodiment 4

Figure 27:
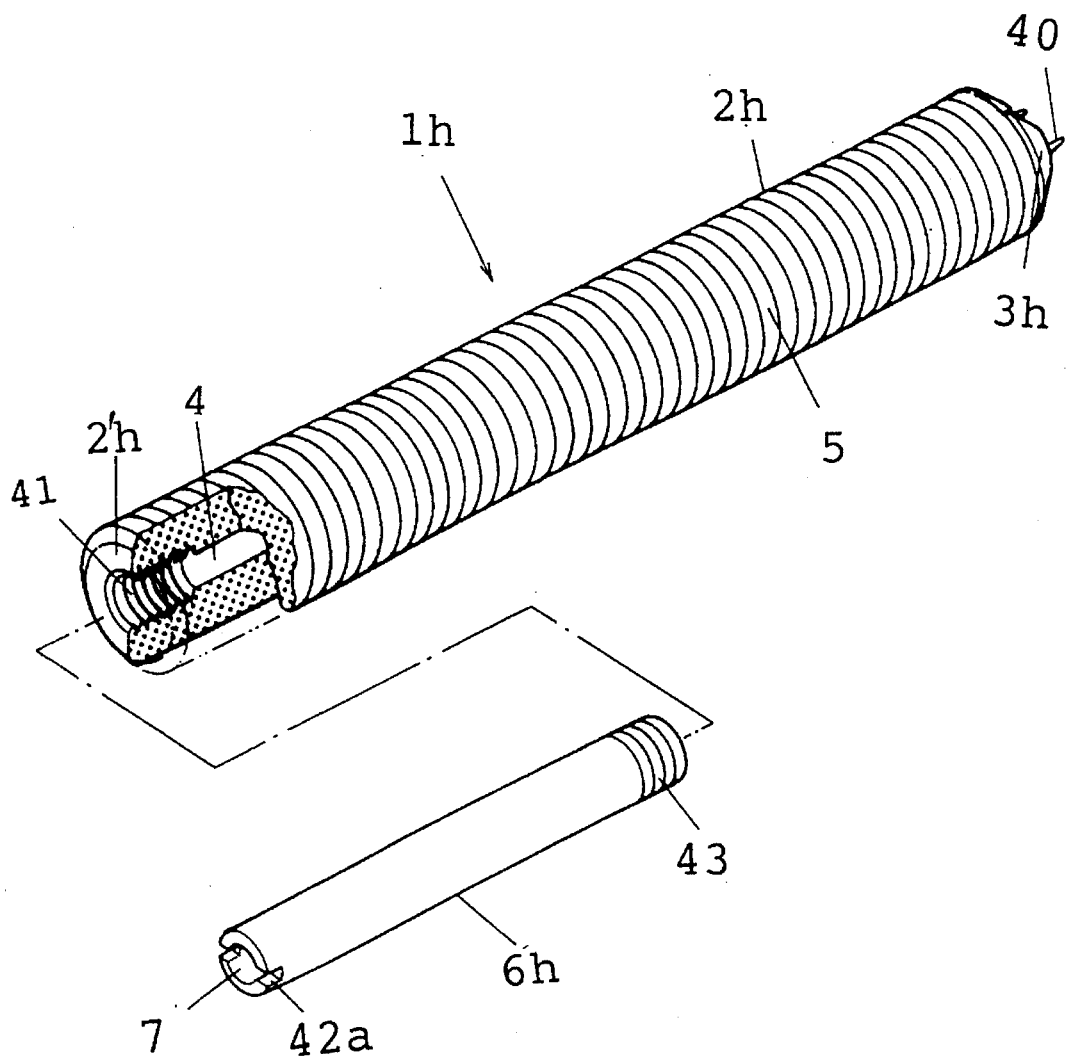
FIG. 27 is a perspective view partly in section of a connector according to a fourth embodiment of the present invention.

FIG. 27 is a perspective view with a part being broken away for showing the connector of the fourth preferred embodiment of the present invention, FIG. 28-a is a side elevational view, and FIG. 28-b is a substantial prespective view for showing the flowing -out end of the adhesive agent.

Reference numeral 1h denotes a metallic connector in which the branch pipe is engaged with the end part of the fourth preferred embodiment, reference numeral 2'h denotes a branch pipe engaging end part of a tubular member 2h, reference numeral 3h denotes an adhesive agent flowing-out end of the tubular member 2h, reference numeral 3h denotes an adhesive agent flowing-out end of the tubular member 2h formed into a bulged shape, reference numeral 40 denotes two projections projected and formed at symmetrical positions at the extreme ends of the adhesive agent flowing-out end 3h. Reference numeral 4 denotes a hollow part for the flowing-in of the adhesive agent formed at a longitudinal direction of a substantial sectional part of the tubular member 2h. Reference numeral 5 denotes a concave part or a convex part helically formed at the surface of the tubular member 2h. Reference numeral 41 denotes a tubular member engaging part helically formed at the hollow part 4 of the branch pipe engaging end part 2'h of the tubular member 2h. Reference numeral 6h denotes a synthetic resin branch pipe helically engaged to the branch pipe engaging end part 2'h of the tubular member 2h. Reference numeral 42a denotes a groove formed at the end part of the branch pipe 6h and fitting an end part of a drill therein when the engagement of the branch pipe is released from the connector and the branch pipe is pulled out of it. Reference numeral 7 denotes a branch pipe hollow part communicating with the hollow part 4 of the tubular member 2h formed at the branch pipe 6h. Reference numeral 43 denotes an engaging part helically formed at the end part of the branch pipe 6h and threadably engaged with the tubular member engaging part 41. Reference numeral 8h denotes an adhesive agent guiding groove formed in a concave shape at the surface of the adhesive agent flowing-out end 3h formed in a bulged shape.

The connecting method for structural members and the connecting construction between the structural members will be described hereinbelow using the connector according to the first embodiment designed as described above.

WORKING EXAMPLE 8

Figure 29:
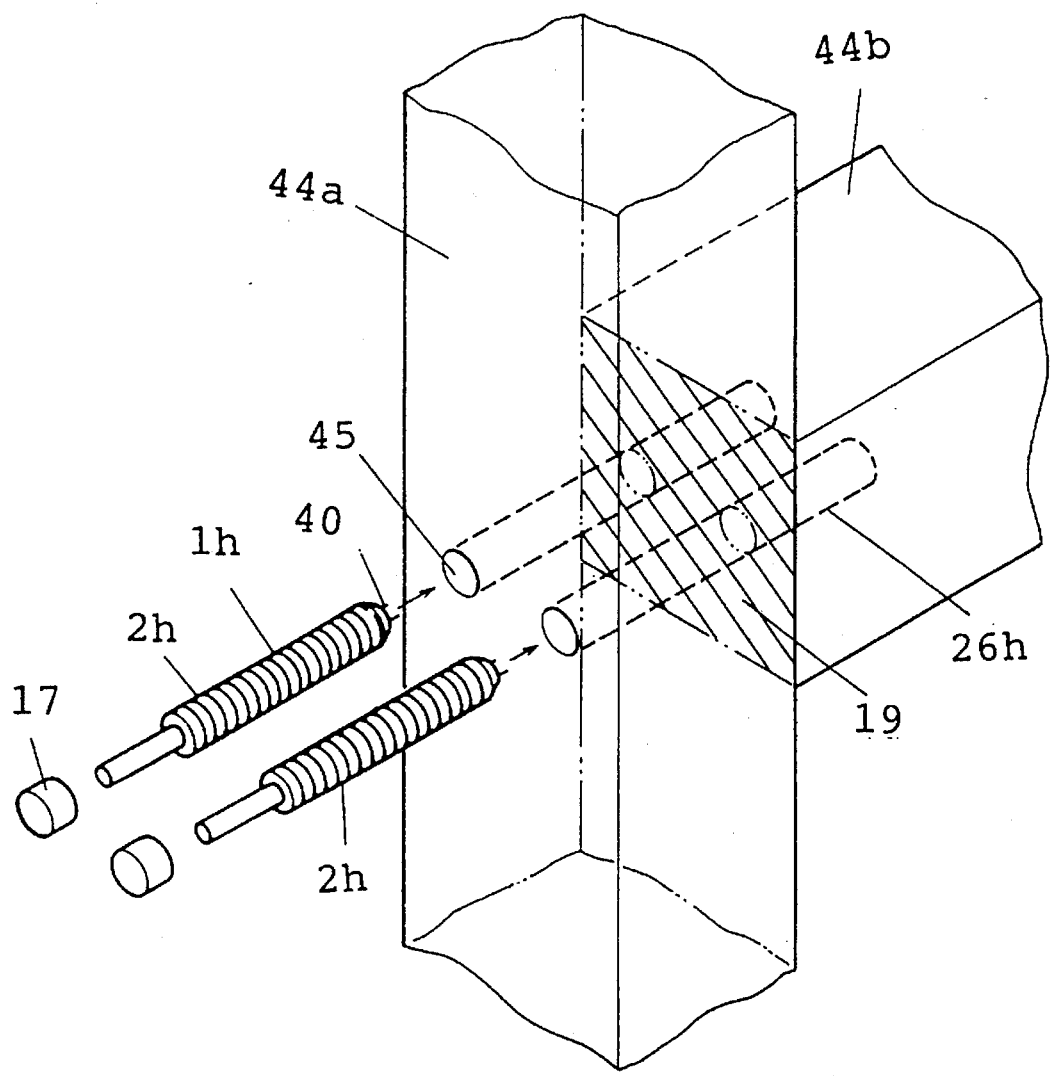
FIG. 29 is a perspective view of a connection joint execution such as a column of balloon frames, a girth using the connector according to the fourth embodiment of the present invention.

FIG. 29 is a perspective view at the time of connection joint connecting such as a column of balloon frames and a girth using the connector according to the fourth embodiment of the present invention; FIG. 30-a is a sectional parts in a central portion of the connecting hole showing the state where the connection joint is executed; and FIG. 30-b is a sectional view of essential parts in a central portion of the connecting hole portion showing the state where the connection joint has been completed. Reference numeral 44a denotes a joint timber such as a column of balloon frames, etc.; 44b a bracket timber such as a girth and the tile; 19 a connection joint connecting surface between the joint timber 44a and the bracket timber 44b; 26h a connecting hhole formed in communication with joint timber 44a and the bracket timber 44b; 45 an opening of the connecting hole portion 26h; 17 a plug; 18 an adhesive agent pouring gun; and 18 adhesiveagent poured from the branch pipe 6h and being filled until the outflow thereof is seen at the opening 45 of the connecting hole 26h while filling the connecting hole 26h via the hollow part 4 of the tubular member 2h and the adhesive guide groove 8h.

In execution, first, the connection hole 26h is bored by a drill or the like, which is communicated with thethe connecting hole portion 14 while filling the connecting hole portion 14 via the hollow part 5 of the tubular member 2 and the adhesive guide groove 11.

First, the connecting hole portion 14 is bored by a drill or the like, which is communicated with the connecting surface between the joint timber 44a and the bracket timber 44b, has a diameter slightly larger than that of the connector and has a depth such that the central portion of the connector 1h is at the connection joint connecting surface 19. The connector 1h is inserted into the connecting hole 26h, and the projecting ridge 40 are pierced into and mounted on the bottom of the connecting hole 26h. The adhesive agent pouring gun 46 is mounted on the opening of the branch pipe 6h, and the adhesive agent 18 is filled. As shown in FIG. 30-a, in filling the adhesive agent 18, the adhesive agent 18 is poured from hollow part 7 of the branch pipe as indicated by the arrow and is filled in a clearance between the surface of the tubular member 2h and the cercumferential wall of the connecting hole 26h passing through the hollow part 4. At this time, channeling and a short pass of the adhesive agent 18 are prevented by the buffer effect of the concave or covex parts 5 of the surface of the tubular member 2h so that the clearance is almost completely filled with the adhesive agent 18.

When the adhesive agent 18 further continues to be poured, it can be visualized that the adhesive agent 18 moves up while filling the clearance between the outer surface of the branch pipe 6h and the connecting hole 26h, thus capable of preventing non-uniform filling.

After the adhesive agent 18 has been visualized at the opening 45 of the connecting hole 26h, the branch pipe 6h is rotated half to release the engagement thereof with the tubular member 2h. Since the tubular member 2h is locked to the bottom by the projecting ridge 40, the tubular member 2h is neither rotated nor slipped out. Next, the plug 17 is put into the opening of the connecting hole 26h to make the surface flush. When the plug 17 is formed of the same material as that of joint timber 44a, the plug 17 can be integrated with the joint timber 44a without a sense of incompatibility. While in the present embodiment, the tubular member having a circular section has been used, it is to be noted that when a tubular member having a square or a triangle or ellipse in section is used, the connector can be merely inserted to prevent a connecting material in the connection joint surface from being rotated, thus enhancing the workability.

Experimental Examples 1 and 2

Seven sets of connecting test pieces were prepared with each of two cryptomeria wood pieces having a square of 10.5 cm×10.5 cm and a length of 115 cm being applied as one set. At test pieces, we made four sets of test pieces in which holes of a diameter of 18ϕ were passed with a drill from an opposite side of the cryptomeria crossing at a right angle toward the abutting connecting surface and two holes of a depth of 5 cm were punched at the connecting surface of the other cryptomeria wood pieces at a location spaced 2.5 cm from each of the end portions of the sectional line of the connecting surface so as to form connecting holes and further we made three sets of test pieces having four holes punched at locations spaced 3.5 cm from an angular top end of the orthogonal line of the conencting surface. Next, a connector formed from a tubular member made of metal having a diameter of 15ϕ, a length of 10 cm and a diameter of a hollow part of 5ϕ having a branch pipe of length of 7 cm and diameter of a hollow part of 3ϕ engaged with the end thereof is mounted to each connecting hole. The cryptomeria wood pieces are brought into contact with the connecting surface, the connecting portion is temporarily fastened by a support connectoror the like, and thereafter, a polyurethane family adhesive agent is filled from the branch pipe by an adhesive agent pouring gun. The back flow of the adhesive is visualized at the opening, after which the branch pipe is removed and the plug is mounted. After a predetermined time, the support connectoris removed and the test-piece was prepared.

The tensile test of the connecting portion was conducted using the prepared test piece. The results are given in Table 1.

TABLE 1

- Tension -
E (Young's modulus): tf/cm$^2$
Yield strength: tf
Rigidity: tf/mm
Rigidity-1: Experiment value of rigidity
Rigidity-2: Rigidity of base metal of testpiece

| Testpiece | No. | E(Young) | E(AVE) | Yield strength (tf) | Yield strength (AVE) | Rig.-1 | Rig.-2 |
|---|---|---|---|---|---|---|---|
| Exp. Ex. 1 | | | | | | | |
| TP2-1 | 67 | 56.12 | | 5.775 | | 16.04 | 14.56 |
| TP2-2 | 71 | 58.82 | | 6.060 | | 11.65 | 14.25 |
| | | | 59.69 | | 6.261 | | |
| TP2-3 | 49 | 58.96 | | 6.105 | | 19.69 | 15.29 |
| TP2-D | 42 | 64.86 | | 7.105 | | 14.00 | 15.72 |
| Exp. Ex. 2 | | | | | | | |
| TP4-1 | 41 | 56.64 | | 9.535 | (not destroyed) | 14.28 | 14.69 |
| TP4-2 | 82 | 58.64 | 58.13 | (9.845) | (not destroyed) | 20.73 | 15.21 |

TABLE 1-continued

- Tension -
E (Young's modulus): tf/cm$^2$
Yield strength: tf
Rigidity: tf/mm
Rigidity-1: Experiment value of rigidity
Rigidity-2: Rigidity of base metal of testpiece

| Testpiece | No. | E(Young) | E(AVE) | Yield strength (tf) | Yield strength (AVE) | Rig.-1 | Rig.-2 |
|---|---|---|---|---|---|---|---|
| TP4-3 Comp. Ex. 1 | 79 | 59.11 | | (9.075) | | 14.02 | 15.33 |
| TN-1 | 8 | 55.56 | | 5.215 | | 12.42 | 13.46 |
| TN-2 | 111 | 60.34 | 60.34 | 1.905 | 3.880 | 15.55 | 15.11 |
| TN-3 Comp. Ex. 2 | 36 | 63.12 | | 4.520 | | 27.82 | 15.29 |
| TO-1 | 72 | 55.86 | 58.82 | 3.900 | 3.953 | 0.27 | 14.49 |
| TO-2 Comp. Ex. 3 | 83 | 61.78 | | 4.005 | | 0.41 | 14.97 |
| TK-1 Comp. Ex. 4 | 72 | 55.86 | 55.86 | 1.600 | 1.600 | 0.41 | 13.54 |
| TA-1 | 101 | 56.64 | | 0.263 | | 0.05 | 13.72 |
| TA-2 | 102 | 58.64 | 58.13 | 0.285 | 0.283 | 0.06 | 14.21 |
| TA-3 | 103 | 59.11 | | 0.301 | | 0.06 | 14.32 |

T = tension
P = horizon
1, 2, 3, 4 = number of jigs
-1, -2, -3, -D = No. of testpiece
O = Oblique scarf joint
K = Stool mortire and tenon
N = Only butt end adhesion without jig
A = Dovetail connection joint Comparitive Examples 1 to 4

As comparative examples, cryptomeria wood piece having the same diameter and length as that of the Experimental Example 1 were used to prepare the following: three sets of butt end adhesion without a connector (Comparative Example 1), two sets of oblique scarf joints (Comparative Example 2), one set of stool mortire and tenon (Comparative Example 3), and three sets of dovetail connection joints (Comparative Example 4). Next, the tensile test was conducted under the same conditions as Experimental Example 1. The results are given in Table 1. For the oblique scarf joint and the stool mortire and tenon, the tensile test was conducted using the joint.

As will be apparent from Table 1, in the present Experimental Example, the tensile strength was 60 kg/cm$^2$ or more while in the comparative examples, the tensile strength was merely 16 kg/cm$^2$ to 40 kg/cm$^2$. In case of the dovetail connetion joint, the tensile strength (yield strength) was only 2 to 3 kg/cm$^2$. With respect to the rigidity, in the present Experimental Example, the rigidity exceeds that of base metal in some cases (19.69 tf/mm), which is 40 to 250 times of that of the Comparative Examples. It has been found that in case of the adhesive agent alone, the rigidity is high but the yield strength is quite uneven, and the safety is maintained by an effect of the connector.

As described above, according to the present embodiment, it has been found that the connecting construction excellent in mechanical strength can be obtained by the extremely simple processing and extremely simple work in which the connection joint processing of wood or the like merely comprises a forming of a connecting hole by a drill.

As described above, accordig to the preferred embodiment, it was found that a connecting structure having a superior mechanical strength could be attained with simple machining and also an easy work in which the connecting holes communicating and also an easy work in which the connecting holes communicatng between each of the structural members were punched with a drill.

WORKING EXAMPLES 9

Figure 32:
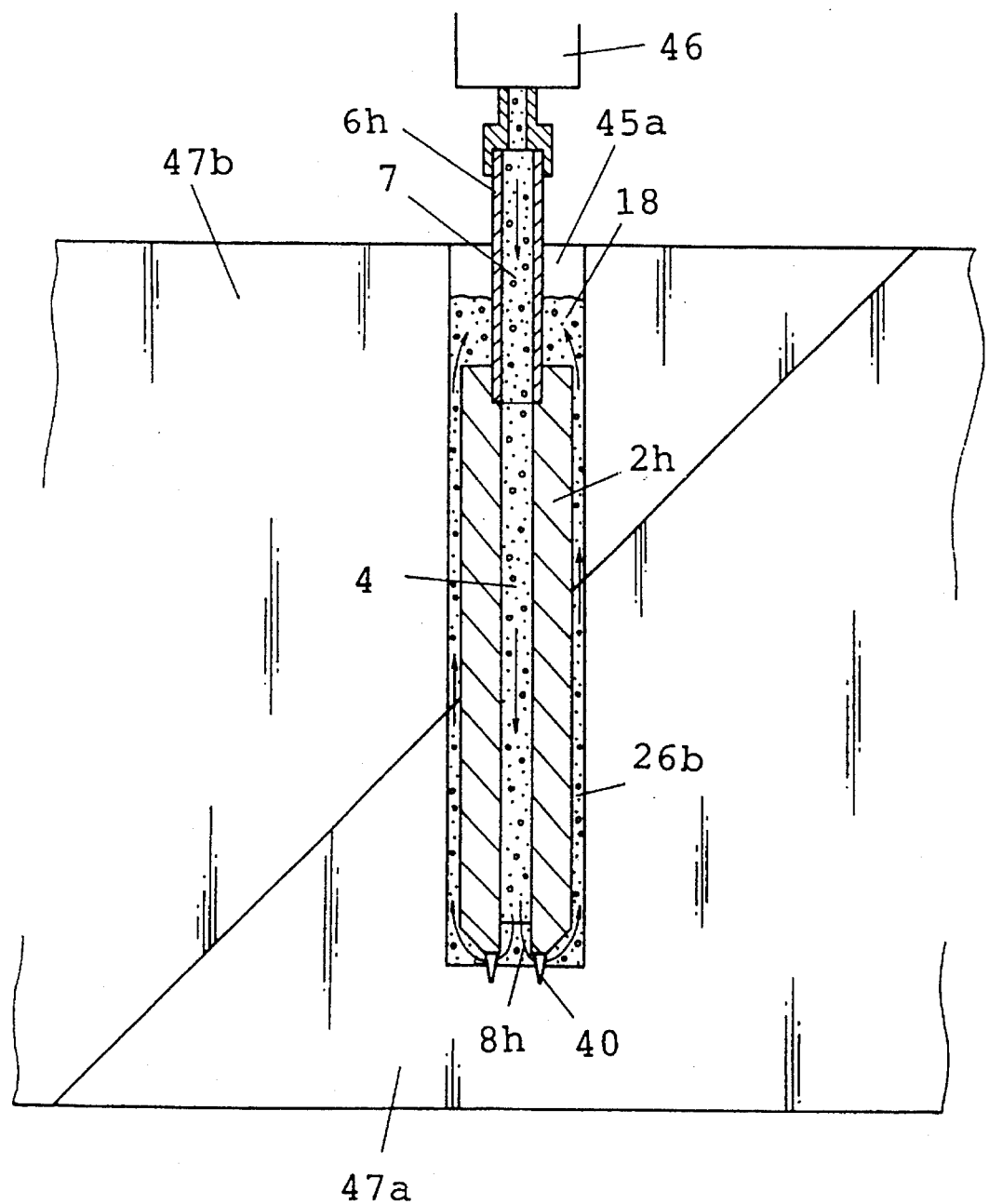
FIG. 32 is a sectional view of essential parts in a central portion of a connecting hole portion taken on line X—X of FIG. 31-a showing the state of the scarf joint execution using the connector according to the fourth embodiment of the present invention.

FIG. 31-a is a perspective view showing the execution of a scarf joint which is performed in the execution of groundsill or the like using the connector shown in the fourth embodiment, FIG. 31-b is a perspective view showing the state after execution, and FIG. 32 is a sectional view of essential parts in the central portion of the connecting hole portion taken on line X—X of FIG. 31-a in execution. Reference numerals 47a, 47b designate scarf joint materials such as columns formed of wood or laminated wood; 26b a connecting hole formed in communication with the scarf joint connecting surfaces of the scarf joints 47a and 47b; 45a an opening of the connecting hole 26b; 17a a plug used to cover the opening 45a of the connecting hole 26b after the scarf joint to make the column surface flush; 46 an adhesive agent pouring gun; and 18 an adhesive agent poured from the branch pipe 6h, the adhesive being filled until the outflow thereof is visualized at the opening 45a of the connecting hole 26b while filling the connecting hole 26b therewith via the hollow part 4 of the tubular member 2h and the adhesive agent guide groove 8h.

In execution, first, the connecting hole 26b is bored by a drill or the like, said connecting hole 26b being communicated with the scarf joint materials 47a and 47b and having a diameter slightly larger than that of the connector 1h and a depth such that the central portion of the connector 1h is at the connecting surface of each of the scarf joint materials 47a and 47b. An adhesive agent is coated on the butt end surface, and thereafter, the connector 1h is inserted into the connecting hole 26b and the projecting ridge 40 are pierced into the bottom. The adhesive agent pouring gun 46 is attached to the opening of the branch pipe 6h. Next, the adhesive agent 18 is filled. As shown in FIG. 32, the adhesive agent 18 is poured from the hollow part 7 of the branch pipe as indicated by the arrow and passes through the hollow part 4. Then, the adhesive agent 18 fills a clearance between the surface of the tubular member 2h and the circumferential wall of the connecting hole 26b. At this time, channeling and a short pass of the adhesive 18 are prevented by the buffer effect of the concave or covex part 5 of the surface of the tubular member 2h so that the clearance is almost completely filled with the adhesive agent 18. When the adhesive agent 18 further continues to be poured, it can be visualized that the adhesive agent 18 moves up while filling the clearance between the outer surface of the branch pipe 6h and the connecting hole 26b, thus capble of preventing nonuniform filling.

After the adhesive agent 18 has been visualized at the opening 45a of the connecting hole 26b, the branch pipe 6h is rotated half to release the engagement thereof with the tubular memebr 2h. Since the tubular member 2h is locked to the bottom of the connecting hole 26b by the projecting ridge 40, the tubular member 2h is neither rotated nor slipped out. Next, the plug 17 is put into the opening of the connecting hole 26b to make the surface flush. While in the present embodiment, the two pieces of tubular members having a circular section has been used, it is to be noted that when a tubular members having a square or a triangle or ellipse in section are used, one piece of the connector can be merely inserted to prevent the scarf joints from being rotated with each other, thus enhancing the workability.

Experimental Example 3

Comparative Example 5

The structural strength test was conducted in connection with the present Working Example. The results will be described below.

Twenty (20) lumbers 10 cm square and 115 cm length were prepared. For use with the embodiment, 5 sets each comprising two lumbers were subjected to scarf joint processing (Experimental Example 3), and for use with the comparative example, other 5 sets were subjected to stool mortire and tenon processing which is excellent in tensile strength (Comparative Example 5).

Next, as the embodiment, connecting holes having a diameter of 18φ and a depth of 5 cm were bored by a drill in a central portion of a scarf joint processing portion of each set of lumbers. Next, a connector 1h formed from a tubular member having a diameter of 15φ, and an overall length of 9 cm at a hollow part 5φ having a branch pipe having a diameter of 5φ and a hollow part 2φ threadedly mounted thereon is mounted into a hole portion with a butt end coated with adhesive, and the contact surface thereof is brought into contact therewith. The Woodrock as the adhesive agent is filled by the adhesive agent pouring gun and connected to prepare a test piece. These test pieces were subjected to the tensile test, and as a result, it has been found that those in the present embodiment had the tensile strength in excess of 50 kg/cm². On the other hand, those in prior art merely have the tensile strength less than 16 kg/cm².

It has been found, as will be apparent from the above-described structural strength test, that the connecting construction of the present embodiment had the tensile strength more than three times of the connecting construction according to the conventional method, despite the fact that the connecting method of the present embodiment is extremely disadvantageous in comparison with the conventional method.

As described above, according to the present embodiment, it has been found that the joint processing of structural members such as scarf joint of lumber and the like is an extremely simple processing in which a connecting hole is merely formed, and also in the connecting method, a connecting construction excellent in mechanical strength can be obtained by an extremely simple work in which an adhesive agent is coated on connecting surface as required and the adhesive agent is poured into the connector. In case of lumber or the like, it has been found that when the connector is inserted and mounted parallel with the direction of fibers, the connecting strength can be increased. When materials such as laminated wood in which the direction of fibers perpendicularly intersects biaxial directions, it has been found that even if they are used irrespective of the direction of fibers, they have extremely strength.

WORKING EXAMPLES 10

Next, an working example will be described which uses the connector described in the fourth embodiment between the column and groundsill, between the column and horizontal member such as cross-beam, girth, upstairs beam, etc., between the side beam, post and purlin (ridge pole), and between the pole plate and tie beam.

Figure 33:
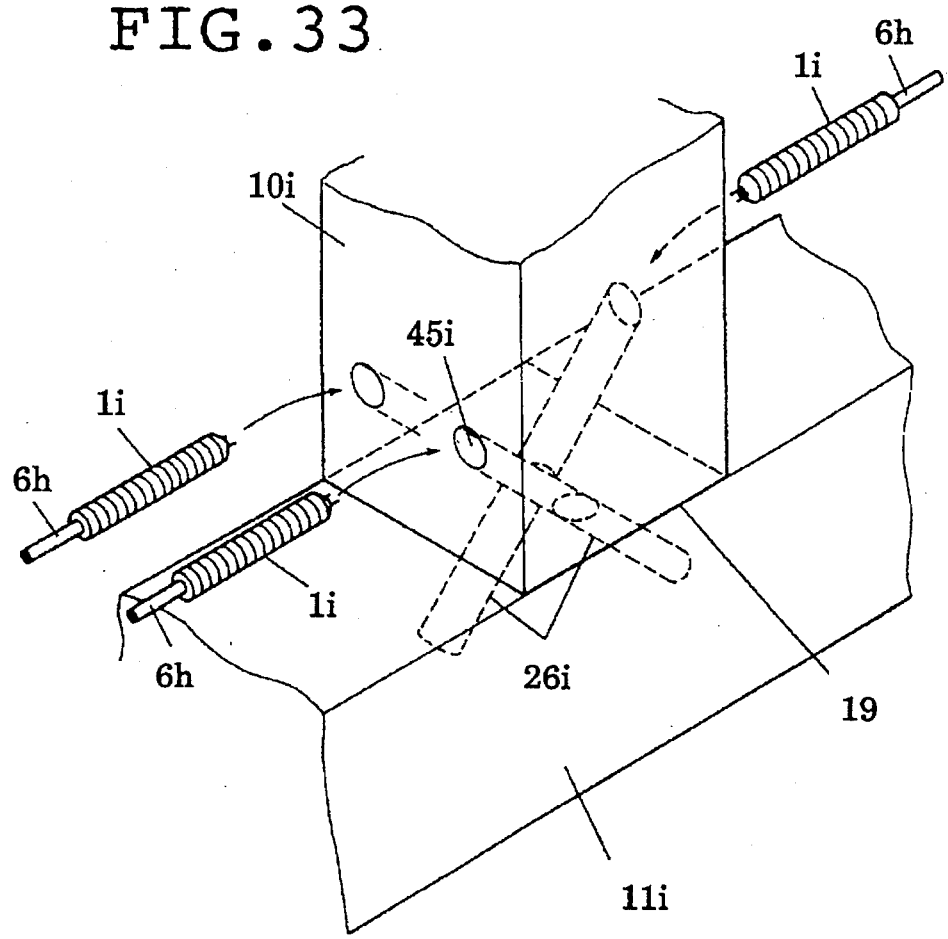
FIG. 33 is a configuration view of a thrust joint execution using the connector according to the fourth embodiment of the present invention.

FIG. 33 is a configuration view of the thrust-joint execution used to connect between the column, post and groundsill, between the column, post and horizontal member (cross-beam, girth, purlin, small beam) or between the horizontal members using the connector described in the fourth embodiment. Reference numeral 1i designates a connector wherein a hollow part 4 for receiving an adhesive agent having a sention of approximately ½ to ¼ is formed in the central portion and concave or convex 5 are formed on the surface in predetermined spaced relation; 10i an insert wood which constitutes a column, post, horizontal member, etc.; 11i a receiving wood which constitutes horizontal members such as a groundsill, cross-beam, girth and purlin; 19 a connecting surface; and 26i a connecting hole portion formed to be substantially equal to or slightly larger than an outside diameter of the connector 1i.

Next, the execution method of the present working example will be described.

First, the bracket timber 10i is brought into contact with the joint timber 11i, which are temporarily fastened. The connecting hole 26i is bored to receive the tubular member 2i of the connector 1i. It is noted that the connecting hole 26i may be formed in advance. Next, the connector 1i is inserted into the connecting hole 26i and fixed, and the adhesive agent is poured from the branch pipe 6h. The adhesive agent continues to be poured until the adhesive agent can be visualized at the opening 45i of the connecting hole portion 26i while filling the outer periphery of the branch pipe 6h from the circumferential wall of the connecting hole 26i. After the adhesive has been visualized, the branch pipe 6h is removed and the plug 17 is put into the opening of the connecting hole portion 26i to make the surface flush.

The connecting construction will be described below in connection with the connecting method for structural members constructed as described above.

In the present working example, the connector 1i is mounted and at the same time the brqacket timber 10i such as a column is prevented from being rotated and can be connected to the joint timber 11i. Accordingly, a rigid connecting construction can be easily obtained without depending on the complicated connection joint structure as in prior art. In addition, at the time of framing completion, the connector 1i receives external forces from the front and rear as viewed in the figure. Therefore, it is possible to prevent lumbers from being slipped out and from being opened, thus securing the safety when assembled.

Preferred Embodiment 5

Figure 34:
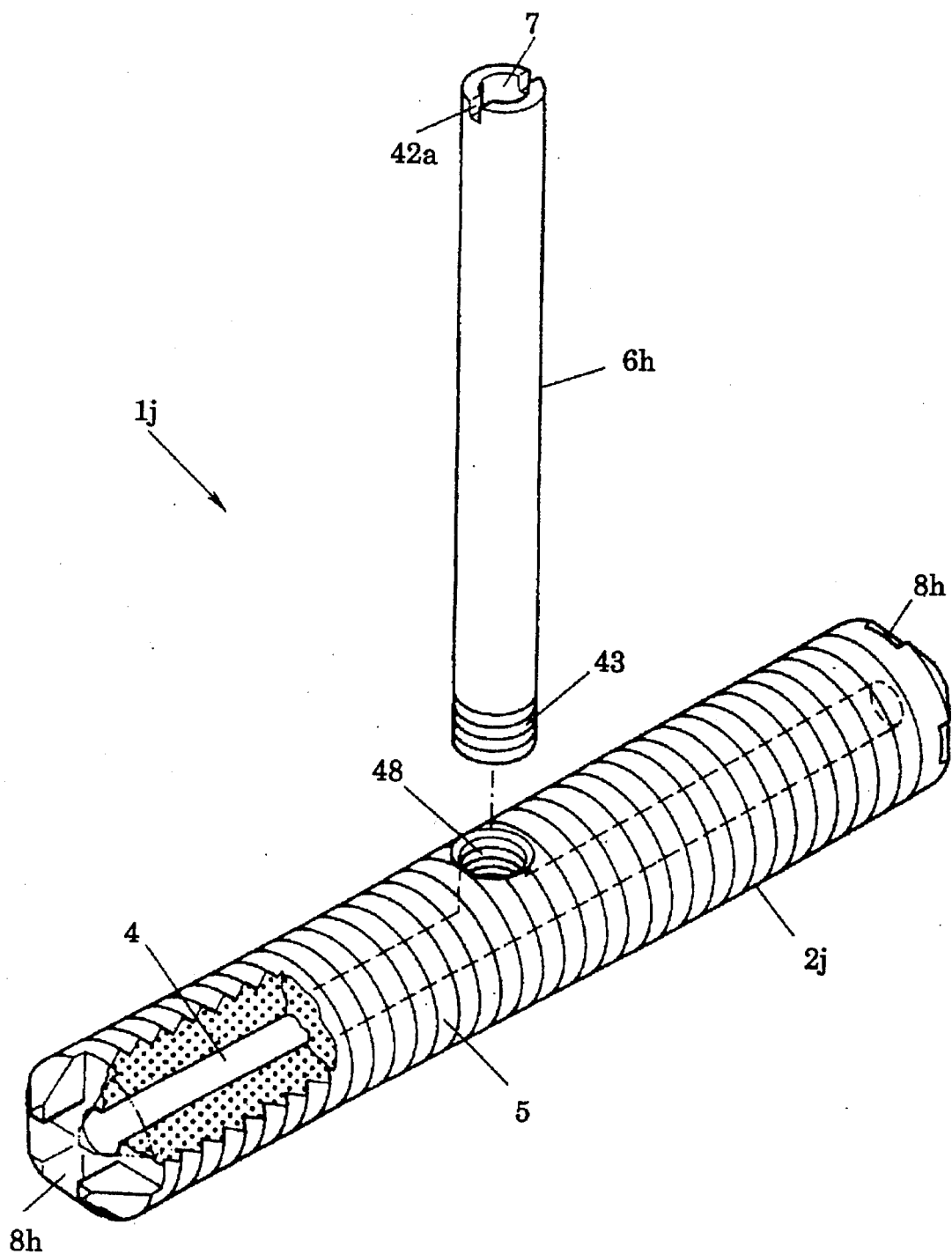
FIG. 34 is a perspective view partly in section of a connector according to a fifth embodiment of the present invention.

FIG. 34 is a perspective view partly in section of a connector according to a fifth embodiment of the present invention.

Reference numeral 4 denotes hollow part, 5 concave or convex part, 6h a branch pipe; 8h adhesive agent guiding groove;. 42a a groove part; 7 a hollow part of the branch pipe; and 43 an engaging portion. These elements are similar to those shown in the Embodiment 1, and a description thereof will be omitted while using the same reference numerals.

Reference numeral 1j denotes a metallic connector wherein a branch pipe is engaged in a hole portion for a branch pipe formed at a predetermined portion lengthwise of the tubular member in the fifth embodiment; and 2j a metallic tubular member in the form of a hollow rod; 48 a spirally formed hole for a branch pipe bored in a substantially central portion lengthwise of the tubular member 2j while being communicated to the hollow part 4.

WORKING EXAMPLE 11

Figure 35:
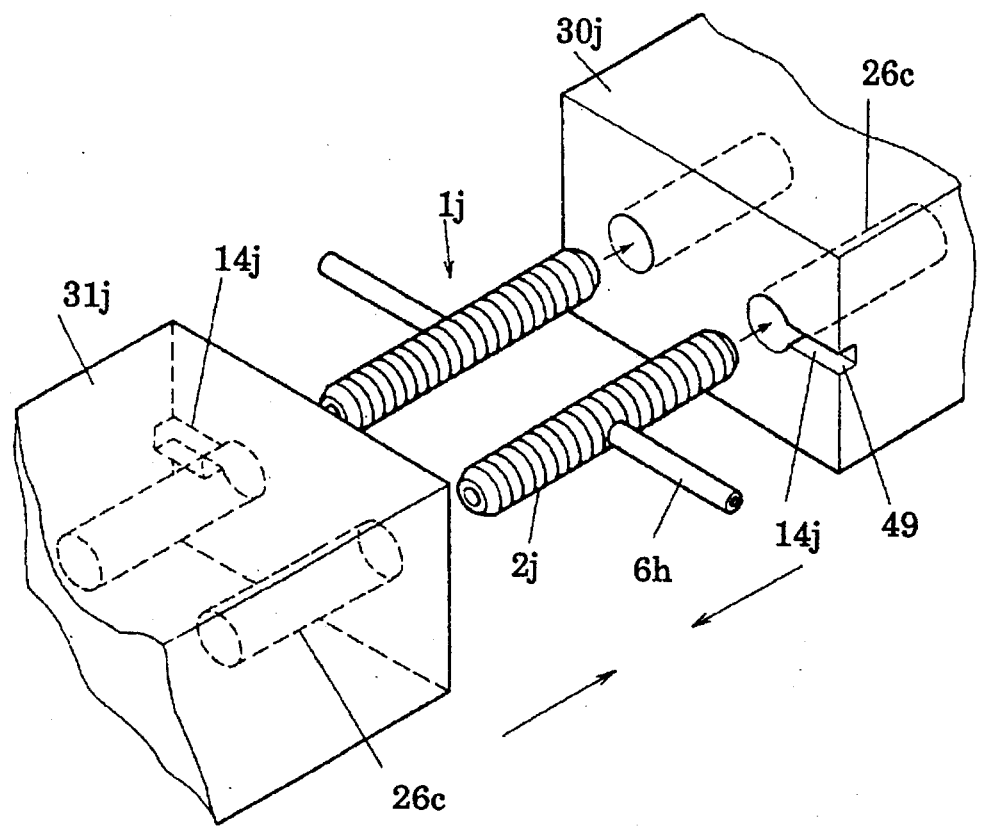
FIG. 35 is a perspective view of a thrust joint execution using the connector according to the fifth embodiment of the present invention.
Figure 36:
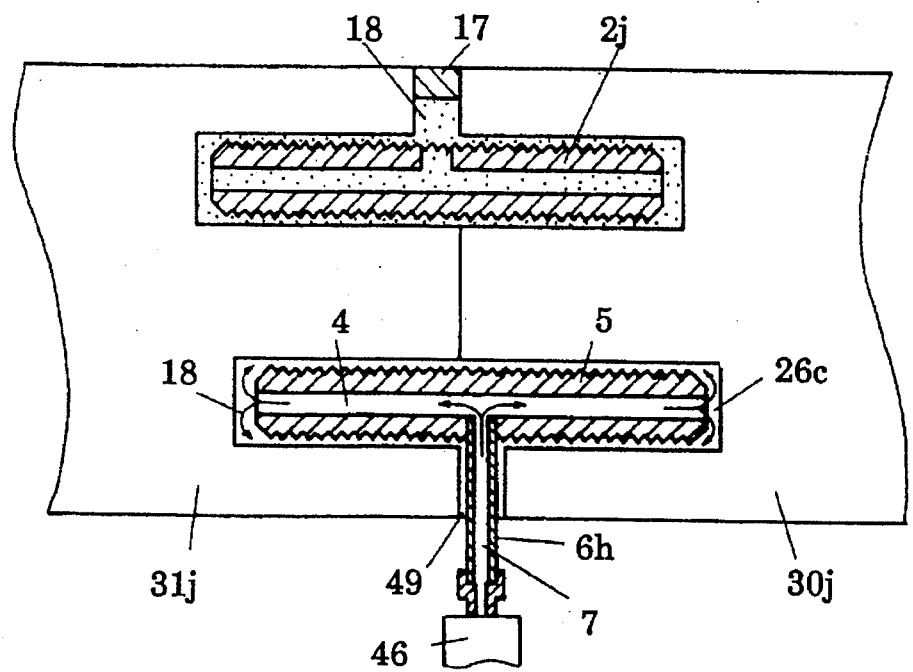
FIG. 36 is a sectional view of essential parts in a central portion of a connecting portion showing the state of the thrust execution using the connector according to the fifth embodiment of the present invention.

FIG. 35 is a perspective view showing the thrust execution used to connect beams or cross-beams using the connector according to the fifth embodiment of the present invention, and FIG. 36 is a sectional view of essential parts in the central portion of the connecting portion showing the execution.

Reference numeral 26 denotes a connecting hole formed in the thrust connecting surface; 30j, 31j beams subjected to the thrust joint; 14j a branch pipe mounting groove cut to mount the branch pipe 6h in the contact surface of the connecting hole 26c; 49 an opening of the branch pipe mounting groove 14j; and 17 an adhesive agent.

In the execution of the present embodiment, first, the connecting hole 26c is bored by a drill or the like, said connecting hole 26c being communicated with the contact surfaces of the beams 30j, 31j subjected to the thrust and having a diameter slightly larger than that of the connector and a depth such that the central portion of the connector 1j is at the connecting surface of each of the beams 30j, 31j. The branch pipe 6h mounting groove 14j is formed in the contact surface of one connecting hole 26c communicated. Next, the tubular member 2j with which is engaged the branch pipe 6h is inserted into the connecting hole portion 14c communicated with the contact surface, and the beams 30j, 31j are brought into contact therewith and temporarily fastened by means of support connectoror the like.

Next, the adhesive agent pouring gun 46 is attached to the opening of the branch pipe 6h. The adhesive agent 18 is filled in the connecting hole 26c until the adhesive agent 18 is visualized at the opening 49 of the branch pipe mounting groove. 14j while filling the connecting hole 26c via the hollow part 4 of the connector 1j. As shown in FIG. 37, the adhesive agent 18 is poured from the hollow part 7 of the branch pipe as indicated by the arrow and passes through the hollow part 4. Then, the adhesive 18 fills a clearance between the surface of the tubular member 2j and the cercumferential wall of the connecting hole 26c as same manner as that of the aforesaid fourth embodiment.

The structural strength test was conducted in connection with the present working example. The results will be described below.

Experimental Examples 4 and 5

The branch pipe and crystomeria wood pieces in the Experimental Example 1 were prepared except that as connectors, three connectors made of metal having a diameter of 15φ, a diameter 5φ of the hollow part and a length of 10 cm (Experimental Example 4) and three connectors having a length of 36 cm (Experimental Example 5) are used.

At parts 2.5 cm from both ends of a central transverse line of the butt end surface of the end of each cedar, a hole portion having a diameter of 18φ and a length of approximately 6 cm (Experimental Example 4) and a hole portion having a diameter of 18φ and a length of approximately 19 cm (Experimental Example 5) are bored by a drill to form connecting holes. Next, two branch pipe mounting grooves are cut and formed by a router in one of the paired crystomeria wood pieces in parallel from the connecting hole portion toward both outer sides as shown in FIG. 36. The connector of the Experimental Example 4 or 5 is mounted in two connecting hole portions of the pair of crystomeria wood pieces and the branch pipe mounting groove, both the crystomeria wood pieces are brought into contact with each other and fastened by the support jig, and after this, the polyurethane family adhesive agent is filled from the branch pipe by the adhesive pouring gun. After the backflow of the adhesive has been visualized at the opening, the branch pipe is removed and the plug is mounted. After the adhesive agent has been solidified, the bending strength test was conducted in accordance with the conventional manner. The results are given in Tables 2 and 3.

TABLE 2

| | - Bend - (Yield strength) | |
| --- | --- | --- |
| Testpiece B = bend | Yield strength (kgf) | E (Young modulus) (tf/cm$^2$) |
| Exp. Ex. 4, 5 | | |
| B2-100-1 | 323.67 | 57.18 |
| B2-100-2 | 394.52 | 57.30 |
| B2-100-3 | 339.77 | 66.94 |
| B2-100-3 | 339.77 | 66.94 |
| B2-360-1 | 1024.10 | 55.17 |
| B2-360-2 | 1107.90 | 60.06 |
| B2-360-3 | 842.19 | 61.03 |
| Comp. Ex. 5, 6 | | |
| BK-1 | 106.28 | — |
| BK-2 | 178.74 | — |
| (Reversed bend) | | |
| BO-1 | 454.11 | — |

B = Bend

TABLE 2-continued

- Bend -
(Yield strength)

| Testpiece<br>B = bend | Yield<br>strength<br>(kgf) | E<br>(Young modulus)<br>(tf/cm²) |
| --- | --- | --- |

K = Stool mortire and tenon
O = Oblique scarf joint
Bx - y - t B: Bending test
x: number of connecting jigs
y: length of jig

TABLE 3

- Bend -
(Rigidity)

| | Rigidity (kgf/mm) | | |
| --- | --- | --- | --- |
| Testpiece | Displacement<br>at 10 mm | Displacement<br>at 20 mm | Calculated<br>value |
| Exp. Ex. 4, 5 | | | |
| B2-100-1 | 18.7452 | 13.6911 | 16.581 |
| B2-100-2 | 20.7945 | 16.8854 | 16.616 |
| B2-100-3 | 14.8562 | 12.8331 | 19.411 |
| B2-360-1 | 17.2634 | 16.7372 | 15.998 |
| B2-360-2 | 17.5938 | 16.7847 | 17.416 |
| B2-360-3 | 18.5793 | 17.7816 | 17.698 |
| Comp. Ex. 5, 6 | | | |
| BK-1 | 3.758 | 2.964 | — |
| BK-2 | 8.537 | 7.056 | — |
| (Reversed bend) | | | |
| BO-1 | 13.932 | 13.758 | — |

B = Bend
K = Stool mortire and tenon
O = Oblique scarf joint
Bx - y - t B: Specimen for bending test
X: number of jig
y: length of jig
t: testpiece No.

Comparative Examples 6 and 7

The cedar of the Experimental Example 1 was used to prepare test pieces for stool mortire and tenon and oblique scarf joint. The bending test was conducted in a manner similar to the Experimental Example 4. The results are given in Tables 2 and 3.

As will be apparent from Tables 2 and 3, in the present embodiment, the bending yield strength (kgf) is 330 kgf to 1100 kgf, whereas in the Comparative Examples, the bending yield strength is 100 kgf in the stool mortire and tenon and 450 kgf in the oblique scarf joint.

It has been found from the foregoing that the connection simply afforded with the bending yield strength that has been never attained by prior art can be obtained by changing the length and the number of the connectors. Also, with respect to the rigidity, in the present embodiment, the rigidity close to that for onepiece article is obtained and the rigidity higher than that of prior art can be obtained.

From the foregoing, according to the present embodiment, it has been found that a wide span can be employed, a structure close to rigid connection (close to the Rahmen structure) from a pin structure in design results, and the design will have a width and an extent.

As will be apparent from the aforementioned structural strength test, according to the connecting method of the present embodiment, the same rigidity as that of the one-piece article despite the extremely simple connecting method in comparison with the conventional connecting method can be obtained. Therefore, beams of lengthy span havig a large section, girthes and so on that have been heretofore difficult to be available can be easily obtained in field. Further, fragments or the like can be effectively used.

Preferred Embodiment 6

Figure 38:
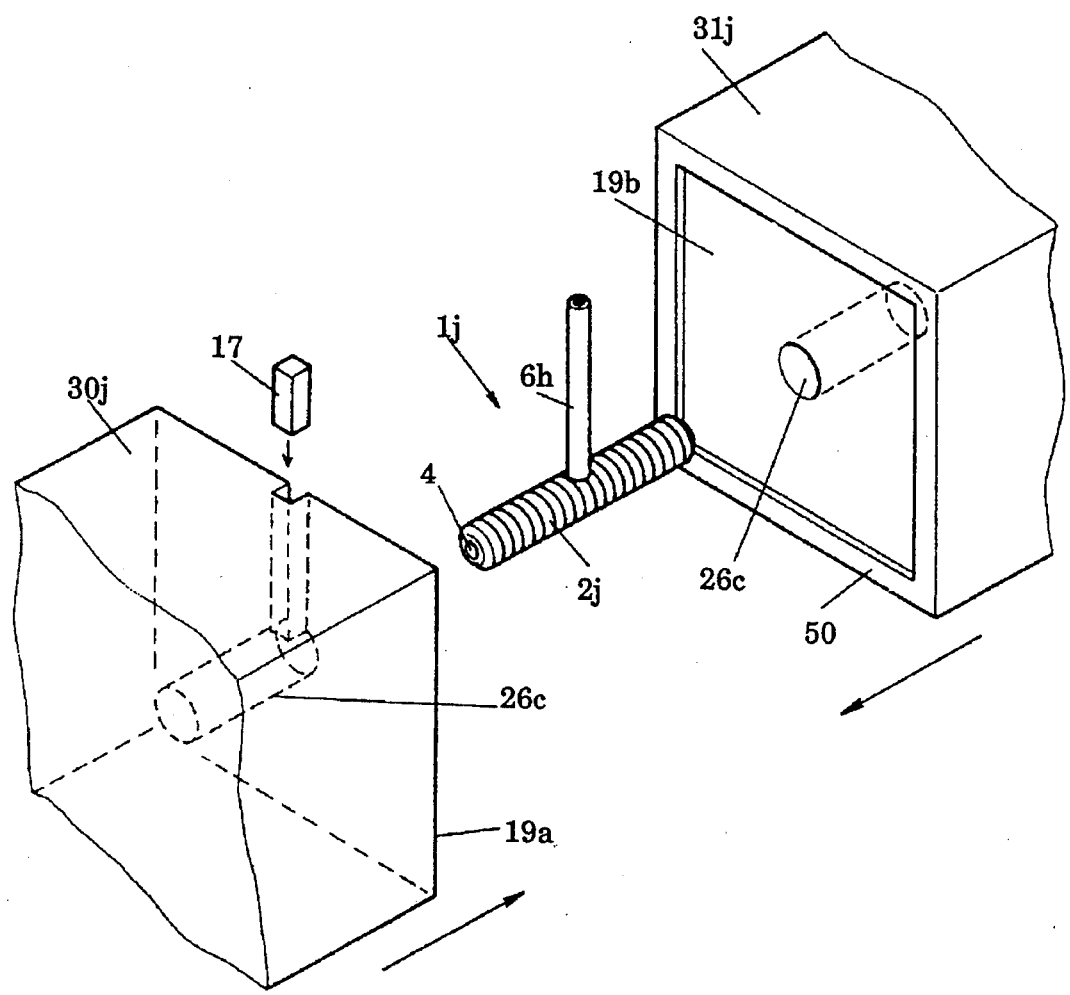
FIG. 38 is a perspective view showing a connecting method for the building structure of the sixth preferred embodiment of the present invention.

FIG. 37-a is a sectional view for showing a flow of adhesive agent when the structural members of the building structure of the sixth preferred embodiment of the present invention are connected. FIG. 37-b is a sectional view for showing a connection structure. FIG. 38 is a sectional view for showing the connecting method.

In FIG. 37, reference numerals 30j, 31j denote structural members composed of an laminated wood or the like. 26c: a connecting hole of a connector formed to be communicated with the abutment surface of each of the structural members 30j, 31j. 1j: a connector composed of a cylindrical member 2j buried in the connecting hole 26c of the connector and of a branch pipe 6h removably and threadably engaged with the branch pipe engaging hole punched in a longitudinal predetermined part of the cylindrical member 2j. 4: a hollow part for use in feeding adhesive agent formed at an axial central part of the connector 1j. 18: an adhesive agent that flowed from the hollow part 4 of the cylindrical member 2j of the connector 1j into the cylindrical member 2j as indicated by an arrow in FIG. 38-a and filled in a clearance between the outer surface and the connecting hole 26c. 46: an adhesive agent feeding gun. 48: a branch pipe engaging hole where thread or engaging part is formed to be communicated with the hollow part 4 of the cylindrical member 28. 19a, 19b: connecting surfaces of the structural members 30j, 31j. 50: a convex wall enclosing a circumference of the connecting surface 19b. 51: an adhesive agent accumulation part formed at the convex wall 50 having an edge part with a width of about several milimeters to several cm made by scooping out an inside part of the connecting surface 19b to a shallow depth of 0.01 to several cm in response to the size of the coupling or end part. 52: an air discharge part also acting as the branch pipe installation groove formed at the connecting surface 19b of the structural member 31j by cutting from the end part of the connecting hole 26c towards the outer surface thereof. 17: a plug.

In reference to the connection structure for a building structure of the preferred embodiment constructed as described above, its connecting method will be described as follows.

Connecting holes 26c are punched at the connecting surfaces 19a, 19b of the structural members 30j, 31j, and an air discharge part 52 also acting as the branch pipe installation groove is cut and formed in the structural member 30j. The connecting surface of the structural member 31j is scooped out shallow except for the convex wall 50 to form a concave part of the adhesive agent accumulation part 51. Then, the cylindrical member 2j of the connector 1j is installed in the connecting hole 26c and the branch pipe 6h is installed in the air discharge part 52, and the connecting surfaces 19a, 19b of the structural members 30j, 31j are abutted. Adhesive agent 18 is fed by an adhesive agent feeding gun 46. The adhesive agent 18 is filled while discharging air in the clearance between the outer circumferential surface of the cylindrical member 2j and the connecting hole 26c through the branch pipe 6h and the hollow part 4 of the cylindrical member 2j, and finally reaches the adhesive agent accumulation part 51. The adhesive agent 19 is filled while pushing out the air from the lower part of the adhesive agent accumulation part 51 and the adhesive agent is returned back from the air discharge part 52. After checking the return flow of the adhesive agent with eyes, the branch pipe 6h is pulled out, the plug 17 is inserted into the hole flush with its surrounding surface so as to complete the connection structure. If the structure is temporarily fixed by a supporting connectoror a nailing until the adhesive agent is set, its operability can be improved.

The adhesive agent accumulation part 51 may be formed such that a synthetic resin tape or sheet adheres to the outer circumference of the connecting surface 19b in place of the scooping out the connecting surface 19b.

As described above, according to the connecting structure of the sixth preferred embodiment, the connecting part can scarcely be seen from outside which improves its outer appearance and the adhesive agent is forcedly applied at the connecting surface to enable connection strength at the connecting part to be remarkably improved while operating together with the connector.

Preferred Embodiment 7

Figure 39:
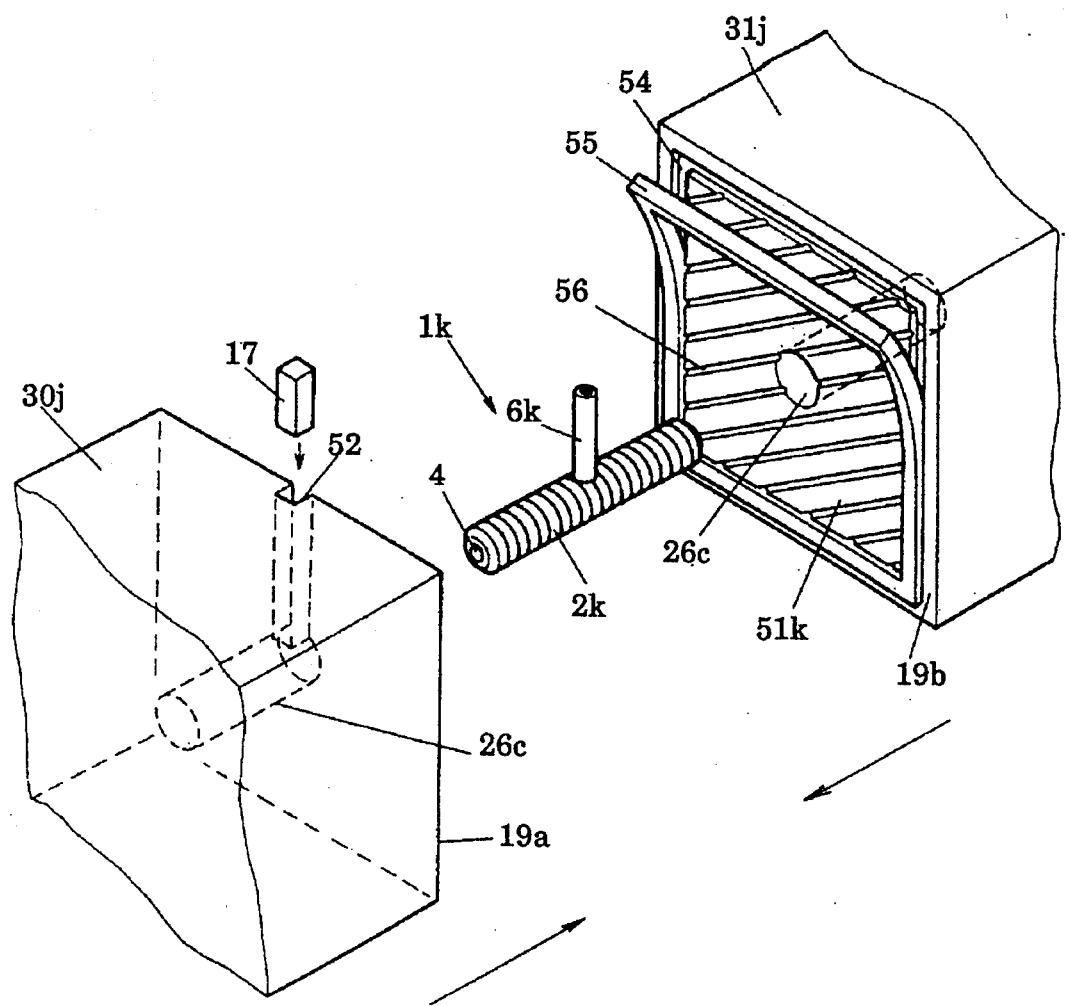
FIG. 39 is a perspective view showing a connecting method for the building structure of the seventh preferred embodiment of the present invention.

FIG. 39 is a perspective view for showing a connecting method for the building structure of the seventh preferred embodiment. The first different feature of FIG. 39 different from the sixth preferred embodiment in FIG. 38 is that the branch pipe 6k of the connector 1k is formed short, fixed to the cylindrical member 2k and buried in the connecting part. The second different feature consists in that an enclosing groove 54 is formed inside a part near the outer circumference of the connecting surface 19b of the structural member 31j, and a seal member 55 composed of a packing or the like is fitted into the enclosing groove 54. The third different feature consists in that the adhesive agent accumulation groove 56 formed by an edging working is formed at the adhesive agent accumulation part 51k enclosed by the seal member 55. The fourth different feature consists in that the adhesive agent accumulation part 51k is formed by a clearance between the connecting surface 19a of the structural member 30j and the seal member 55 at the connecting surface 19b of the structural member 31j.

In reference to the connection structure of the building structure of the preferred embodiment constructed as described above, its connecting method will be described as follows.

First, an adhesive agent is fed from the branch pipe 6k with the adhesive agent feeding gun in the same manner as that shown in the sixth preferred embodiment. Adhesive agent flowing out of the hollow parts 4 at both ends of the connector 1k is filled in the connecting hole 26c, flows to the adhesive agent accumulation part while discharging air at the adhesive agent accumulation groove 56 or the adhesive agent accumulation part 51k through the air discharge part 52. Upon visual confirmation of the return flow of the adhesive agent between the air discharge part 52 and the branch pipe 6k, the adhesive agent feeding gun is pulled out and a plug 17 is applied to the air discharge part 52.

As described above, according to the connection structure of the seventh preferred embodiment, it is possible to get a connection structure having a strong end connection with adhesive agents at the adhesive agent accumulation part 51k and the adhesive agent accumulation groove 56 enclosed by the seal member 55 and having a quite strong connection structure caused by the connector 1k and the connecting hole 26c.

In place of the seal member 55 of the preferred embodiment, a seal member having the part of the sir discharge part 52 cut may be used. In particular, this is effective when the diameter of the air discharge part 52 is narrow. In addition, in the preferred embodiment, an enclosing groove 54 is formed only at one connecting surface and both enclosing grooves may be formed at both connecting surfaces. This is applied to prevent leakage of the adhesive agent. With such an arrangement, the air discharge part 52 may be formed in shallow at an opposing surface of each of the connecting surfaces, and the connecting holes 26c may be formed to the same length, resulting in that the connecting holes 26c can be easily formed.

Preferred Embodiment 8

FIGS. 40-a, 40-b and 40-c are perspective views respectively showing a connecting method in the connection structure in a building structure of the eighth preferred embodiment.

The first different feature differing from that of the sixth preferred embodiment shown in FIG. 38 consists in that the adhesive agent accumulation part 58 not coated with any adhesive agent and an adhesive agent applying part 59 coated with adhesive agent when the structural members 30j, 31j are connected are formed by a seal material 57 composed of double-surface tape or seal or the like arranged to adhere at the outer circumference of the connecting surface 19b of the structural member 31j or on the connecting surface.

In reference to the connection structure of building structure of the preferred embodiment constructed as described above, its connecting method will be described as follows.

At first, after installing the connector, adhesive agent of non-foaming type or foaming type is applied to the adhesive agent coating part 59 to connect the connecting surfaces. Then, adhesive agent is fed to the connector 1j and the work is carried out in the same manner as that of the preferred embodiment No.6.

As described above, according to the preferred embodiment, since each adhesive agent accumulation part 58 and adhesive agent coating part 59 is formed, the type of adhesive agent at each of the component parts can be changed and the connection strength at the connecting surfaces can be improved and a fast operation time achieved. That is, as the adhesive agent to be fed into the connecting hole 26c, foaming adhesive agent of polyurethane system is used, the adhesive agent is filled to the connecting hole 26c or corners of the adhesive agent accumulation part 58 with pressure during foaming action, and also adhesive agent having a strong adhering strength with a non-foaming resin such as epoxy resin is coated to the adhesive agent applying part 59, thereby not only its operability can be improved, but also a strong connection can be easily attained.

After installing the branch pipe 6h to the air discharge part 52, the seal material 57 may be arranged at the connecting surface 19a having an air discharge part 52.

Preferred Embodiment 9

Figure 41:
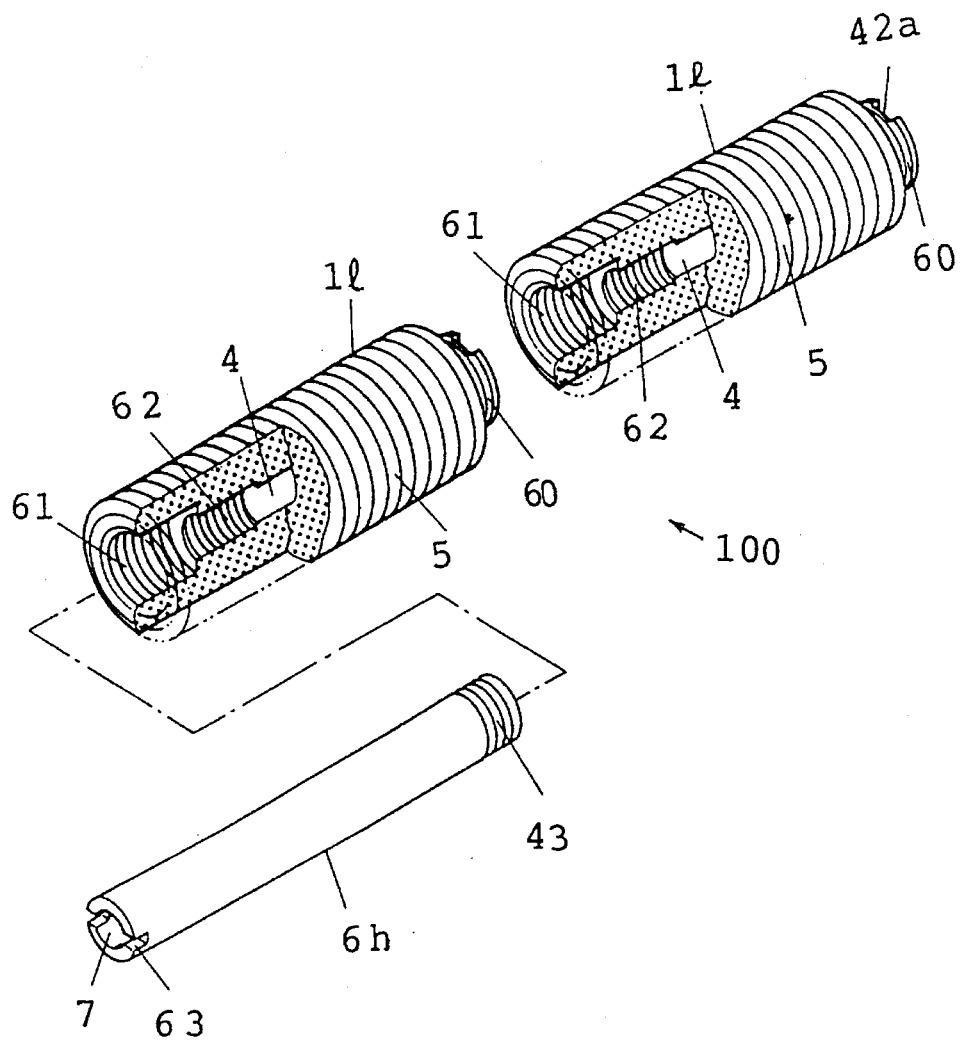
FIG. 41 is a perspective view with a part being broken away to show the view before the connector of the ninth preferred embodiment of the present invention is connected.

FIG. 41 is a perspective view with a part being-broken away to show the view before the connector in the ninth preferred embodiment of the present invention is connected.

Figure 42:
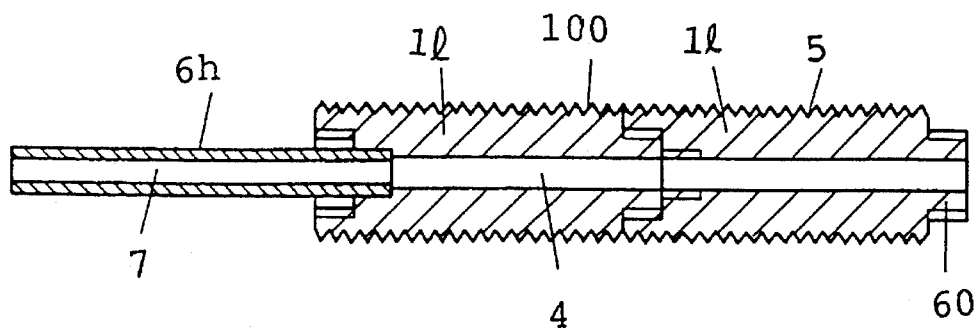
FIG. 42 is a sectional view showing the connector to illustrate the state in which the connector in the ninth preferred embodiment of the present invention is connected.

FIG. 42 is a sectional view showing the connector to illustrate the state in which the connector of the ninth preferred embodiment is connected. 100 denotes a metallic connector in which the branch pipe and two connectors are removably connected to each other and engaged to each other through the hollow part. 1*l* denotes a metallic hollow cylindrical connector. 5 denotes a concave or convex part formed at the side surface of the connector 1*l*. 60 denotes a convex end part engaging part threadably engaged with the connecting end part engaging part formed at an end part of the other connector 1*l* formed helically at the end part of the connector 1*l*. 4 denotes a hollow part for use in flowing the adhesive agent formed in a longitudinal direction of the central part of the connector 1*l* and opened at both ends thereof. 61 denotes a concave end part engaging part threadably fixed and engaged with the connecting end part engaging part 60 or the like of the other connector 1*l* formed helically at the end hollow part of the connector 1*l*. 62 denotes a coaxial branch pipe engaging part with the end part engaging part 61 at the end part of the connector 1*l* and helically formed at the hollow part 4 in a step-wise manner. 42*a* denotes an adhesive agent guiding groove formed in a concave manner at the end part engaging part 60 of the connector 1*l*. 42*a* denotes an adhesive agent guiding groove formed in a concave manner at the end part engaging part 60 of the connector 1*l*. 6*h* denotes a metallic branch pipe threadably engaged with the branch pipe engaging part 62 of the connector 1*l*. 7 denotes a branch pipe hollow part communicating with the hollow part 4 of the connector 1*l* formed at the branch pipe 6*h*. 43 denotes a branch pipe engaging part helically formed at the end part of the branch pipe, threadably engaged with the branch pipe engaging part 62 of the connector 1*l* and engaged with it. 63 denotes a drive engaging groove for engaging with a screw drive when the connector 1*l* and the branch pipe 6*h* are engaged to each other or when they are disengaged from each other.

Instead of forming the end part engaging part 61 and the branch pipe engaging part 62 in a stepwise manner, the end part engaging part 61 and the branch pipe engaging part 62 can be integrally formed in a frustum of a circular cone. With such an arrangement, the branch .pipes 6*h* having different diameters can be freely selected in response to the work position or the kind of adhesive agent.

In reference to the connector having the connector of the ninth preferred embodiment constructed as described above, its connecting method for the structural members and the connecting structure between the structural members will be described as follows.

WORKING EXAMPLE 12

Figure 43:
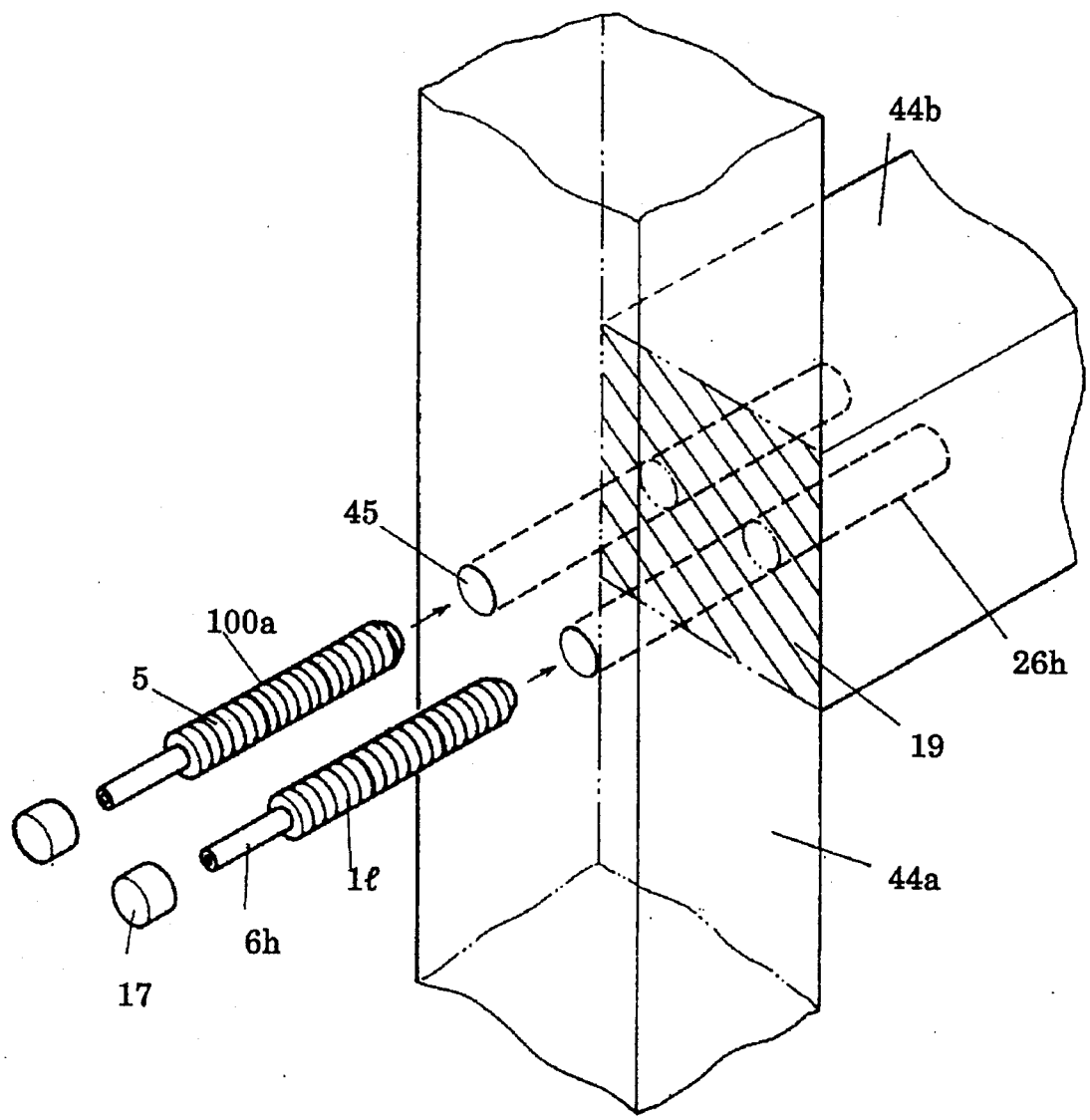
FIG. 43 is a perspective view showing a connecting work in which the connectors of the ninth preferred embodiment are applied to connecting end parts of a rectangular column, and a vertical material such as a beam and a lateral material.

FIG. 43 is a perspective view for showing a connection in which a square column, and a vertical member such as beam and a lateral member are connected at their ends using the connector having the connectors of the ninth preferred embodiment of the present invention connected thereto. FIG. 44-*a* is a sectional view for showing a central part of the connecting hole to illustrate the work operation. FIG. 44-*b* is a sectional view for showing a central part of the connecting hole to illustrate the state after the work operation. 100*a* denotes a connector having three connectors 1*l* connected to each other. 6*h* denotes a branch pipe. 44*a* denotes a vertical member such as a square column. 44*b* denotes a lateral member such as a beam. 19 denotes a connecting surface of each of the vertical members 44*a* and the lateral members 44*b*. 26*h* denotes a connecting hole formed in such a way that the connecting surface 19 of each of the vertical members 44*a* and the lateral members 44*b* are communicated to be slightly larger than a diameter of the connector 100*a* in advance with a in precut system or at work position. 45 denotes an opening of the connecting hole 26*h*. 17 denotes a plug made of wood or synthetic resin to apply a 11*d* for the opening 45 of the connecting hole 26*h* flush with the surface of the square column after the end portions are connected to each other. 46 denotes an adhesive agent feeding gun. 18 denotes an adhesive agent of epoxy resin or poyurethane system which is fed from branch pipe 6*h*, passes through hollow part 4 of the connector 1*l*, fills at the outer surface of the connector 100*a* and the inner wall of the connecting hole 26*h* and further fills until the flow out of the agent is visually confirmed at an opening 45 of the connecting hole 26*h*.

Figure 45:
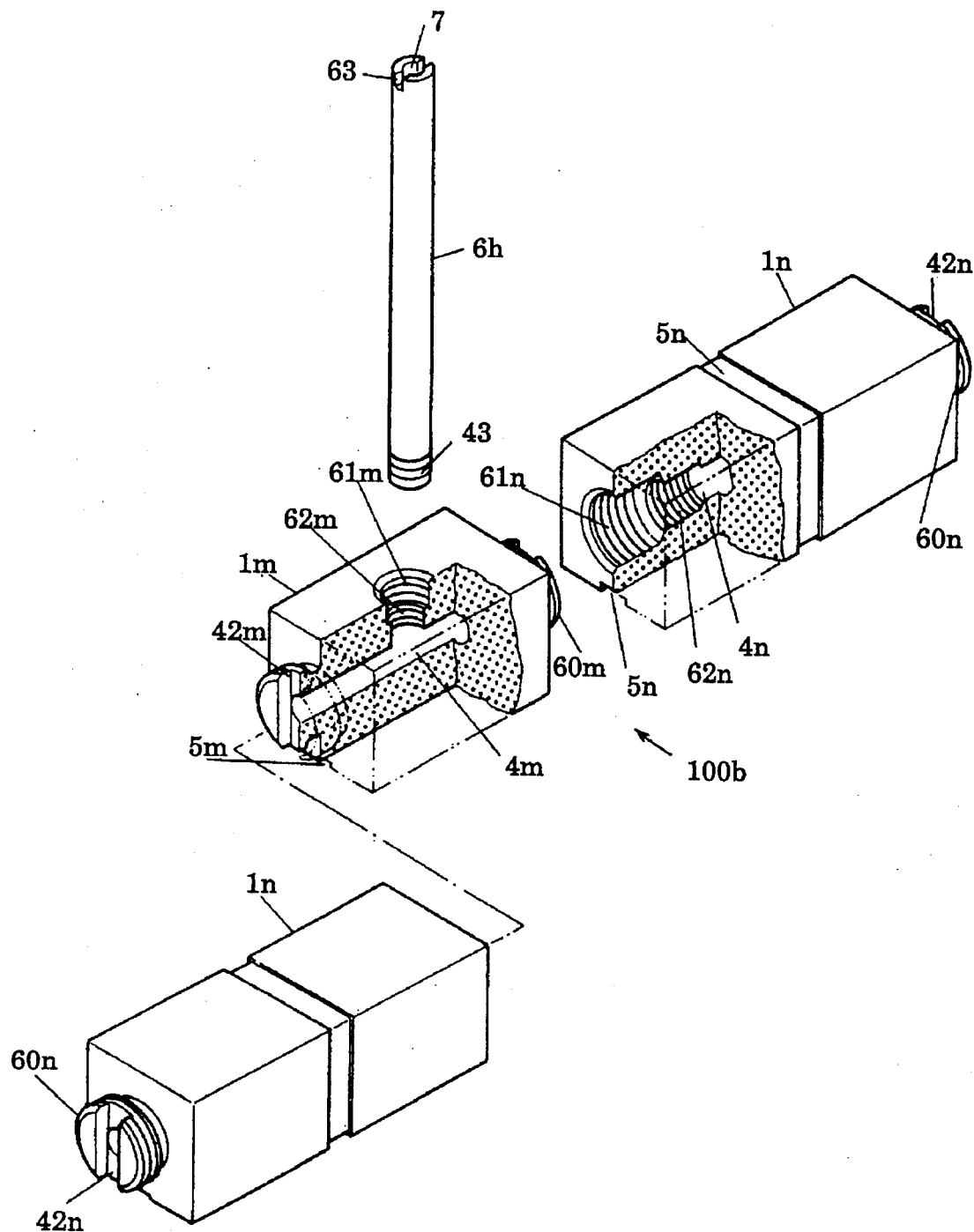
FIG. 45 is a perspective view partly broken away showing the connectors connected in the tenth preferred embodiment

First, the connector 100*a* having the branch pipe 6*h* engaged with the end part branch pipe engaging part 62 is inserted into the connecting hole 26*h*. The adhesive agent feeding gun 46 is installed at the opening of the branch pipe 6*h*. Then the adhesive agent 18 is filled into the connecting hole 26*h* through the hollow part 6 until the return back of the adhesive agent 18 is visually confirmed at the opening 45 of the connecting hole 26*h*. As shown in FIG. 45-*a*, the adhesive agent 18 is fed from the branch pipe hollow part 7 as indicated by an arrow, the adhesive agent is passed through the hollow part 4 of the connector 1*l* and further fills a clearance between the surface of the connector 100*a* and the circumferential wall of the connecting hole 26*h*. At this time, any channeling or short-pass of the adhesive agent 18 is prevented under an effect of the buffer of the concave or convex part 5 at the surface of the connector 100*a* and the adhesive agent 18 is filled into the clearance without producing any leakage from it.

In addition, continuation of feeding of the adhesive agent 18 is enabled to be visually confirmed as the agent rises, filling the clearance between the outer surface of the branch pipe 6*h* and the connecting hole 26*h*, resulting in that nonuniform filling of adhesive agent can be prevented.

Upon visual check of the adhesive agent at the opening 45 of the connecting hole 26*h*, the branch pipe 6*h* is rotated half way to release from an engaged state with the connector 100*a*. Then, the plug 17 is inserted into the opening 45 of the connecting hole 26*h* flush with it. Using the same material of the plug 17 as that of the vertical member 44*a* enables the plug to be integrally formed with the vertical member 44*a* when the flush insertion is made. In the preferred embodiment, three connectors 1*l* having a circular section are connected. However, the number of connectors to be connected and the shape of the connector may be varied in response to the size of or shape of the structural members to be connected. Using the connector having a square cross-section or a triangular section or an elliptical section prevents the abutting end materials from being rotated merely by insertion of the connector, resulting in that its operability can be further improved.

Then, we performed the structural strength test for the preferred embodiment with the Japanese cryptomeria wood piece of 10.5 cm×10.5 cm. As a result, it was found that the connection strength (a tensile) at the connecting part of the preferred embodiment has a value of 56 kg/cm². As a comparative example, in the prior art method, the tenon insertion and a dovetail end connection were carried out to measure the connection strength, resulting in that its value was a quite low value of 5 kg/cm² or less. In view of this fact, an additional plug coupling of the strongest one in the prior art was compared with the mortise and tenon couplings. Strength of each of the couplings was 35 kg/cm² and 16 kg/cm², respectively.

This fact showed that the connecting structure using the connector of the preferred embodiment had a connection strength (a tensile) more than 18 times of the prior art dovetail end connection and more than 1.5 to 3.5 times of the coupling connection. In addition, in view of rigidity value, it was found that it has a rigidity more than 28 to 220 times greater than the prior art.

Preferred Embodiment 10

FIG. 45 is a perspective view with a part broken away showing the connector in the tenth preferred embodiment of the present invention. FIG. 46 is a sectional view for showing the connector having connectors connected in the tenth preferred embodiment of the present invention.

100b denotes a connector having each of connectors 1n at both ends of the connector 1m. 1m denotes a hollow connector having a wall surface engaging part for connecting the other connector to both ends and a longitudinal predetermined part and a branch pipe engaging part. 5m denotes a concave part of the convex or concave part formed at the rear surface of the connector 1m. 60m denotes a convex end part engaging part threadably engaged with the end part engaging part for connection formed at the end part of the other connector helically formed at the end part of the hollow connector 1m. 4m denotes a hollow part for feeding adhesive agent formed in a T-shape at a central part in a longitudinal direction of the connector 1m and having both ends opened. 61m denotes a concave wall surface engaging part punched to be communicated with the hollow part 4m at a predetermined longitudinal part of the connector 1m and threadably engaged with the other connector. 62m denotes a branch pipe engaging part cooperatively and threadably engaged with the wall surface engaging part 61m. 42m denotes an adhesive agent guiding groove formed in a concave shape at the end part engaging part 60m of the connector 1m.

1n denotes a metallic hollow rectangular rod-like connector. 5n denotes a concave part of the convex or concave part formed at the rear surface of the connector 1n. 5'n denotes a concave part of the convex or concave part formed at the front surface of the connector 1n. 60n denotes a convex end part engaging part threadably engaged with the end part engaging part forked at the other connector threadably formed at one end of the connector. 4n denotes an adhesive agent feeding hollow part of which both ends formed in a longitudinal direction of the central part of the connector 1n are opened. 61n denotes a concave end part engaging part threadably engaged with the connecting end part engaging part 60m of the other connector 1m threadably formed at the hollow part at one end of the connector 1n. 62n denotes a branch pipe connecting part threadably formed at the hollow part at the end part of the connector 1n. 42n denotes an adhesive agent guiding groove formed in a concave shape at the end part engaging part 60n of the connector 1n.

In the case that the connectors 1m and 1n applied such that only the connectors are engaged, it is not necessary to form the branch pipe connecting parts 62m, 62n.

In reference to the connector having the connectors connected in the tenth preferred embodiment of the present invention constructed as described above, the connecting method for connecting the structural members and the connection structure between the structural members will be described as follows.

WORKING EXAMPLE 13

FIG. 47-a is a perspective view for showing a state in which an independent column and a beam are connected at their ends using the connector having the connectors of the tenth preferred embodiment of the present invention connected to each other. FIG. 47-b is a sectional view for showing a central part of the connecting part to illustrate the state of work operation. FIG. 47-c is a sectional view for showing a central part of the connecting part to illustrate the state after work operation.

The reference numeral 100c denotes a connector in which the branch pipe engaging part is not provided at the end part engaging part, one connector in is connected to one connecting end part engaging part of the connectors 1m of the preferred embodiment No.10 of hollow part of different diameter and two connectors are connected to the other end part engaging part. 44a denotes a vertical member. 44b and 44c denote lateral members to be connected to the vertical member 44a. 14m denotes a branch pipe installing cutting groove formed at the abutment surface of the connecting hole 26m of the lateral member 44b for use in installing the branch pipe 6h. 64 denotes an opening at the branch pipe installation groove 14m. 17 denotes a plug acting as a cap for the opening 64 of the branch pipe installation groove 14m after end part connection and made of wood or synthetic resin and flush with the surface of the beam. 46 denotes an adhesive agent feeding gun. 18 denotes an adhesive agent of epoxy resin or polyurethane resin fed from the branch pipe 6h and filled until the flow out of the adhesive agent is visually confirmed at the opening 64 of the branch pipe installation groove 14m while the connecting hole 26m is being filled through the hollow part of the connector 100c.

First, the branch pipe installation groove 14m at the abutment surface of the square connecting hole 26m or the connecting hole 26m of the lateral member 44b is formed to be communicated with a substantial central part at the abutment surfaces of the vertical member 44a, lateral members 44b, 44c to be connected, have a slightly larger diameter than that of the connector 100c and a slightly deeper than the length of the connector 100c or the connecting hole 26m of the lateral member 44b in advance. The connector 100c having the branch pipe 6h engaged therein is installed in the connecting hole 26m communicated with the abutment surface so as to cause the vertical member 44a to be abutted against the lateral members 44b, 44c.

Then, the adhesive agent feeding gun 46 is installed at the opening of the branch pipe 6h, and the adhesive agent 18 is filled into the connecting hole 26m until the adhesive agent passes through the hollow part of the connector 100c and its return back is visually checked at the opening 64 of the branch pipe installation groove 14m. As shown in FIG. 48-b, the adhesive agent 18 is fed at the hollow part 7 of the branch pipe as indicated by an arrow, the adhesive agent passes through the hollow part of the connector 100c and fills the clearance between the surface of the connector 100c and the circumferential wall of the connecting hole 26m. In this case, channeling or short pass of the adhesive agent 18 is prevented by the effect of buffer of the convex or concave part 5n at the surface of the connector 100c and then the adhesive agent 18 is filled into the clearance without possibility of leakage. In addition, continuing to feed the adhesive agent 18 causes the adhesive agent to return back to the opening 64 while filling the clearance between the outer surface of the branch pipe 6h and the installing groove 14m and this can be visually confirmed, resulting in that nonuniform filling can be prevented. Upon visual confirmation of the return back flow of the adhesive agent 18 at the opening 64, the branch pipe 6h is rotated half way and the engaging state with the connector 100c is released. Then, the plug 17 is installed flush with the opening 64.

As apparent from the preferred embodiment, the connectors having hollow parts of different diameter are combined with each other to enable the adhesive agent return back time of each to be substantially concurrent, the connector of required length and shape can easily be made at the working position, resulting in that more than three vertical members or lateral members can be connected by one connector 100c and one time feed operation of the adhesive agent is enough for operation. Since the section of the connector 100c is square, the lateral members 44b and 44c are not rotated, its operability can be improved and its work characteristics are superior. Since one connector can be buried and fixed between the lateral members 44b, 44c and the vertical member 44a, it is possible to make remarkable improvements in bending stress, tensile stress and compression stress and the like.

Preferred Embodiment 11

FIG. 48-a is a perspective view with a part broken away showing the state before connecting the connector in the eleventh preferred embodiment of the present invention. FIG. 48-b is a sectinoal view showing a connector having the connectors of the eleventh preferred embodiment of the present invention connected thereto.

The numeral 1l denotes a metallic connector, 5 denotes a convex or concave part, 60, 61 denote end part engaging parts, 4 denotes a hollow part, 42a denotes an adhesive agent guiding groove, 6h denotes a branch pipe, 7 denotes a branch pipe hollow part, 43 denotes an engaging part, 63 denotes a screw driver engaging groove and they are similar to those of the ninth preferred embodiment, so the same reference numerals are applied to them and their descriptions are eliminated.

The numeral 1l denotes a connector where one end of the hollow part is closed, a convex or concave anchor part is provided at a surface of the closing end part and a connecting end part engaging part at a longitudinal predetermined part and the other end. 100d denotes a connector in which the connector 1l of the ninth preferred embodiment is connected to the end part engaging part of the connector unit 1p. 5p denotes a convex or concave part formed at the surface of the connector 1p. 60p denotes an end part engaging part removably connected to the other connector at one end of the connector 1p and communicated with the hollow part and engaged. 4p denotes an adhesive agent flowing hollow part formed in a longitudinal direction of the central part of the connector 1p and opened at one end thereof. 62p denotes a branch pipe engaging part communicated up to the hollow part at a longitudinal predetermined part of the connector, punched, removably connected to the branch pipe 6h and formed into a threaded shape to be communicated with the hollow part.

In reference to the connector in the eleventh preferred embodiment of the presenet invention constructed as described above, the connecting method for the structural members and the connection structure between the structural members will be described as follows.

WORKING EXAMPLE 14

FIG. 49 is a sectional view for showing a central part of the connecting part to illustrate the state of end part connection to be used in connection of a beam and a cross-beam or the like using the connector having the connectors of the eleventh preferred embodiment of the present invention connected to each other. The numeral 100d denotes a connector in which the connector 1l of the ninth preferred embodiment is connected to the connector 1p. 11p denotes a bracket timber. 10p and 10'p denote joint timbers abutted against the bracket timber 11p. 26p denotes a connecting hole formed to be communicated with the connecting surfaces of the bracket timber 11p and the joint timber 10'p. 14p denotes a branch pipe installation groove formed at the opening of the connecting hole 26p which is not the connecting surface of the bracket timber 11p. 64p denotes an opening of the branch pipe installation groove 14p.

First, the connecting hole 26p having a depth such as to be communicated with the abutment surfaces of the bracket timber 11p and the joint timber 10'p performing the end connection, having a slightly larger diameter than that of the connector 100d and causing the central part of the connector 100d to come to a connecting surface of the bracket timber 11p and the joint timber 10'p is punched with a drill and the like in advance. The opening of the connecting hole 26p not at the connecting surface of the bracket timber 11p is formed with the groove 14p for use in installing the branch pipe 6h. Then, the connector 100d having the branch pipe 6h engaged therewith is inserted into the connecting hole 26p, and the bracket timber 11p and the joint timber 10'p are abutted to each other since the feeding method of the adhesive agent is similar to that of the preferred embodiment No.13, its description will be eliminated. Application of the connector 100d of the preferred embodiment is effective when the connector may not be inserted between the joint timber 10p and the bracket timber 11p for the sake of the laminated wood order.

Preferred Embodiment 12

FIG. 50-a is a sectional view showing a connector to illustrate an example of application of the connector in the eleventh preferred embodiment of the present invention.

In the figure 1l denotes a connector of the ninth preferred embodiment. The numeral 6h denotes a branch pipe. The numeral 7 denotes a branch pipe hollow part. Since they are similar to those shown in the eleventh preferred embodiment, the same reference numerals are applied and their description will be eliminated.

In the figure 1q denotes a connector in which a closing part of the connector 1p of the eleventh preferred embodiment is elongated and an anchor part 65 is provided at the end part of the closing part. 100e denotes a connector in which the connector 1l of the ninth preferred embodiment is connected to the connector 1q.

As an example of application, the end part having no opening of the connector of the eleventh preferred embodiment is elongated. However, the end part engaging part connected to the other connector is disposed at the closing end (not shown) and the cylindrical connector having an anchor part may be connected.

In reference to the connector in the twelfth preferred embodiment of the present invention constructed as described above, the connecting method of the structural members and the connection structure between the structural members will be described as follows.

WORKING EXAMPLE 15

FIG. 50-b is a sectional view for showing the central part of the connecting hole when a column and a foundation, and a concrete foundation are to be connected or worked using the connector in which the connector of the twelfth preferred embodiment is connected. The numeral 66 denotes a concrete foundation. The numeral 67 denotes a foundation connected to the concrete foundation 66. The numeral 68 denotes a column connected to the foundation. The numeral 26q denotes a connecting hole formed to be communicated with the foundation 67 and the column 68. The numeral 14q denotes a branch pipe installation groove formed at the abutment surface of the foundation 67. The numeral 64q denotes an opening of the branch pipe installation groove 14q.

First, when the concrete foundation 66 is applied, the connector 100e is buried at such a depth that it may be engaged with the branch pipe 6h so as to complete the concrete foundation 66. The branch pipe engaging part is temporarily sealed with tape in order to prevent concrete from flowing into the branch pipe engaging part and preferably the concrete application is performed. Then, a connecting hole 26q is punched with a drill to such a depth that the remaining part buried in the concrete foundation 66 is buried in the foundation 67 and the column 68 with a slightly larger diameter than that of the connector 100e at the abutment surfaces of the foundation 67 and the column 68. The abutment surface of the foundation 67 is formed with the branch pipe installation groove 14q.

Then the connector 100e is inserted into the connecting hole 26q of the foundation 67 to cause the concrete foundation 66, foundation 67 and column 68 to be abutted to each other. Since the feed method of the adhesive agent 18 is similar to that of the preferred embodiment No.13, its description will be eliminated. Feeding is carried out until the adhesive agent 18 returns back to the opening 64q of the branch pipe installation groove 14q where the adhesive agent 18 is visually confirmed, resulting in that the connection of the branch pipe 6h is released and the plug (not shown) is applied to the opening 64q so as to complete the work operation.

As apparent from the preferred embodiment, the connectors having anchors are combined with each other, the wooden members or concrete or stone members can be simply connected.

In the preferred embodiment, the branch pipe and the connector is carried out by a threaded engagement and the engaging method for the branch pipe and the connector may be carried out by fitting or other methods as shown in FIG. 51 if they may be fixed or removed.

Preferred Embodiment 13

FIG. 52 is a perspective view for showing the connector of the 13-th preferred embodiment of the present invention.

FIG. 53-*a* is a side elevational view of FIG. 52 and FIG. 53-*b* is a substantial perspective view for showing a flowing-out end of the adhesive agent.

Reference numeral 1s denotes a metallic connector of the 13-th preferred embodiment. 70 denotes a metallic round tubular member, 3s denotes an adhesive agent flowing-out end of the tubular member 70 formed into a bulged shape. 40s denotes two projection parts projected and formed at the symmetrical positions of the extreme ends of the adhesive agent flowing-out end 3s. 71 denotes a concave part punched in a substantial U-shape extending from the end part to the end of the outer surface of the tubular member 70. 5s denotes a concave or a convex part formed helically at the surface of the tubular member 70. 72 denotes a pipe-like part of which one end is extended at the end part of the concave part 71 of the tubular member 70 and the other end is extended from the other end of the tubular member 70 and fitted to the concave part 71. 8s denotes an adhesive agent guiding groove formed in a concave shape at the surface of the adhesive agent flowing-out end 3s formed in a bulged shape.

A method for connecting the structural members will be described in reference to the connector of the 13-th preferred embodiment constructed as above.

FIG. 54 is a perspective view for showing a case in which the independent column and the joint member are connected by using the connector of the 13-th preferred embodiment of the present invention. 73 denotes a metallic wire of stainless steel for use in fixing the tubular member 70 to the pipe-like part 72. 44a denotes a joint timber such as an independent column and the like. 44b denotes a bracket timber such as a joint and the like. 19 denotes a connecting surface at the end part of the joint timber 44a and the bracket timber 44b. 26s denotes a connecting hole formed to be communicated with the connecting surface 19 of the joint timber 44a and the bracket timber 44b. 45 denotes an opening of the connecting hole 26s. 17 denotes a wooden or synthetic resin plug for covering the opening 45 of the connecting hole 26s after connecting the end part to cause the opening to be in flush with the surface of the column member.

The work is carried out in the same manner as that of the example No.8 of the work.

Preferred Embodiment 14

FIG. 55 is a perspective view for showing the connector in the 14-th preferred embodiment of the present invention. The difference of the connector 1t of the 14-th preferred embodiment of the present invention against the connector of the first preferred embodiment consists in the fact that the pipe-like part 72t is bent at both ends of the tubular member 70t, engaged there and the branch pipe 74 is threadably engaged with the opening thereof.

As described above, according to the preferred embodiment of the present invention, mere bending of the pipe-like part 72t into the tubular member 70t enables the pipe-like part 72t to be engaged with it, so that the pipe-like part 72t can be quite easily installed at the tubular member 70t and even if the connecting hole is deep, extension of the branch pipe enables the connected structure having a high withstand force to be attained at a predetermined location.

Preferred Embodiment 15

FIG. 56 is a partial sectional end view for showing the connector of the 15-th preferred embodiment of the present invention and FIG. 57 is an entire perspective view of the connector.

The difference of the connector 1u of the 15-th preferred embodiment against the connectors of the 13-th and 14-th preferred embodiments consists in the facts that the pipe-like branch pipe 74u is threadably engaged with the branch pipe hole 75 punched at the central part of the pipe-like part 72u, openings at both ends of the pipe-like part 72u are opened at the adhesive agent guiding groove 8u and the openings at both ends of the pipe-like part 72u are opened at the adhesive agent guiding groove 8u.

The connector 1u of the 15-th preferred embodiment is a modified embodiment of the fifth preferred embodiment and it is apparent that it has a solid connecting structure similar to those of the experimental example Nos.4 and 5.

According to the present preferred embodiment, it has been found that the connecting structure having a withstand force more than 3 to 10 times of that of the prior art connecting structure can be attained with the connector having a quite simple shape of which manufacturing is quite easy.

Preferred Embodiment 16

FIG. 58 is a sectional view for showing the connector of the 16-th preferred embodiment of the present invention.

1v denotes the connector of the 16-th preferred embodiment. 70v denotes the rod member in which a fitting concave part is formed up to the predetermined part. 70'v denotes a concrete burying part having the concave part for installing cement at a predetermined part of the outer circumferential surface for burying the concrete and formed with an anchor part 70"v at the end part thereof. 72v denotes a pipe-like part of which one end is opened at an adhesive agent guiding groove 8v and the other end is bent at a right angle at a predetermined part of the rod member 70v, vertically installed, fitted and fixed. 74v denotes a pipe-like branch pipe installed at the opening part at the end part of the pipe-like part 72v.

The connector of the 16-th preferred embodiment is an example of application of the second preferred embodiment of the present invention and it has been found that the connector may have a similar effect as those of these preferred embodiment with a simple structure.

I claim:

1. A connection between structural members comprising a T shaped tubular connector comprising a branch pipe and a transverse tubular member a plurality of solid structural members defining a groove for receiving said branch pipe, and a pair of connecting bore holes at abutting surfaces of said structural members and an adhesive agent dispensed between an outer surface of said connector and the circumferential walls of said connecting bore holes thereby surrounding said tubular member.

2. A connecting member for joining solid structural members comprising a transverse member having sidewalls and opposite endwalls, said transverse member having a hollow passage and opposite openings at said endwalls, a branch member having a hollow passage, said branch member having an inlet port and an exit port, said hollow branch member intersecting said transverse member at a medial location and said hollow passages communicating with each other, said branch member and said traverse members comprising means to allow a viscous liquid adhesive to flow into said inlet port through said branch member, out said exit port, into said transverse member and then simultaneously flowing in opposite directions through said traverse member towards said opposite openings.

3. A connecting member for joining solid structural members as recited in claim 2 wherein said endwalls define opposite openings and said endwalls have at least one groove radially extending from one of said openings and said groove forming a passage in a radial direction.

4. The connecting member as recited in claim 2 wherein a cross section through said transverse tube member is circular.

5. The connecting member as recited in claim 2 wherein a cross section of said transverse tube member is a polygon.

6. The connecting member as recited in claim 2 wherein a cross section of said transverse tube member is elliptical.

7. The connecting member as recited in claim 2 wherein a cross section of said transverse tube member is triangular.

8. An improved joint between two solid structural members incorporating the connecting member recited in claim 2 and further comprising two members having opposite faces, opposing bore holes perpendicularly extending in each said respective face, a lateral groove in one of said structural members oriented in a radial direction to an axis defined by said opposing bore holes, said opposing bore holes having a dimensions slightly larger than the diameter of said connecting member, said transverse member of said connecting member being located within said opposing bore holes and said branch member being located within said lateral groove and adhesive dispensed within said connecting member and within a space defined by the walls of the opposing bore holes and the sidewalls of said tubular transverse member.

9. The joint recited in claim 8 wherein the joint is from a group consisting of a dado joint, a halving joint, or an abutment coupling.

10. The connecting member recited in claim 2 wherein said hollow passage in said transverse member has a substantially uniform radial dimension.

11. A connecting member as recited in claim 2 further comprising a plurality of grooves located on the outer surface of said sidewalls between said branch member and openings whereby an adhesive can flow within said grooves.

12. A connecting member recited in claim 11 wherein said grooves extend in an axial direction whereby an adhesive can flow within said grooves in said axial direction.

13. The connecting member as recited in claim 2 wherein a plurality of projections axially extend from said endwalls.

14. The connection member as recited in claim 13 wherein said projections are uniformly distributed around said endwall.

15. The connecting member as recited in claim 2 wherein the radial dimension of said transverse member is substantially uniform.

16. The connecting member as disclosed in claim 2 further comprising retention means, said retention means retaining said branch member in said transverse member and said branch member is manually removable from said retention means.

17. The connector recited in claim 16 wherein said retention means comprise threads located at a medial location on said transverse member and threads on the distal ends of said branch member wherein the threads of the branch member are received by threads in the transverse member.

18. A connecting member for joining solid structural members according to claim 2 in which said branch member is fixed to said tubular transverse member.

19. A method for connecting structural members comprising the steps of boring into opposite faces of said structural members a pair of opposing connecting holes for embedding a connector in said structural members, forming a groove on the surface of said opposite faces to receive a branch pipe, said groove radially extending from one of said connecting holes to the edge of one of said faces, mounting said connector in said one of said holes with a branch pipe positioned in said groove, bringing the structural member in which is mounted the connector into contact with the other one of said connecting holes, introducing an adhesive into the branch pipe of said connector until the adhesive flows back towards said groove which receives said branch pipe.

20. The method recited in claim 19 further comprising the additional step of removing said branch pipe.

\* \* \* \* \*